(12) United States Patent
McKeever et al.

(10) Patent No.: US 12,215,598 B1
(45) Date of Patent: Feb. 4, 2025

(54) COMPRESSOR ROTOR BLADE AIRFOILS

(71) Applicant: GE Infrastructure Technology LLC, Greenville, SC (US)

(72) Inventors: Matthew John McKeever, Greer, SC (US); Grady Pastor, Greenville, SC (US); Andrew Joseph Kotnour, Greenville, SC (US); Juliano Avolio, Greenville, SC (US); Kevin Michael Barnett, Greenville, SC (US); Laia Ferrer-Argemi, Knoxville, TN (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/497,452

(22) Filed: Oct. 30, 2023

(51) Int. Cl.
*F01D 5/14* (2006.01)

(52) U.S. Cl.
CPC ...... *F01D 5/141* (2013.01); *F05D 2220/3219* (2013.01); *F05D 2240/306* (2013.01)

(58) Field of Classification Search
CPC .......... F01D 5/141; F01D 9/041; F01D 5/142; F01D 5/187; F01D 9/02; F05D 2250/74; F05D 2220/3217; F05D 2220/3218; F05D 2220/3219; F05D 2220/32; F05D 2240/12; F05D 2220/3216; F05D 2250/38; F05D 2240/30; F05D 2240/301; F05D 2240/305; F05D 2240/306; F05D 2240/35; F04D 29/544; F04D 29/324

See application file for complete search history.

(56) References Cited

U.S. PATENT DOCUMENTS

| | | | |
|---|---|---|---|
| 5,980,209 A | 11/1999 | Barry et al. | |
| 9,017,019 B2 | 4/2015 | McKeever et al. | |
| 11,401,816 B1 * | 8/2022 | Deivernois | F04D 29/324 |
| 11,414,996 B1 * | 8/2022 | McKeever | F04D 19/02 |
| 11,459,892 B1 | 10/2022 | McKeever et al. | |

* cited by examiner

*Primary Examiner* — Eric J Zamora Alvarez
(74) *Attorney, Agent, or Firm* — Dority & Manning, P.A.

(57) ABSTRACT

A rotor blade includes an airfoil having an airfoil shape. The airfoil shape has a nominal profile substantially in accordance with Cartesian coordinate values of X, Y and Z set forth in one of TABLE I and TABLE II. The Cartesian coordinate values of X, Y and Z are non-dimensional values from 0% to 100% convertible to dimensional distances expressed in a unit of distance by multiplying the Cartesian coordinate values of X, Y and Z by a scaling factor of the airfoil in the unit of distance. The X and Y values, when connected by smooth continuing arcs, define airfoil profile sections at each Z value. The airfoil profile sections at Z values being joined smoothly with one another to form a complete airfoil shape.

20 Claims, 4 Drawing Sheets

US 12,215,598 B1

COMPRESSOR ROTOR BLADE AIRFOILS

FIELD

The present disclosure relates to an airfoil for a compressor rotor blade disposed within a stage of a compressor section of a land-based gas turbine system and, more particularly, relates to a shape defining a profile for an airfoil of a compressor rotor blade.

BACKGROUND

Some simple cycle or combined cycle power plant systems employ turbomachines in their design and operation. Generally, turbomachines employ airfoils (e.g., stator vanes or nozzles and rotor blades), which during operation are exposed to fluid flows. These airfoils are configured to aerodynamically interact with the fluid flows and to transfer energy to or from these fluid flows as part of power generation. For example, the airfoils may be used to compress fluid, create thrust, to convert kinetic energy to mechanical energy, and/or to convert thermal energy to mechanical energy. As a result of this interaction and conversion, the aerodynamic characteristics of these airfoils may result in losses that have an impact on system and turbine operation, performance, thrust, efficiency, and power.

BRIEF DESCRIPTION

Aspects and advantages of the rotor blades and turbomachines in accordance with the present disclosure will be set forth in part in the following description, or may be obvious from the description, or may be learned through practice of the technology.

In accordance with one embodiment, a rotor blade is provided. A rotor blade includes an airfoil having an airfoil shape. The airfoil shape has a nominal profile substantially in accordance with Cartesian coordinate values of X, Y and Z set forth in one of TABLE I and TABLE II. The Cartesian coordinate values of X, Y and Z are non-dimensional values from 0% to 100% convertible to dimensional distances expressed in a unit of distance by multiplying the Cartesian coordinate values of X, Y and Z by a scaling factor of the airfoil in the unit of distance. The X and Y values, when connected by smooth continuing arcs, define airfoil profile sections at each Z value. The airfoil profile sections at Z values being joined smoothly with one another to form a complete airfoil shape.

The airfoil shape (e.g., the airfoil shape 150 in FIGS. 3 and 4) has a nominal profile substantially in accordance with Cartesian coordinate values of X, Y and Z set forth in one of TABLE I and TABLE II. TABLES I and II define a plurality of airfoil profile sections of the airfoil (e.g., the airfoil 100 in FIGS. 3 and 4) at respective Z-positions. For each airfoil profile section of the airfoil at each Z position, the points defined by the X and Y coordinates are connected together by smooth continuing arcs thereby to define the shape of that airfoil profile section. Also, adjacent airfoil profile sections along the Z-direction are connected together by smooth continuing surfaces. Thus, the complete airfoil shape is defined. Advantageously, this airfoil shape tends to provide for improved aerodynamic efficiency of the airfoil when compared to conventional airfoil designs.

In accordance with another embodiment, a rotor blade is provided. The rotor blade includes an airfoil having a nominal suction-side profile substantially in accordance with suction-side Cartesian coordinate values of X, Y and Z set forth in one of TABLE I and TABLE II. The Cartesian coordinate values of X, Y and Z are non-dimensional values from 0% to 100% convertible to dimensional distances expressed in a unit of distance by multiplying the Cartesian coordinate values of X, Y and Z by a scaling factor of the airfoil in the unit of distance. The X and Y values, when connected by smooth continuing arcs, define suction-side profile sections at each Z value. The suction-side profile sections at the Z values being joined smoothly with one another to form a complete airfoil suction-side shape.

In accordance with yet another embodiment, a turbomachine is provided. The turbomachine includes a compressor section, a turbine section downstream from the compressor section, and a combustion section downstream from the compressor section and upstream from the turbine section. A rotor blade is disposed within one of the compressor section or the turbine section. The rotor blade includes an airfoil having a nominal suction-side profile substantially in accordance with suction-side Cartesian coordinate values of X, Y and Z set forth in one of TABLE I and TABLE II. The Cartesian coordinate values of X, Y and Z are non-dimensional values from 0% to 100% convertible to dimensional distances expressed in a unit of distance by multiplying the Cartesian coordinate values of X, Y and Z by a scaling factor of the airfoil in the unit of distance. The X and Y values, when connected by smooth continuing arcs, define suction-side profile sections at each Z value. The suction-side profile sections at the Z values being joined smoothly with one another to form a complete airfoil suction-side shape.

These and other features, aspects and advantages of the present rotor blades and turbomachines will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present rotor blades and turbomachines, including the best mode of making and using the present systems and methods, directed to one of ordinary skill in the art, is set forth in the specification, which makes reference to the appended figures, in which.

DETAILED DESCRIPTION

Figure 1:
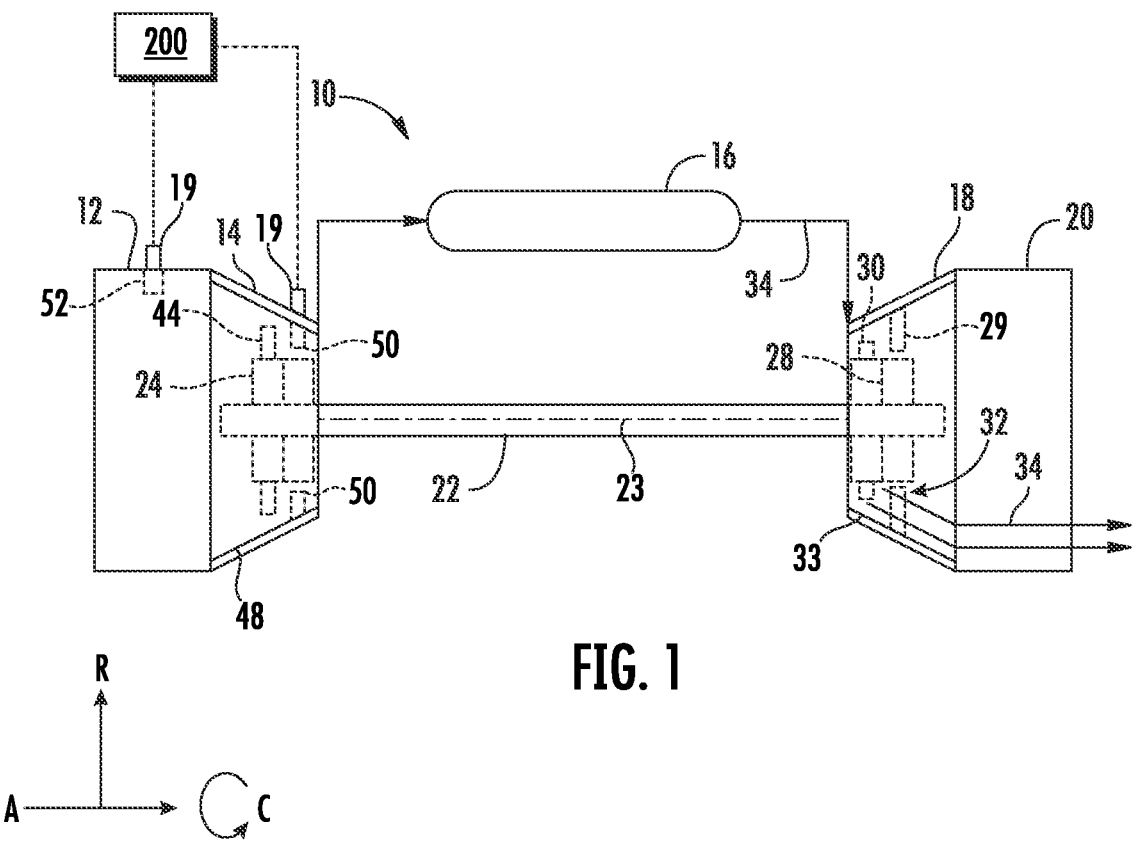
FIG. 1 is a schematic illustration of a turbomachine in accordance with embodiments of the present disclosure.

Reference now will be made in detail to embodiments of the present rotor blades and turbomachines, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. Terms of approximation, such as "generally," "substantially," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land based and/or industrial gas turbine unless otherwise specified in the claims. For example, the invention as described herein may be used in any type of turbomachine including but not limited to a steam turbine, an aircraft gas turbine, or a marine gas turbine.

As shown, gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The multi-stage axial compressor section or compressor section 14 may generally include a plurality of rotor disks 24 (one of which is shown) and a plurality of rotor blades 44 extending radially outwardly from and connected to each rotor disk 24. Each rotor disk 24 in turn may be coupled to or form a portion of the shaft 22 that extends through the compressor section 14. The compressor section 14 may further include one or more stator vanes 50 arranged circumferentially around the shaft 22. The stator vanes 27 may be fixed to a static casing or compressor casing 48 that extends circumferentially around the rotor blades 44.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes a turbine casing 33 that circumferentially surround the portion of the shaft 22 and the rotor blades 30, thereby at least partially defining a hot gas path 32 through the turbine section 18. The turbine casing 33 may be configured to support a plurality of stages of stationary nozzles 29 extending radially inwardly from the inner circumference of the turbine casing 33.

During operation, a working fluid such as air flows through the inlet section 12 and into the compressor section 14 where the air is progressively compressed, thus providing pressurized air to the combustors of the combustor section 16. The pressurized air is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
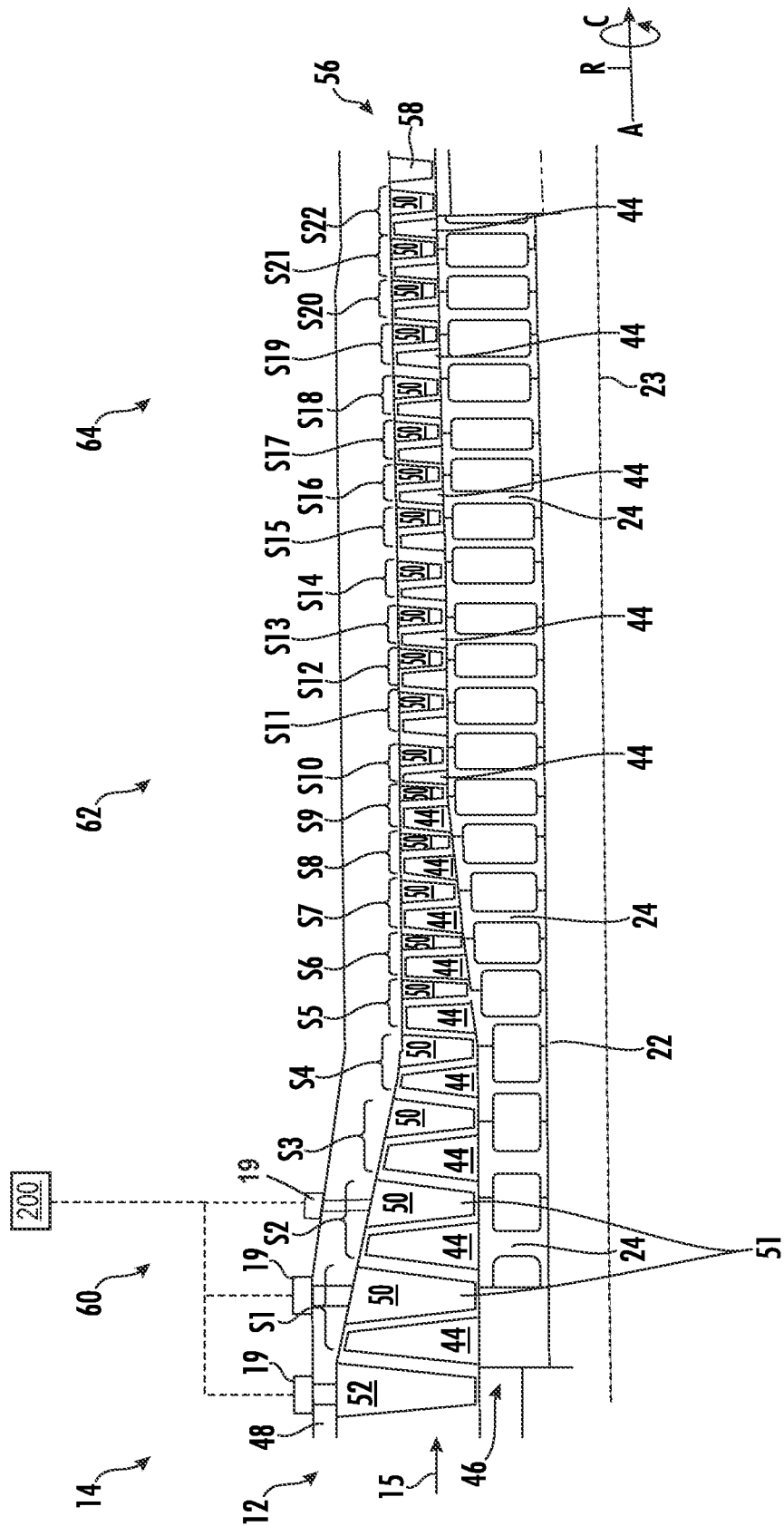
FIG. 2 illustrates a cross-sectional side view of a compressor section, in accordance with embodiments of the present disclosure.

FIG. 2 illustrates a cross-sectional side view of an embodiment of the compressor section 14 of the gas turbine 10 of FIG. 1, which is shown as a multi-stage axial compressor section 14, in accordance with embodiments of the present disclosure. As shown in FIGS. 1 and 2, the gas turbine 10 may define a cylindrical coordinate system. The cylindrical coordinate system may define an axial direction A (e.g., downstream direction) substantially parallel to and/ or along an axial centerline 23 of the gas turbine 10, a radial direction R perpendicular to the axial centerline or rotary axis 23, and a circumferential direction C extending around the axial centerline 23.

In operation, air 15 may enter the compressor section 14 in the axial direction A through the inlet section 12 and may be pressurized in the multi-stage axial compressor section 14. The compressed air may then be mixed with fuel for combustion within the combustor section 16 to drive the turbine section 18, which rotates the shaft 22 in the circumferential direction C and, thus, the multi-stage axial compressor section 14. The rotation of the shaft 22 also causes one or more rotor blades 44 (e.g., compressor rotor blades) within the multi-stage axial compressor section 14 to draw in and pressurize the air received by the inlet section 12.

The multi-stage axial compressor section 14 may include a rotor assembly 46 having a plurality of rotor disks 24. Rotor blades 44 may extend radially outward from the rotor disks 24. The entire rotor assembly 46 (e.g., rotor disks 24 and rotor blades 44) may rotate in the circumferential direction C during operation of the gas turbine 10. The rotor assembly 46 may be surrounded by a compressor casing 48. The compressor casing may be static or stationary, such that the rotor assembly 46 rotates relative to the compressor casing 48. Stator vanes 50 (e.g., variable stator vanes and/or fixed stator vanes) may extend radially inward from the compressor casing 48. As shown in FIG. 2, one or more stages of the stator vanes 50 may be variable stator vanes 51, such that an angle of the stator vane 50 may be selectively actuated (e.g., by a controller 200). For example, in the embodiments shown in FIG. 2, first two stages of the compressor section 14 may include variable stator vanes 51. In many embodiments, as shown, the rotor blades 44 and stator vanes 50 may be arranged in an alternating fashion, such that most of the rotor blades 44 are disposed between two stator vanes 50 in the axial direction A.

In some embodiments, the compressor casing 48 of the compressor section 14 or the inlet section 12 may have one or more sets of inlet guide vanes 52 (IGVs) (e.g., variable IGV stator vanes). The inlet guide vanes 52 may be mounted to the compressor casing 48, spaced apart from one another in the circumferential direction C, and may be operable to control the amount of air 15 that enters the compressor section 14. Additionally, an outlet 56 of the compressor section 14 may have a set of outlet guide vanes 58 (OGVs). The OGVs 58 may be mounted to the compressor casing 48, spaced apart from one another in the circumferential direction C, and may be operable to control the amount of air 15 that exits the compressor section 14.

In exemplary embodiments, as shown in FIG. 2, the variable stator vane 51 and the IGVs 52 may each be configured to vary its vane angle relative to the gas flow (e.g., air flow) by rotating the vane 51, 52 about an axis of rotation (e.g., radially oriented vane shaft). However, each variable stator vane 51 (including the IGVs 52) may be otherwise stationary relative to the rotor blades 44. In certain embodiments, the variable stator vanes 51 and the IGVs 52 may be coupled to an actuator 19 (e.g., electric drive, pneumatic drive, or hydraulic drive). The actuators 19 may be in operable communication (e.g., electrical communication) with a controller 200. The controller may be operable to selectively vary the vane angle. In other embodiments, all of the stator vanes 50 may be fixed, such that the stator vanes 50 are configured to remain in a fixed angular position (e.g., the vane angle does not vary).

The compressor section 14 may include a plurality of rows or stages arranged in a serial flow order, such as between 2 to 30, 2 to 25, 2 to 20, 2 to 14, or 2 to 10 rows or stages, or any specific number or range therebetween. Each stage may include a plurality of rotor blades 44 circumferentially spaced about the axial centerline 23 and a plurality of stator vanes 50 circumferentially spaced about the axial centerline 23. In each stage, the multi-stage axial compressor section 14 may include 2 to 1000, 5 to 500, or 10 to 100 of circumferentially arranged rotor blades 44, and 2 to 1000, 5 to 500, or 10 to 100 of circumferentially arranged stator vanes 50. In particular, the illustrated embodiment of the multi-stage axial compressor section 14 includes 22 stages (e.g., S1-S22).

It may be appreciated that each stage has a set of rotor blades 44 disposed at a first axial position and a set of stator vanes 50 disposed at a second axial position along the length of the compressor section 14. In other words, each stage has the rotor blades 44 and stator vanes 50 axially offset from one another, such that the compressor section 14 has an alternating arrangement of rotor blades 44 and stator vanes 50 one set after another along the length of the compressor section 14. Each set of rotor blades 44 extends (e.g., in a spaced arrangement) in the circumferential direction C about the shaft 22, and each set of stator vanes 50 extends (e.g., in a spaced arrangement) in the circumferential direction C within the compressor casing 48.

While the compressor section 14 may include greater or fewer stages than is illustrated, FIG. 2 illustrates an embodiment of the compressor section 14 having twenty two stages arranged in a serial flow order and identified as follows: first stage S1, second stage S2, third stage S3, fourth stage S4, fifth stage S5, sixth stage S6, seventh stage S7, eighth stage S8, ninth stage S9, tenth stage S10, eleventh stage S11, twelfth stage S12, thirteenth stage S13, and fourteenth stage S14, fifteenth stage S15, sixteenth stage S16, seventeenth stage S17, eighteenth stage S18, nineteenth stage S19, twentieth stage S20, twenty-first stage S21, and twenty-second stage S22. In certain embodiments, each stage may include rotor blades 44 and stator vanes 50 (e.g., fixed stator vanes 50 and/or variable stator vanes 51). As used herein, a rotor blade 44 disposed within one of the sections S1-S22 of the compressor section 14 may be referred to by whichever stage it is disposed within, e.g., "a first stage compressor rotor blade," "a second stage compressor rotor blade," "a third stage compressor rotor blade," etc.

In use, the rotor blades 44 may rotate circumferentially about the compressor casing 48 and the stator vanes 50. Rotation of the rotor blades 44 may result in air entering the inlet section 12. The air is then subsequently compressed as it traverses the various stages (e.g., first stage S1 to twenty-second stage S22) of the compressor section 14 and moves in the axial direction 38 downstream of the multi-stage axial compressor section 14. The compressed air may then exit through the outlet 56 of the multi-stage axial compressor section 14. As discussed above, the outlet 56 may have a set of outlet guide vanes 58 (OGVs). The compressed air that exits the compressor section 14 may be mixed with fuel, directed to the combustor section 16, directed to the turbine section 18, or elsewhere in the gas turbine 10.

TABLES I and II below each contain coordinate data that describes a respective airfoil shape (or surface profile). In exemplary embodiments, the airfoil shapes defined by each of TABLES I and II describe a rotor blade 44 and/or the stator vane 50 of the compressor section 14. In certain embodiments, the airfoil shapes defined by each of TABLES I and II describe an IGV 52 and/or an OGV 58 of the compressor section 14.

The IGV 52, the stages (e.g., S1-S22) of rotor blades 44 and stator vanes 50, and the OGV 58 of the compressor section 14 may be grouped into one or more sections or portions of the compressor section 14 for reference purposes. For the purposes of the grouping, portions the compressor section 14 may be expressed in terms of a percentage, such as a percentage of the compressor section 14 from the inlet (e.g., 0% of the compressor section 14) to the outlet (e.g., 100% of the compressor section 14) in the axial or downstream direction. In this way, the compressor section 14 may include, in a serial flow order, an early stage 60, a mid stage 62, and a late stage 64. In particular, the early stage 60 may include from approximately 0% to approximately 25% of the compressor section 14 (e.g., from the IGV 52 to about the fifth stage S5 or the sixth stage S6). The mid stage 62 may include from approximately 25% to approximately 75% of the compressor section 14 (e.g., from about the fifth stage S5 or the sixth stage S6 to about the sixteenth stage S16 or the seventeenth stage S17). The late stage 64 may include from approximately 75% to approximately 100% of the compressor section 14 (e.g., from about the sixteenth stage S16 or the seventeenth stage S17 to the OGV 58).

Accordingly, the Cartesian coordinate data contained within each of TABLES I and II may correspond to an airfoil shape of an airfoil 100 disposed within the late stage 64 of the compressor section 14.

For example, in exemplary embodiments, the Cartesian coordinate data contained within TABLE I may correspond to an airfoil shape of an airfoil 100 disposed on a rotor blade 44 within the nineteenth stage S19 of the compressor section 14. The Cartesian coordinate data contained within TABLE II may correspond to an airfoil shape of an airfoil 100 disposed on a rotor blade 44 within the twentieth stage S20 of the compressor section 14.

However, in various other embodiments, each of TABLES I and II may contain Cartesian coordinate data of an airfoil shape of an airfoil 100 that may be disposed on a rotor blade 44 or stator blade 50 in any stage S1-S22 of the compressor section 14. Accordingly, the airfoil shape defined by each of TABLES I and II should not be limited to any particular stage of the compressor section 14 unless specifically recited in the claims.

Figure 3:
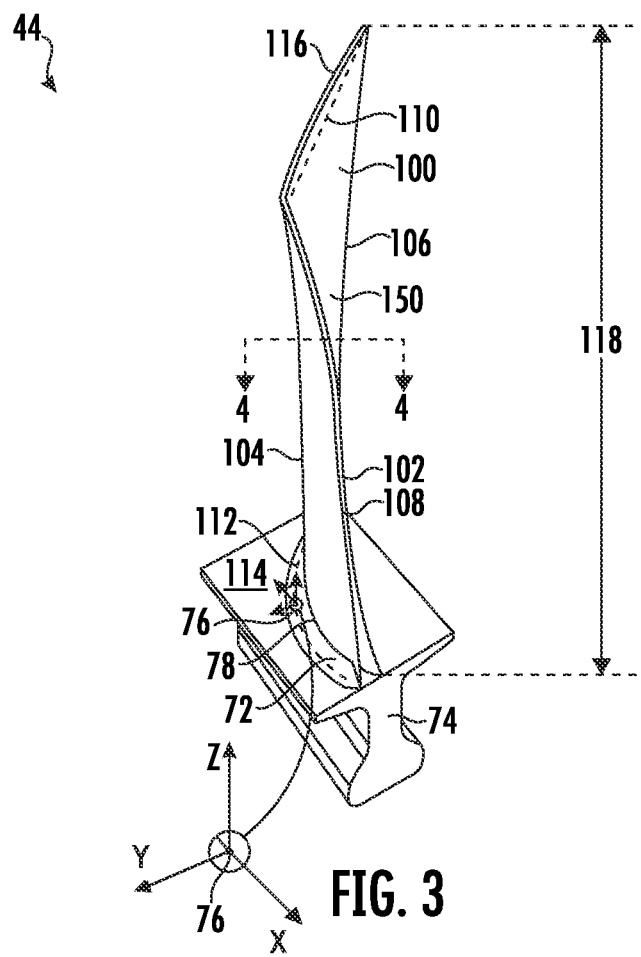
FIG. 3 illustrates a perspective view of a rotor blade, in accordance with embodiments of the present disclosure.

FIG. 3 illustrates a perspective view of a rotor blade 44, which may be incorporated in any stage (e.g., S1 through S22) of the compressor section 14, in accordance with embodiments of the present disclosure.

As shown, the rotor blade 44 includes an airfoil 100 defining an airfoil shape 150. The airfoil 100 includes a pressure-side surface or profile 102 and an opposing suction-side surface or profile 104. The pressure-side surface 102 and the suction-side surface 104 meet or intersect at a leading edge 106 and a trailing edge 108 of the airfoil 100. A chord line 110 extends between the leading edge 106 and the trailing edge 108 such that pressure and suction-side surfaces 102, 104 can be said to extend in chord or chord-wise between the leading edge 106 and the trailing edge 108. The leading and trailing edges, 106 and 108 respectively, may be described as the dividing or intersecting lines between the suction-side surface 104 and the pressure-side surface 102. In other words, the suction-side surface 104 and the pressure-side surface 102 couple together with one another along the leading edge 106 and the trailing edge 108, thereby defining an airfoil shaped cross-section that gradually changes lengthwise along the airfoil 100.

In operation, the rotor blades 44 rotate about an axial centerline 23 exerting a torque on a working fluid, such as air 15, thus increasing energy levels of the fluid as the working fluid traverses the various stages S1 through S22 of the multi-stage axial compressor section 14 on its way to the combustor 26. The rotor blades 44 may be adjacent (e.g., upstream and/or downstream) to the one or more stationary stator vanes 50. The stator vanes 50 slow the working fluid during rotation of the rotor blades 44, converting a circumferential component of movement of the working fluid flow into pressure. Accordingly, continuous rotation of the rotor blade 44 creates a continuous flow of compressed working fluid, suitable for combustion via the combustor 26.

As shown in FIG. 3, the airfoil 100 includes a root or first end 112, which intersects with and extends radially outwardly from a base or platform 114 of the rotor blade 44. The airfoil 100 terminates radially at a second end or radial tip 116 of the airfoil 100. The pressure-side and suction-side surfaces 102, 104 can be said to extend in span or in a span-wise direction 118 between the root 112 and/or the platform 114 and the radial tip 116 of the airfoil 100. In other words, each rotor blade 44 includes an airfoil 100 having opposing pressure-side and suction-side surfaces 102, 104 that extend in chord or chordwise 110 between opposing leading and trailing edges 106, 108 and that extend in span or span-wise 118 between the root 112 and the radial tip 116 of the airfoil 100.

In particular configurations, the airfoil 100 may include a fillet 72 formed between the platform 114 and the airfoil 100 proximate to the root 112. The fillet 72 can include a weld or braze fillet, which can be formed via conventional MIG welding, TIG welding, brazing, etc., and can include a profile that can reduce fluid dynamic losses as a result of the presence of fillet 72. In particular embodiments, the platform 114, the airfoil 100 and the fillet 72 can be formed as a single component, such as by casting and/or machining and/or additive manufacturing (such as 3D printing) and/or any other suitable technique now known or later developed and/or discovered.

In various implementations, the rotor blade 44 includes a mounting portion 74 (such as a dovetail joint), which is formed to connect and/or to secure the rotor blade 44 to the rotor disk 24. For example, the mounting portion 74 may include a T-shaped structure, a hook, one or more lateral protrusions, one or more lateral slots, or any combination thereof. The mounting portion 74 (e.g., dovetail joint) may be configured to mount into the rotor assembly 46 or the compressor casing 48 in an axial direction A, a radial direction R, and/or a circumferential direction C (e.g., into an axial slot or opening, a radial slot or opening, and/or a circumferential slot or opening).

An important term in this disclosure is "profile". The profile is the range of the variation between measured points on an airfoil surface and the ideal position listed in any one of TABLES I and II. The actual profile on a manufactured turbine rotor blade will be different than those in TABLES I and II, and the design is robust to this variation meaning that mechanical and aerodynamic function are not impaired. As noted above, a + or −5% profile tolerance is used herein. The X, Y and Z values are all non-dimensionalized relative to the airfoil height.

Figure 4:
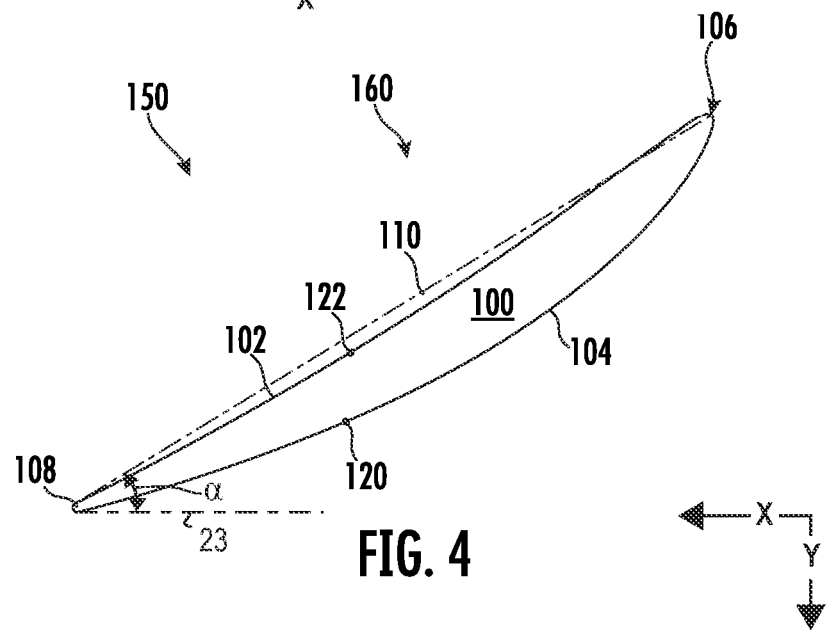
FIG. 4 illustrates an airfoil profile section of an airfoil from along the line 4-4 shown in FIG. 3, in accordance with embodiments of the present disclosure.

The airfoil 100 of the rotor blade 44 has a nominal profile at any cross-section taken between the platform 114 or the root 112 and the radial tip 116, e.g., such as the cross section shown in FIG. 4. A "nominal profile" is the range of variation between measured points on an airfoil surface and the ideal position listed in TABLES I and II. The actual profile on a manufactured compressor blade may be different from those in TABLES I and II (e.g., due to manufacturing tolerances), and the design is robust to this variation, meaning that mechanical and aerodynamic function are not impaired.

The Cartesian coordinate values of X, Y, and Z provided in each of TABLES I and II are dimensionless values scalable by a scaling factor, as measured in any given unit of distance (e.g., inches). For example, the X, Y, and Z values in each of TABLES I and II are set forth in non-dimensionalized units, and thus a variety of units of dimensions may be used when the values are appropriately scaled by a scaling factor. As one example only, the Cartesian coordinate values of X, Y and Z may be convertible to dimensional distances by multiplying the X, Y and Z values by a scaling factor. The scaling factor may be substantially equal to 1, greater than 1, or less than 1. For example, the Cartesian coordinate values of X, Y, and Z may be convertible to dimensional distances by multiplying the X, Y, and Z values by the scaling factor. The scaling factor, used to convert the non-dimensional values to dimensional distances, may be a fraction (e.g., ½, ¼, etc.), decimal fraction (e.g., 0.5, 1.5, 10.25, etc.), integer (e.g., 1, 2, 10, 100, etc.) or a mixed number (e.g., 1½, 10¼, etc.). The scaling factor may be a dimensional distance in any suitable format (e.g., inches, feet, millimeters, centimeters, etc.). In various embodiments, the scaling factor may be between about 0.01 inches and about 10 inches, such as between about 0.1 inches and about 10 inches, such as between about 0.1 inches and about 5 inches, such as between about 0.1 inches and about 3 inches, such as between about 0.1 inches and about 2 inches.

In various embodiments, the X, Y, and Z values in each of TABLES I and II may be scaled as a function of the same scaling factor (e.g., constant or number) to provide a scaled-up or a scaled-down airfoil. In some embodiments, the scaling factor may be different for each of TABLES I and II, such that each of the TABLES I and II has a unique scaling factor. In this way, each of TABLES I and II define the relationships between the respective X, Y, and Z coordinate values without specifying the units of measure (e.g., dimensional units) for the various airfoil 100 embodiments. Accordingly, while different scaling factors may be applied to the respective X, Y, and Z coordinate values of each of TABLES I and II to define different embodiments of the airfoil 100, each embodiment of the airfoil 100 regardless of the particular scaling factor is considered to be defined by the respective X, Y, and Z coordinate values TABLES I and II.

A gas turbine hot gas path requires airfoils that meet system requirements of aerodynamic and mechanical blade loading and efficiency. To define the airfoil shape of each compressor rotor blade airfoil, there is a unique set or loci of points in space that meet the stage requirements and that can be manufactured. This unique loci of points meet the requirements for stage efficiency and are arrived at by iteration between aerodynamic and mechanical loadings enabling the turbine to run in an efficient, safe and smooth manner. These points are unique and specific to the system.

The loci that define the compressor rotor blade airfoil shape include a set of points with X, Y and Z dimensions relative to a reference origin coordinate system. The Cartesian coordinate system of X, Y and Z values given in each of TABLES I and II below defines the airfoil shapes (which include the various airfoil profile sections) of an airfoil belonging to one or more compressor rotor blades or compressor stator vanes at various locations along its height (or along the span-wise direction 118).

Each of TABLES I and II list data for an uncoated airfoil at cold or room temperature. The envelope/tolerance for the coordinates is about +/−5% in a direction normal to any airfoil surface location and/or about +/−5% of the chord 110 in a direction nominal to any airfoil surface location. In other words, the airfoil layout, as embodied by the disclosure, is robust to this range of variation without impairment of mechanical and aerodynamic functions. As used herein, the term of approximation "substantially," when used in the phrase "substantially in accordance with Cartesian coordinate values of X, Y and Z set forth in TABLE I," refers to the envelope/tolerance for the coordinates (e.g., +/−5% in a direction normal to any airfoil surface location and/or about +/−5% of the chord 110 in a direction nominal to any airfoil surface location).

A point data origin 76 is defined at the base 114 of the airfoil 100. For example, the point data origin 76 may be defined at the root 112 of the airfoil 100. Particularly, in some embodiments, the point data origin 76 may be defined at the root 112 of the airfoil 100 at the intersection of a stacking axis (e.g., a radially extending axis) and the compressed air flowpath (e.g., a flowpath of air along the surface of the airfoil). In the embodiments presented in TABLES I and II below, the point data origin 76 is defined at a transition or intersection line 78 defined between the fillet 72 and the airfoil 100. The point data origin 76 corresponds to the non-dimensional Z value equal to 0.

As described above, the Cartesian coordinate system has orthogonally-related (e.g., mutually orthogonal) X, Y and Z axes. The X axis lies generally parallel to an axial centerline 23 of the shaft 22, i.e., the rotary axis, and a positive X coordinate value is axial toward an aft, i.e., outlet end of the gas turbine 10. The positive Y coordinate value extends in the direction from the pressure-side surface 102 to the suction-side surface 104 and the positive Z coordinate value is radially outwardly from the base 114 toward the radial tip 116 (e.g., generally parallel to the radial direction of the gas turbine).

By defining X and Y coordinate values at selected locations in a Z direction normal to the X. Y plane, an airfoil profile section 160 of the airfoil 100 of the rotor blade 44 may be defined at each Z distance along the length of the airfoil 100. By connecting the X and Y values with smooth continuing arcs, each airfoil profile section of the airfoil 100 at each distance Z may be fixed. The complete airfoil shape 150 may be determined by smoothly connecting the adjacent profile sections to one another.

The values of TABLES I and II are generated and shown to three decimal places for determining the airfoil shape 150 of the airfoil 100. As the rotor blade 44 heats up during operation of the gas turbine 10, surface stress and temperature will cause a change in the X, Y and Z values. Accordingly, the values for the various airfoil profile sections given in TABLES I and II define the "nominal" airfoil profile, that is, the profile of an uncoated airfoil at ambient, non-operating or non-hot conditions (e.g., room temperature).

There are typical manufacturing tolerances as well as coatings which must be accounted for in the actual profile of the airfoil 100. Each cross-section is joined smoothly with the other cross-sections to form the complete airfoil shape. It will therefore be appreciated that +/− typical manufacturing tolerances, i.e., +/− values, including any coating thicknesses, are additive to the X and Y values given in each of TABLES I and II below. Accordingly, a distance of +/−5% in a direction normal to any surface location along the airfoil profile defines an airfoil profile envelope for this particular rotor blade 44 airfoil design, i.e., a range of variation between measured points on the actual airfoil surface at nominal cold or room temperature and the ideal position of those points as given in each of TABLES I and II below at the same temperature. The data provided in each of TABLES I and II is scalable (i.e., by a uniform geometric scaling factor), and the geometry pertains to all aerodynamic scales, at, above and/or below 3000 RPM. The design of the airfoil 100 for rotor blade 44 is robust to this range of variation without impairment of mechanical and aerodynamic functions.

The airfoil 100 may include various airfoil profile sections along the span-wise direction 118. Each of the airfoil profile sections may be "stacked" on top of one another other along the Z direction, such that when connected with smooth continuous arcs, the complete airfoil shape 150 may be ascertained. For example, each airfoil profile section corresponds to Cartesian coordinate values of X, Y, and Z for a common Cartesian coordinate value of Z in each of TABLES I and II. Furthermore, adjacent airfoil profile sections correspond to the Cartesian coordinate values of X, Y, and Z for adjacent Cartesian coordinate values of Z in each of TABLES I and II.

For example, FIG. 4 illustrates an airfoil profile section 160 of an airfoil 100 from along the line 4-4 shown in FIG. 3, which may be representative of an airfoil profile section of the airfoil 100 at any span-wise location, in accordance with embodiments of the present disclosure. As should be appreciated, the airfoil shape 150 of the airfoil 100 may change or vary at each span-wise location (or at each Z value). In this way, a distinct airfoil profile section 160 may be defined at each position along the span-wise direction 118 (or at each Z value) of the airfoil 100. When the airfoil profile sections 160 at each span-wise location (e.g., at each Z value) of the airfoil 100 are connected together with smooth continuous lines, the complete airfoil shape 150 of the airfoil 100 may be defined or obtained.

A Cartesian coordinate system of X, Y, and Z values given in each of TABLES I and II below define respective suction side surfaces or profiles 104 and a pressure side surfaces or profiles 102 of the respective airfoils 100 at various locations along the span-wise direction 118 of the respective airfoils 100. For example, point 120 defines a first pair of suction side X and Y values at the Z value of the airfoil profile section 160 shown in FIG. 4 (line 4-4 shown in FIG. 3), while point 122 defines a second pair of pressure side X and Y values at the same Z value.

By defining X and Y coordinate values at selected locations in a Z direction normal to the X-Y plane, an airfoil profile section 160 of the airfoil 100 may be obtained at each of the selected Z value location (e.g., by connecting each X and Y coordinate value at a given Z value to adjacent X and Y coordinate values of that same Z value with smooth continuing arcs). At each Z value or location, the suction side profile 104 may joined to the pressure-side profile or surface 102, as shown in FIG. 4, to define the airfoil profile section 160. The airfoil shape 150 of the airfoil 100 may be determined by smoothly connecting the adjacent (e.g., "stacked") airfoil profile sections 160 to one another with smooth continuous arcs.

The values in each of TABLES I and II below are computer-generated and shown to three decimal places. However, certain values in TABLES I and II may be shown to less than three decimal places (e.g., 0, 1, or 2 decimal places), because the values are rounded to significant figures, the additional decimal places would merely show trailing zeroes, or a combination thereof. Accordingly, in certain embodiments, any values having less than three decimal places may be shown with trailing zeroes out to 1, 2, or 3 decimal places. Furthermore, in some embodiments and in view of manufacturing constraints, actual values useful for forming the airfoil 100 are may be considered valid to fewer than three decimal places for determining the airfoil shape 150 of the airfoil 100.

As will be appreciated, there are typical manufacturing tolerances which may be accounted for in the airfoil shape 150. Accordingly, the X, Y, and Z values given in each of TABLES I and II are for the airfoil shape 150 of a nominal airfoil. It will therefore be appreciated that plus or minus typical manufacturing tolerances are applicable to these X, Y, and Z values and that an airfoil 100 having a profile substantially in accordance with those values includes such tolerances.

As noted previously, the airfoil 100 may also be coated for protection against corrosion, erosion, wear, and oxidation after the airfoil 100 is manufactured, according to the values in any of TABLES I and II and within the tolerances explained above. For example, the coating region may include one or more corrosion resistant layers, erosion resistant layers, wear resistant layers, oxidation resistant or anti-oxidation layers, or any combination thereof. For example, in embodiments where the airfoil is measured in inches, an anti-corrosion coating may be provided with an average thickness t of 0.008 inches (0.20 mm), between 0.001 and 0.1 inches (between 0.025 and 2.5 mm), or between 0.0001 and 0.5 inches or more (between 0.0025 and 12.7 mm or more). For example, in certain embodiments, the coating may increase X and Y values of a suction side in any of TABLES I and II by no greater than approximately 3.5 mm along a first suction portion, a first pressure portion, or both. It is to be noted that additional anti-oxidation coatings may be provided, such as overcoats. The values provided in each of TABLES I and II exclude a coated region or coatings of the airfoil 100. In other words, these values correspond to the bare surface of the airfoil 100. The coated region may include one or more coating layers, surface treatments, or a combination thereof, over the bare surface of the airfoil 100.

TABLES I and II below each contain Cartesian coordinate data of an airfoil shape 150 of an airfoil 100, which may be incorporated into one of the compressor section 14 or the turbine section 18 of the gas turbine 10. For example, in many embodiments, TABLES I and II below each contain Cartesian coordinate data of an airfoil shape 150 of an airfoil 100 of a rotor blade 44, which is disposed in one of the early stage 60, the mid stage 62, or the late stage 64 of the compressor section 14 (such as in any one of stages S1-S22).

In exemplary embodiments, TABLE I below contains Cartesian coordinate data of an airfoil shape 150 of an airfoil 100 of a rotor blade 44, which is disposed in the late stage 64 of the compressor section 14. Specifically, TABLE I below contains Cartesian coordinate data of an airfoil shape 150 of an airfoil 100 of a rotor blade 44, which is disposed in the nineteenth stage S19 of the compressor section 14.

TABLE I

|   | Pressure Surface | | | Suction Surface | | |
| --- | --- | --- | --- | --- | --- | --- |
| N | X | Y | Z | X | Y | Z |
| 1 | −0.557 | −0.841 | 0.015 | 0.698 | 0.685 | 0.015 |
| 2 | −0.557 | −0.841 | 0.015 | 0.698 | 0.685 | 0.015 |
| 3 | −0.556 | −0.841 | 0.015 | 0.697 | 0.686 | 0.015 |
| 4 | −0.554 | −0.841 | 0.015 | 0.695 | 0.688 | 0.015 |
| 5 | −0.551 | −0.841 | 0.015 | 0.692 | 0.690 | 0.015 |
| 6 | −0.547 | −0.838 | 0.015 | 0.684 | 0.691 | 0.015 |
| 7 | −0.540 | −0.833 | 0.015 | 0.676 | 0.687 | 0.015 |
| 8 | −0.532 | −0.823 | 0.015 | 0.664 | 0.681 | 0.015 |
| 9 | −0.524 | −0.810 | 0.015 | 0.649 | 0.674 | 0.015 |
| 10 | −0.515 | −0.792 | 0.015 | 0.630 | 0.664 | 0.015 |
| 11 | −0.504 | −0.768 | 0.015 | 0.605 | 0.652 | 0.015 |
| 12 | −0.492 | −0.741 | 0.015 | 0.577 | 0.638 | 0.015 |
| 13 | −0.479 | −0.712 | 0.015 | 0.547 | 0.623 | 0.015 |
| 14 | −0.464 | −0.679 | 0.015 | 0.515 | 0.606 | 0.015 |
| 15 | −0.445 | −0.644 | 0.015 | 0.479 | 0.587 | 0.015 |
| 16 | −0.424 | −0.605 | 0.015 | 0.438 | 0.565 | 0.015 |
| 17 | −0.401 | −0.566 | 0.015 | 0.395 | 0.542 | 0.015 |
| 18 | −0.375 | −0.525 | 0.015 | 0.351 | 0.517 | 0.015 |
| 19 | −0.348 | −0.483 | 0.015 | 0.305 | 0.490 | 0.015 |
| 20 | −0.319 | −0.440 | 0.015 | 0.258 | 0.462 | 0.015 |
| 21 | −0.289 | −0.395 | 0.015 | 0.209 | 0.431 | 0.015 |
| 22 | −0.257 | −0.350 | 0.015 | 0.160 | 0.399 | 0.015 |
| 23 | −0.223 | −0.303 | 0.015 | 0.109 | 0.364 | 0.015 |
| 24 | −0.187 | −0.254 | 0.015 | 0.058 | 0.326 | 0.015 |
| 25 | −0.151 | −0.207 | 0.015 | 0.007 | 0.288 | 0.015 |
| 26 | −0.114 | −0.159 | 0.015 | −0.042 | 0.248 | 0.015 |
| 27 | −0.077 | −0.113 | 0.015 | −0.090 | 0.206 | 0.015 |
| 28 | −0.039 | −0.066 | 0.015 | −0.137 | 0.162 | 0.015 |
| 29 | −0.001 | −0.020 | 0.015 | −0.181 | 0.117 | 0.015 |
| 30 | 0.038 | 0.026 | 0.015 | −0.223 | 0.069 | 0.015 |
| 31 | 0.077 | 0.071 | 0.015 | −0.263 | 0.020 | 0.015 |
| 32 | 0.116 | 0.116 | 0.015 | −0.300 | −0.032 | 0.015 |
| 33 | 0.157 | 0.161 | 0.015 | −0.336 | −0.085 | 0.015 |
| 34 | 0.198 | 0.204 | 0.015 | −0.368 | −0.139 | 0.015 |
| 35 | 0.240 | 0.247 | 0.015 | −0.399 | −0.195 | 0.015 |
| 36 | 0.281 | 0.288 | 0.015 | −0.425 | −0.251 | 0.015 |
| 37 | 0.321 | 0.327 | 0.015 | −0.449 | −0.305 | 0.015 |
| 38 | 0.360 | 0.364 | 0.015 | −0.469 | −0.359 | 0.015 |
| 39 | 0.398 | 0.400 | 0.015 | −0.487 | −0.411 | 0.015 |
| 40 | 0.435 | 0.434 | 0.015 | −0.502 | −0.462 | 0.015 |

TABLE I-continued

| | Pressure Surface | | | Suction Surface | | | | | Pressure Surface | | | Suction Surface | | |
|---|---|---|---|---|---|---|---|---|---|---|---|---|---|---|
| N | X | Y | Z | X | Y | Z | | N | X | Y | Z | X | Y | Z |
| 41 | 0.470 | 0.466 | 0.015 | −0.515 | −0.511 | 0.015 | | 117 | −0.516 | −0.764 | 0.265 | 0.744 | 0.687 | 0.265 |
| 42 | 0.504 | 0.497 | 0.015 | −0.527 | −0.558 | 0.015 | | 118 | −0.512 | −0.762 | 0.265 | 0.737 | 0.688 | 0.265 |
| 43 | 0.537 | 0.526 | 0.015 | −0.537 | −0.604 | 0.015 | | 119 | −0.505 | −0.757 | 0.265 | 0.728 | 0.684 | 0.265 |
| 44 | 0.565 | 0.552 | 0.015 | −0.545 | −0.645 | 0.015 | | 120 | −0.496 | −0.749 | 0.265 | 0.718 | 0.678 | 0.265 |
| 45 | 0.591 | 0.574 | 0.015 | −0.553 | −0.683 | 0.015 | | 121 | −0.486 | −0.737 | 0.265 | 0.703 | 0.671 | 0.265 |
| 46 | 0.615 | 0.595 | 0.015 | −0.559 | −0.716 | 0.015 | | 122 | −0.475 | −0.721 | 0.265 | 0.686 | 0.661 | 0.265 |
| 47 | 0.637 | 0.615 | 0.015 | −0.565 | −0.747 | 0.015 | | 123 | −0.462 | −0.700 | 0.265 | 0.662 | 0.648 | 0.265 |
| 48 | 0.656 | 0.632 | 0.015 | −0.569 | −0.775 | 0.015 | | 124 | −0.447 | −0.675 | 0.265 | 0.636 | 0.633 | 0.265 |
| 49 | 0.671 | 0.646 | 0.015 | −0.571 | −0.796 | 0.015 | | 125 | −0.430 | −0.649 | 0.265 | 0.607 | 0.617 | 0.265 |
| 50 | 0.683 | 0.656 | 0.015 | −0.571 | −0.813 | 0.015 | | 126 | −0.411 | −0.620 | 0.265 | 0.577 | 0.600 | 0.265 |
| 51 | 0.692 | 0.664 | 0.015 | −0.569 | −0.825 | 0.015 | | 127 | −0.388 | −0.588 | 0.265 | 0.544 | 0.581 | 0.265 |
| 52 | 0.698 | 0.671 | 0.015 | −0.566 | −0.834 | 0.015 | | 128 | −0.364 | −0.553 | 0.265 | 0.505 | 0.558 | 0.265 |
| 53 | 0.700 | 0.677 | 0.015 | −0.562 | −0.838 | 0.015 | | 129 | −0.337 | −0.517 | 0.265 | 0.464 | 0.534 | 0.265 |
| 54 | 0.700 | 0.681 | 0.015 | −0.560 | −0.840 | 0.015 | | 130 | −0.309 | −0.480 | 0.265 | 0.422 | 0.509 | 0.265 |
| 55 | 0.699 | 0.684 | 0.015 | −0.558 | −0.841 | 0.015 | | 131 | −0.280 | −0.442 | 0.265 | 0.379 | 0.483 | 0.265 |
| 56 | 0.698 | 0.684 | 0.015 | −0.557 | −0.841 | 0.015 | | 132 | −0.248 | −0.402 | 0.265 | 0.334 | 0.455 | 0.265 |
| 57 | −0.543 | −0.808 | 0.116 | 0.719 | 0.683 | 0.116 | | 133 | −0.216 | −0.361 | 0.265 | 0.287 | 0.425 | 0.265 |
| 58 | −0.543 | −0.808 | 0.116 | 0.719 | 0.683 | 0.116 | | 134 | −0.182 | −0.318 | 0.265 | 0.240 | 0.394 | 0.265 |
| 59 | −0.542 | −0.808 | 0.116 | 0.718 | 0.684 | 0.116 | | 135 | −0.147 | −0.275 | 0.265 | 0.191 | 0.360 | 0.265 |
| 60 | −0.540 | −0.808 | 0.116 | 0.716 | 0.686 | 0.116 | | 136 | −0.110 | −0.230 | 0.265 | 0.141 | 0.325 | 0.265 |
| 61 | −0.537 | −0.808 | 0.116 | 0.712 | 0.688 | 0.116 | | 137 | −0.073 | −0.185 | 0.265 | 0.092 | 0.288 | 0.265 |
| 62 | −0.533 | −0.806 | 0.116 | 0.705 | 0.689 | 0.116 | | 138 | −0.036 | −0.140 | 0.265 | 0.044 | 0.250 | 0.265 |
| 63 | −0.526 | −0.800 | 0.116 | 0.697 | 0.685 | 0.116 | | 139 | 0.002 | −0.096 | 0.265 | −0.003 | 0.211 | 0.265 |
| 64 | −0.518 | −0.791 | 0.116 | 0.686 | 0.679 | 0.116 | | 140 | 0.040 | −0.052 | 0.265 | −0.049 | 0.171 | 0.265 |
| 65 | −0.509 | −0.778 | 0.116 | 0.671 | 0.672 | 0.116 | | 141 | 0.078 | −0.008 | 0.265 | −0.093 | 0.129 | 0.265 |
| 66 | −0.499 | −0.761 | 0.116 | 0.652 | 0.662 | 0.116 | | 142 | 0.116 | 0.036 | 0.265 | −0.136 | 0.085 | 0.265 |
| 67 | −0.488 | −0.738 | 0.116 | 0.628 | 0.650 | 0.116 | | 143 | 0.155 | 0.079 | 0.265 | −0.177 | 0.040 | 0.265 |
| 68 | −0.475 | −0.712 | 0.116 | 0.600 | 0.636 | 0.116 | | 144 | 0.194 | 0.122 | 0.265 | −0.217 | −0.007 | 0.265 |
| 69 | −0.461 | −0.684 | 0.116 | 0.570 | 0.620 | 0.116 | | 145 | 0.234 | 0.165 | 0.265 | −0.254 | −0.055 | 0.265 |
| 70 | −0.444 | −0.653 | 0.116 | 0.539 | 0.604 | 0.116 | | 146 | 0.274 | 0.207 | 0.265 | −0.290 | −0.105 | 0.265 |
| 71 | −0.424 | −0.619 | 0.116 | 0.504 | 0.585 | 0.116 | | 147 | 0.315 | 0.249 | 0.265 | −0.324 | −0.156 | 0.265 |
| 72 | −0.401 | −0.582 | 0.116 | 0.464 | 0.563 | 0.116 | | 148 | 0.354 | 0.289 | 0.265 | −0.354 | −0.206 | 0.265 |
| 73 | −0.376 | −0.544 | 0.116 | 0.422 | 0.540 | 0.116 | | 149 | 0.392 | 0.327 | 0.265 | −0.381 | −0.257 | 0.265 |
| 74 | −0.350 | −0.504 | 0.116 | 0.378 | 0.515 | 0.116 | | 150 | 0.429 | 0.364 | 0.265 | −0.405 | −0.306 | 0.265 |
| 75 | −0.322 | −0.464 | 0.116 | 0.333 | 0.488 | 0.116 | | 151 | 0.466 | 0.400 | 0.265 | −0.427 | −0.355 | 0.265 |
| 76 | −0.292 | −0.422 | 0.116 | 0.287 | 0.461 | 0.116 | | 152 | 0.500 | 0.433 | 0.265 | −0.445 | −0.402 | 0.265 |
| 77 | −0.260 | −0.379 | 0.116 | 0.239 | 0.431 | 0.116 | | 153 | 0.534 | 0.465 | 0.265 | −0.462 | −0.448 | 0.265 |
| 78 | −0.228 | −0.335 | 0.116 | 0.190 | 0.399 | 0.116 | | 154 | 0.567 | 0.496 | 0.265 | −0.476 | −0.493 | 0.265 |
| 79 | −0.193 | −0.289 | 0.116 | 0.140 | 0.365 | 0.116 | | 155 | 0.598 | 0.525 | 0.265 | −0.489 | −0.536 | 0.265 |
| 80 | −0.157 | −0.242 | 0.116 | 0.089 | 0.328 | 0.116 | | 156 | 0.625 | 0.550 | 0.265 | −0.500 | −0.575 | 0.265 |
| 81 | −0.121 | −0.196 | 0.116 | 0.039 | 0.291 | 0.116 | | 157 | 0.649 | 0.573 | 0.265 | −0.509 | −0.610 | 0.265 |
| 82 | −0.084 | −0.150 | 0.116 | −0.010 | 0.252 | 0.116 | | 158 | 0.672 | 0.594 | 0.265 | −0.517 | −0.642 | 0.265 |
| 83 | −0.046 | −0.104 | 0.116 | −0.057 | 0.211 | 0.116 | | 159 | 0.693 | 0.614 | 0.265 | −0.524 | −0.672 | 0.265 |
| 84 | −0.008 | −0.059 | 0.116 | −0.104 | 0.169 | 0.116 | | 160 | 0.711 | 0.631 | 0.265 | −0.529 | −0.698 | 0.265 |
| 85 | 0.030 | −0.013 | 0.116 | −0.148 | 0.125 | 0.116 | | 161 | 0.726 | 0.644 | 0.265 | −0.532 | −0.718 | 0.265 |
| 86 | 0.068 | 0.032 | 0.116 | −0.191 | 0.079 | 0.116 | | 162 | 0.737 | 0.654 | 0.265 | −0.533 | −0.734 | 0.265 |
| 87 | 0.107 | 0.076 | 0.116 | −0.231 | 0.031 | 0.116 | | 163 | 0.746 | 0.662 | 0.265 | −0.532 | −0.747 | 0.265 |
| 88 | 0.147 | 0.120 | 0.116 | −0.269 | −0.019 | 0.116 | | 164 | 0.751 | 0.669 | 0.265 | −0.530 | −0.755 | 0.265 |
| 89 | 0.187 | 0.164 | 0.116 | −0.305 | −0.070 | 0.116 | | 165 | 0.753 | 0.675 | 0.265 | −0.527 | −0.760 | 0.265 |
| 90 | 0.228 | 0.206 | 0.116 | −0.339 | −0.122 | 0.116 | | 166 | 0.752 | 0.679 | 0.265 | −0.525 | −0.762 | 0.265 |
| 91 | 0.269 | 0.249 | 0.116 | −0.371 | −0.177 | 0.116 | | 167 | 0.751 | 0.681 | 0.265 | −0.523 | −0.763 | 0.265 |
| 92 | 0.309 | 0.289 | 0.116 | −0.399 | −0.230 | 0.116 | | 168 | 0.750 | 0.682 | 0.265 | −0.523 | −0.763 | 0.265 |
| 93 | 0.349 | 0.328 | 0.116 | −0.424 | −0.283 | 0.116 | | 169 | −0.503 | −0.735 | 0.406 | 0.768 | 0.693 | 0.406 |
| 94 | 0.387 | 0.365 | 0.116 | −0.445 | −0.335 | 0.116 | | 170 | −0.502 | −0.735 | 0.406 | 0.767 | 0.693 | 0.406 |
| 95 | 0.424 | 0.400 | 0.116 | −0.464 | −0.386 | 0.116 | | 171 | −0.502 | −0.735 | 0.406 | 0.767 | 0.694 | 0.406 |
| 96 | 0.460 | 0.434 | 0.116 | −0.480 | −0.435 | 0.116 | | 172 | −0.500 | −0.736 | 0.406 | 0.765 | 0.695 | 0.406 |
| 97 | 0.495 | 0.466 | 0.116 | −0.495 | −0.484 | 0.116 | | 173 | −0.497 | −0.735 | 0.406 | 0.761 | 0.697 | 0.406 |
| 98 | 0.529 | 0.496 | 0.116 | −0.507 | −0.530 | 0.116 | | 174 | −0.492 | −0.734 | 0.406 | 0.754 | 0.697 | 0.406 |
| 99 | 0.561 | 0.526 | 0.116 | −0.518 | −0.574 | 0.116 | | 175 | −0.485 | −0.730 | 0.406 | 0.746 | 0.693 | 0.406 |
| 100 | 0.589 | 0.551 | 0.116 | −0.527 | −0.615 | 0.116 | | 176 | −0.476 | −0.722 | 0.406 | 0.736 | 0.687 | 0.406 |
| 101 | 0.614 | 0.573 | 0.116 | −0.536 | −0.652 | 0.116 | | 177 | −0.466 | −0.711 | 0.406 | 0.723 | 0.679 | 0.406 |
| 102 | 0.637 | 0.594 | 0.116 | −0.542 | −0.684 | 0.116 | | 178 | −0.453 | −0.696 | 0.406 | 0.706 | 0.668 | 0.406 |
| 103 | 0.659 | 0.614 | 0.116 | −0.549 | −0.715 | 0.116 | | 179 | −0.438 | −0.676 | 0.406 | 0.684 | 0.654 | 0.406 |
| 104 | 0.678 | 0.631 | 0.116 | −0.553 | −0.742 | 0.116 | | 180 | −0.421 | −0.653 | 0.406 | 0.658 | 0.638 | 0.406 |
| 105 | 0.693 | 0.644 | 0.116 | −0.556 | −0.763 | 0.116 | | 181 | −0.403 | −0.629 | 0.406 | 0.631 | 0.621 | 0.406 |
| 106 | 0.705 | 0.654 | 0.116 | −0.556 | −0.779 | 0.116 | | 182 | −0.382 | −0.601 | 0.406 | 0.602 | 0.603 | 0.406 |
| 107 | 0.714 | 0.662 | 0.116 | −0.554 | −0.792 | 0.116 | | 183 | −0.358 | −0.571 | 0.406 | 0.570 | 0.582 | 0.406 |
| 108 | 0.720 | 0.669 | 0.116 | −0.551 | −0.801 | 0.116 | | 184 | −0.332 | −0.538 | 0.406 | 0.533 | 0.558 | 0.406 |
| 109 | 0.721 | 0.675 | 0.116 | −0.548 | −0.805 | 0.116 | | 185 | −0.304 | −0.503 | 0.406 | 0.495 | 0.533 | 0.406 |
| 110 | 0.721 | 0.679 | 0.116 | −0.546 | −0.807 | 0.116 | | 186 | −0.276 | −0.467 | 0.406 | 0.455 | 0.507 | 0.406 |
| 111 | 0.720 | 0.681 | 0.116 | −0.544 | −0.808 | 0.116 | | 187 | −0.245 | −0.430 | 0.406 | 0.413 | 0.479 | 0.406 |
| 112 | 0.719 | 0.682 | 0.116 | −0.544 | −0.808 | 0.116 | | 188 | −0.213 | −0.391 | 0.406 | 0.370 | 0.450 | 0.406 |
| 113 | −0.522 | −0.763 | 0.265 | 0.750 | 0.682 | 0.265 | | 189 | −0.180 | −0.351 | 0.406 | 0.325 | 0.420 | 0.406 |
| 114 | −0.522 | −0.763 | 0.265 | 0.750 | 0.683 | 0.265 | | 190 | −0.146 | −0.310 | 0.406 | 0.279 | 0.388 | 0.406 |
| 115 | −0.521 | −0.764 | 0.265 | 0.749 | 0.684 | 0.265 | | 191 | −0.110 | −0.267 | 0.406 | 0.232 | 0.354 | 0.406 |
| 116 | −0.519 | −0.764 | 0.265 | 0.747 | 0.685 | 0.265 | | 192 | −0.073 | −0.223 | 0.406 | 0.184 | 0.318 | 0.406 |

TABLE I-continued

| | Pressure Surface | | | Suction Surface | | |
|---|---|---|---|---|---|---|
| N | X | Y | Z | X | Y | Z |
| 193 | −0.036 | −0.179 | 0.406 | 0.136 | 0.281 | 0.406 |
| 194 | 0.001 | −0.135 | 0.406 | 0.090 | 0.244 | 0.406 |
| 195 | 0.039 | −0.091 | 0.406 | 0.044 | 0.205 | 0.406 |
| 196 | 0.076 | −0.047 | 0.406 | −0.001 | 0.166 | 0.406 |
| 197 | 0.114 | −0.004 | 0.406 | −0.045 | 0.125 | 0.406 |
| 198 | 0.152 | 0.039 | 0.406 | −0.088 | 0.082 | 0.406 |
| 199 | 0.191 | 0.082 | 0.406 | −0.129 | 0.039 | 0.406 |
| 200 | 0.229 | 0.125 | 0.406 | −0.169 | −0.006 | 0.406 |
| 201 | 0.268 | 0.168 | 0.406 | −0.208 | −0.052 | 0.406 |
| 202 | 0.308 | 0.210 | 0.406 | −0.244 | −0.100 | 0.406 |
| 203 | 0.347 | 0.252 | 0.406 | −0.279 | −0.149 | 0.406 |
| 204 | 0.385 | 0.293 | 0.406 | −0.311 | −0.197 | 0.406 |
| 205 | 0.423 | 0.331 | 0.406 | −0.339 | −0.245 | 0.406 |
| 206 | 0.459 | 0.369 | 0.406 | −0.366 | −0.292 | 0.406 |
| 207 | 0.494 | 0.404 | 0.406 | −0.389 | −0.339 | 0.406 |
| 208 | 0.527 | 0.439 | 0.406 | −0.410 | −0.384 | 0.406 |
| 209 | 0.560 | 0.471 | 0.406 | −0.429 | −0.429 | 0.406 |
| 210 | 0.591 | 0.503 | 0.406 | −0.446 | −0.471 | 0.406 |
| 211 | 0.621 | 0.532 | 0.406 | −0.461 | −0.513 | 0.406 |
| 212 | 0.647 | 0.558 | 0.406 | −0.473 | −0.551 | 0.406 |
| 213 | 0.671 | 0.581 | 0.406 | −0.484 | −0.585 | 0.406 |
| 214 | 0.693 | 0.602 | 0.406 | −0.493 | −0.616 | 0.406 |
| 215 | 0.713 | 0.622 | 0.406 | −0.500 | −0.645 | 0.406 |
| 216 | 0.731 | 0.640 | 0.406 | −0.507 | −0.670 | 0.406 |
| 217 | 0.745 | 0.653 | 0.406 | −0.510 | −0.690 | 0.406 |
| 218 | 0.756 | 0.664 | 0.406 | −0.512 | −0.706 | 0.406 |
| 219 | 0.764 | 0.672 | 0.406 | −0.511 | −0.718 | 0.406 |
| 220 | 0.769 | 0.679 | 0.406 | −0.509 | −0.727 | 0.406 |
| 221 | 0.770 | 0.685 | 0.406 | −0.507 | −0.731 | 0.406 |
| 222 | 0.769 | 0.689 | 0.406 | −0.505 | −0.733 | 0.406 |
| 223 | 0.768 | 0.691 | 0.406 | −0.504 | −0.734 | 0.406 |
| 224 | 0.768 | 0.692 | 0.406 | −0.503 | −0.735 | 0.406 |
| 225 | −0.488 | −0.740 | 0.644 | 0.771 | 0.738 | 0.644 |
| 226 | −0.488 | −0.740 | 0.644 | 0.771 | 0.738 | 0.644 |
| 227 | −0.487 | −0.740 | 0.644 | 0.770 | 0.739 | 0.644 |
| 228 | −0.486 | −0.740 | 0.644 | 0.768 | 0.740 | 0.644 |
| 229 | −0.483 | −0.741 | 0.644 | 0.764 | 0.742 | 0.644 |
| 230 | −0.478 | −0.740 | 0.644 | 0.757 | 0.741 | 0.644 |
| 231 | −0.470 | −0.736 | 0.644 | 0.750 | 0.736 | 0.644 |
| 232 | −0.460 | −0.729 | 0.644 | 0.741 | 0.729 | 0.644 |
| 233 | −0.449 | −0.718 | 0.644 | 0.728 | 0.719 | 0.644 |
| 234 | −0.435 | −0.704 | 0.644 | 0.713 | 0.706 | 0.644 |
| 235 | −0.419 | −0.685 | 0.644 | 0.693 | 0.690 | 0.644 |
| 236 | −0.400 | −0.663 | 0.644 | 0.669 | 0.671 | 0.644 |
| 237 | −0.380 | −0.639 | 0.644 | 0.644 | 0.651 | 0.644 |
| 238 | −0.357 | −0.612 | 0.644 | 0.618 | 0.630 | 0.644 |
| 239 | −0.332 | −0.582 | 0.644 | 0.589 | 0.606 | 0.644 |
| 240 | −0.305 | −0.549 | 0.644 | 0.554 | 0.578 | 0.644 |
| 241 | −0.276 | −0.514 | 0.644 | 0.519 | 0.549 | 0.644 |
| 242 | −0.246 | −0.478 | 0.644 | 0.481 | 0.519 | 0.644 |
| 243 | −0.215 | −0.440 | 0.644 | 0.443 | 0.487 | 0.644 |
| 244 | −0.183 | −0.401 | 0.644 | 0.403 | 0.454 | 0.644 |
| 245 | −0.149 | −0.360 | 0.644 | 0.361 | 0.420 | 0.644 |
| 246 | −0.115 | −0.318 | 0.644 | 0.318 | 0.384 | 0.644 |
| 247 | −0.079 | −0.275 | 0.644 | 0.274 | 0.346 | 0.644 |
| 248 | −0.041 | −0.229 | 0.644 | 0.229 | 0.307 | 0.644 |
| 249 | −0.004 | −0.184 | 0.644 | 0.184 | 0.267 | 0.644 |
| 250 | 0.033 | −0.139 | 0.644 | 0.140 | 0.227 | 0.644 |
| 251 | 0.070 | −0.093 | 0.644 | 0.096 | 0.186 | 0.644 |
| 252 | 0.107 | −0.048 | 0.644 | 0.053 | 0.145 | 0.644 |
| 253 | 0.145 | −0.003 | 0.644 | 0.010 | 0.103 | 0.644 |
| 254 | 0.182 | 0.042 | 0.644 | −0.032 | 0.060 | 0.644 |
| 255 | 0.219 | 0.087 | 0.644 | −0.072 | 0.016 | 0.644 |
| 256 | 0.257 | 0.132 | 0.644 | −0.112 | −0.029 | 0.644 |
| 257 | 0.295 | 0.177 | 0.644 | −0.151 | −0.075 | 0.644 |
| 258 | 0.333 | 0.222 | 0.644 | −0.188 | −0.122 | 0.644 |
| 259 | 0.371 | 0.266 | 0.644 | −0.224 | −0.170 | 0.644 |
| 260 | 0.408 | 0.309 | 0.644 | −0.258 | −0.217 | 0.644 |
| 261 | 0.443 | 0.351 | 0.644 | −0.289 | −0.264 | 0.644 |
| 262 | 0.478 | 0.390 | 0.644 | −0.317 | −0.309 | 0.644 |
| 263 | 0.512 | 0.429 | 0.644 | −0.344 | −0.354 | 0.644 |
| 264 | 0.544 | 0.465 | 0.644 | −0.368 | −0.398 | 0.644 |
| 265 | 0.575 | 0.500 | 0.644 | −0.390 | −0.440 | 0.644 |
| 266 | 0.605 | 0.534 | 0.644 | −0.410 | −0.482 | 0.644 |
| 267 | 0.633 | 0.566 | 0.644 | −0.429 | −0.522 | 0.644 |
| 268 | 0.658 | 0.594 | 0.644 | −0.444 | −0.558 | 0.644 |
| 269 | 0.680 | 0.618 | 0.644 | −0.458 | −0.592 | 0.644 |
| 270 | 0.701 | 0.642 | 0.644 | −0.469 | −0.622 | 0.644 |
| 271 | 0.721 | 0.663 | 0.644 | −0.479 | −0.650 | 0.644 |
| 272 | 0.738 | 0.682 | 0.644 | −0.487 | −0.675 | 0.644 |
| 273 | 0.751 | 0.697 | 0.644 | −0.492 | −0.694 | 0.644 |
| 274 | 0.761 | 0.708 | 0.644 | −0.495 | −0.710 | 0.644 |
| 275 | 0.769 | 0.717 | 0.644 | −0.495 | −0.722 | 0.644 |
| 276 | 0.774 | 0.724 | 0.644 | −0.494 | −0.731 | 0.644 |
| 277 | 0.775 | 0.731 | 0.644 | −0.492 | −0.735 | 0.644 |
| 278 | 0.773 | 0.735 | 0.644 | −0.491 | −0.738 | 0.644 |
| 279 | 0.772 | 0.737 | 0.644 | −0.489 | −0.739 | 0.644 |
| 280 | 0.772 | 0.737 | 0.644 | −0.489 | −0.739 | 0.644 |
| 281 | −0.492 | −0.790 | 0.931 | 0.745 | 0.831 | 0.931 |
| 282 | −0.492 | −0.790 | 0.931 | 0.744 | 0.831 | 0.931 |
| 283 | −0.491 | −0.790 | 0.931 | 0.743 | 0.832 | 0.931 |
| 284 | −0.489 | −0.791 | 0.931 | 0.741 | 0.833 | 0.931 |
| 285 | −0.486 | −0.791 | 0.931 | 0.737 | 0.834 | 0.931 |
| 286 | −0.481 | −0.789 | 0.931 | 0.730 | 0.833 | 0.931 |
| 287 | −0.473 | −0.785 | 0.931 | 0.723 | 0.827 | 0.931 |
| 288 | −0.463 | −0.778 | 0.931 | 0.714 | 0.818 | 0.931 |
| 289 | −0.451 | −0.767 | 0.931 | 0.703 | 0.806 | 0.931 |
| 290 | −0.437 | −0.752 | 0.931 | 0.688 | 0.791 | 0.931 |
| 291 | −0.420 | −0.731 | 0.931 | 0.669 | 0.772 | 0.931 |
| 292 | −0.401 | −0.707 | 0.931 | 0.647 | 0.750 | 0.931 |
| 293 | −0.381 | −0.681 | 0.931 | 0.624 | 0.726 | 0.931 |
| 294 | −0.358 | −0.652 | 0.931 | 0.599 | 0.701 | 0.931 |
| 295 | −0.333 | −0.620 | 0.931 | 0.571 | 0.673 | 0.931 |
| 296 | −0.305 | −0.584 | 0.931 | 0.539 | 0.641 | 0.931 |
| 297 | −0.277 | −0.546 | 0.931 | 0.505 | 0.607 | 0.931 |
| 298 | −0.247 | −0.507 | 0.931 | 0.471 | 0.571 | 0.931 |
| 299 | −0.216 | −0.466 | 0.931 | 0.434 | 0.534 | 0.931 |
| 300 | −0.184 | −0.424 | 0.931 | 0.396 | 0.496 | 0.931 |
| 301 | −0.151 | −0.379 | 0.931 | 0.357 | 0.455 | 0.931 |
| 302 | −0.117 | −0.333 | 0.931 | 0.317 | 0.413 | 0.931 |
| 303 | −0.081 | −0.285 | 0.931 | 0.276 | 0.370 | 0.931 |
| 304 | −0.045 | −0.236 | 0.931 | 0.233 | 0.325 | 0.931 |
| 305 | −0.008 | −0.186 | 0.931 | 0.190 | 0.279 | 0.931 |
| 306 | 0.028 | −0.137 | 0.931 | 0.148 | 0.233 | 0.931 |
| 307 | 0.065 | −0.087 | 0.931 | 0.107 | 0.187 | 0.931 |
| 308 | 0.101 | −0.038 | 0.931 | 0.065 | 0.140 | 0.931 |
| 309 | 0.138 | 0.012 | 0.931 | 0.024 | 0.093 | 0.931 |
| 310 | 0.174 | 0.062 | 0.931 | −0.016 | 0.046 | 0.931 |
| 311 | 0.211 | 0.111 | 0.931 | −0.055 | −0.003 | 0.931 |
| 312 | 0.247 | 0.161 | 0.931 | −0.094 | −0.051 | 0.931 |
| 313 | 0.284 | 0.210 | 0.931 | −0.132 | −0.101 | 0.931 |
| 314 | 0.321 | 0.259 | 0.931 | −0.169 | −0.151 | 0.931 |
| 315 | 0.358 | 0.309 | 0.931 | −0.205 | −0.202 | 0.931 |
| 316 | 0.393 | 0.356 | 0.931 | −0.239 | −0.251 | 0.931 |
| 317 | 0.428 | 0.402 | 0.931 | −0.271 | −0.300 | 0.931 |
| 318 | 0.462 | 0.446 | 0.931 | −0.300 | −0.348 | 0.931 |
| 319 | 0.494 | 0.488 | 0.931 | −0.328 | −0.394 | 0.931 |
| 320 | 0.525 | 0.529 | 0.931 | −0.354 | −0.439 | 0.931 |
| 321 | 0.555 | 0.568 | 0.931 | −0.378 | −0.483 | 0.931 |
| 322 | 0.584 | 0.605 | 0.931 | −0.400 | −0.525 | 0.931 |
| 323 | 0.612 | 0.641 | 0.931 | −0.420 | −0.566 | 0.931 |
| 324 | 0.636 | 0.672 | 0.931 | −0.438 | −0.604 | 0.931 |
| 325 | 0.657 | 0.699 | 0.931 | −0.453 | −0.638 | 0.931 |
| 326 | 0.677 | 0.725 | 0.931 | −0.466 | −0.668 | 0.931 |
| 327 | 0.696 | 0.749 | 0.931 | −0.478 | −0.697 | 0.931 |
| 328 | 0.713 | 0.770 | 0.931 | −0.488 | −0.722 | 0.931 |
| 329 | 0.726 | 0.787 | 0.931 | −0.494 | −0.742 | 0.931 |
| 330 | 0.736 | 0.799 | 0.931 | −0.497 | −0.758 | 0.931 |
| 331 | 0.743 | 0.809 | 0.931 | −0.498 | −0.771 | 0.931 |
| 332 | 0.748 | 0.817 | 0.931 | −0.498 | −0.780 | 0.931 |
| 333 | 0.749 | 0.824 | 0.931 | −0.496 | −0.785 | 0.931 |
| 334 | 0.747 | 0.828 | 0.931 | −0.494 | −0.788 | 0.931 |
| 335 | 0.746 | 0.830 | 0.931 | −0.493 | −0.789 | 0.931 |
| 336 | 0.745 | 0.830 | 0.931 | −0.492 | −0.789 | 0.931 |
| 337 | −0.497 | −0.796 | 1.036 | 0.732 | 0.865 | 1.036 |
| 338 | −0.497 | −0.796 | 1.036 | 0.732 | 0.865 | 1.036 |
| 339 | −0.496 | −0.797 | 1.036 | 0.731 | 0.866 | 1.036 |
| 340 | −0.494 | −0.797 | 1.036 | 0.729 | 0.867 | 1.036 |
| 341 | −0.491 | −0.797 | 1.036 | 0.725 | 0.868 | 1.036 |
| 342 | −0.486 | −0.796 | 1.036 | 0.718 | 0.867 | 1.036 |
| 343 | −0.478 | −0.791 | 1.036 | 0.711 | 0.860 | 1.036 |
| 344 | −0.468 | −0.784 | 1.036 | 0.702 | 0.851 | 1.036 |

TABLE I-continued

| | Pressure Surface | | | Suction Surface | | | | | Pressure Surface | | | Suction Surface | | |
|---|---|---|---|---|---|---|---|---|---|---|---|---|---|---|
| N | X | Y | Z | X | Y | Z | | N | X | Y | Z | X | Y | Z |
| 345 | −0.456 | −0.772 | 1.036 | 0.690 | 0.839 | 1.036 | | 421 | 0.115 | 0.052 | 1.156 | 0.010 | 0.124 | 1.156 |
| 346 | −0.442 | −0.757 | 1.036 | 0.676 | 0.824 | 1.036 | | 422 | 0.151 | 0.103 | 1.156 | −0.029 | 0.074 | 1.156 |
| 347 | −0.425 | −0.736 | 1.036 | 0.657 | 0.804 | 1.036 | | 423 | 0.187 | 0.155 | 1.156 | −0.068 | 0.024 | 1.156 |
| 348 | −0.406 | −0.711 | 1.036 | 0.635 | 0.781 | 1.036 | | 424 | 0.223 | 0.206 | 1.156 | −0.106 | −0.027 | 1.156 |
| 349 | −0.385 | −0.685 | 1.036 | 0.612 | 0.757 | 1.036 | | 425 | 0.260 | 0.257 | 1.156 | −0.143 | −0.078 | 1.156 |
| 350 | −0.363 | −0.655 | 1.036 | 0.587 | 0.731 | 1.036 | | 426 | 0.296 | 0.309 | 1.156 | −0.180 | −0.130 | 1.156 |
| 351 | −0.338 | −0.622 | 1.036 | 0.560 | 0.702 | 1.036 | | 427 | 0.333 | 0.360 | 1.156 | −0.215 | −0.183 | 1.156 |
| 352 | −0.311 | −0.585 | 1.036 | 0.528 | 0.668 | 1.036 | | 428 | 0.368 | 0.409 | 1.156 | −0.249 | −0.234 | 1.156 |
| 353 | −0.283 | −0.546 | 1.036 | 0.495 | 0.633 | 1.036 | | 429 | 0.403 | 0.456 | 1.156 | −0.280 | −0.284 | 1.156 |
| 354 | −0.253 | −0.506 | 1.036 | 0.460 | 0.596 | 1.036 | | 430 | 0.436 | 0.502 | 1.156 | −0.310 | −0.333 | 1.156 |
| 355 | −0.223 | −0.464 | 1.036 | 0.424 | 0.558 | 1.036 | | 431 | 0.468 | 0.546 | 1.156 | −0.337 | −0.381 | 1.156 |
| 356 | −0.191 | −0.420 | 1.036 | 0.387 | 0.518 | 1.036 | | 432 | 0.499 | 0.588 | 1.156 | −0.363 | −0.427 | 1.156 |
| 357 | −0.158 | −0.375 | 1.036 | 0.348 | 0.477 | 1.036 | | 433 | 0.529 | 0.628 | 1.156 | −0.387 | −0.472 | 1.156 |
| 358 | −0.124 | −0.327 | 1.036 | 0.309 | 0.433 | 1.036 | | 434 | 0.558 | 0.667 | 1.156 | −0.409 | −0.515 | 1.156 |
| 359 | −0.089 | −0.278 | 1.036 | 0.268 | 0.388 | 1.036 | | 435 | 0.585 | 0.704 | 1.156 | −0.430 | −0.557 | 1.156 |
| 360 | −0.053 | −0.228 | 1.036 | 0.225 | 0.341 | 1.036 | | 436 | 0.609 | 0.736 | 1.156 | −0.448 | −0.595 | 1.156 |
| 361 | −0.016 | −0.177 | 1.036 | 0.183 | 0.294 | 1.036 | | 437 | 0.631 | 0.764 | 1.156 | −0.464 | −0.630 | 1.156 |
| 362 | 0.020 | −0.126 | 1.036 | 0.142 | 0.247 | 1.036 | | 438 | 0.651 | 0.791 | 1.156 | −0.477 | −0.661 | 1.156 |
| 363 | 0.056 | −0.075 | 1.036 | 0.101 | 0.199 | 1.036 | | 439 | 0.670 | 0.816 | 1.156 | −0.489 | −0.690 | 1.156 |
| 364 | 0.092 | −0.024 | 1.036 | 0.060 | 0.151 | 1.036 | | 440 | 0.687 | 0.837 | 1.156 | −0.499 | −0.716 | 1.156 |
| 365 | 0.128 | 0.027 | 1.036 | 0.020 | 0.102 | 1.036 | | 441 | 0.699 | 0.854 | 1.156 | −0.505 | −0.736 | 1.156 |
| 366 | 0.164 | 0.077 | 1.036 | −0.020 | 0.054 | 1.036 | | 442 | 0.709 | 0.867 | 1.156 | −0.509 | −0.752 | 1.156 |
| 367 | 0.201 | 0.128 | 1.036 | −0.059 | 0.004 | 1.036 | | 443 | 0.717 | 0.877 | 1.156 | −0.510 | −0.765 | 1.156 |
| 368 | 0.237 | 0.179 | 1.036 | −0.098 | −0.046 | 1.036 | | 444 | 0.722 | 0.885 | 1.156 | −0.509 | −0.775 | 1.156 |
| 369 | 0.274 | 0.229 | 1.036 | −0.135 | −0.097 | 1.036 | | 445 | 0.723 | 0.892 | 1.156 | −0.508 | −0.780 | 1.156 |
| 370 | 0.310 | 0.280 | 1.036 | −0.172 | −0.148 | 1.036 | | 446 | 0.721 | 0.896 | 1.156 | −0.506 | −0.782 | 1.156 |
| 371 | 0.347 | 0.330 | 1.036 | −0.208 | −0.200 | 1.036 | | 447 | 0.720 | 0.898 | 1.156 | −0.505 | −0.784 | 1.156 |
| 372 | 0.382 | 0.379 | 1.036 | −0.241 | −0.251 | 1.036 | | 448 | 0.719 | 0.899 | 1.156 | −0.504 | −0.784 | 1.156 |
| 373 | 0.417 | 0.426 | 1.036 | −0.273 | −0.300 | 1.036 | | 449 | −0.528 | −0.710 | 1.394 | 0.692 | 0.956 | 1.394 |
| 374 | 0.450 | 0.471 | 1.036 | −0.303 | −0.349 | 1.036 | | 450 | −0.527 | −0.710 | 1.394 | 0.692 | 0.957 | 1.394 |
| 375 | 0.482 | 0.515 | 1.036 | −0.331 | −0.396 | 1.036 | | 451 | −0.527 | −0.710 | 1.394 | 0.691 | 0.957 | 1.394 |
| 376 | 0.513 | 0.556 | 1.036 | −0.357 | −0.441 | 1.036 | | 452 | −0.525 | −0.710 | 1.394 | 0.689 | 0.959 | 1.394 |
| 377 | 0.543 | 0.596 | 1.036 | −0.381 | −0.486 | 1.036 | | 453 | −0.522 | −0.710 | 1.394 | 0.684 | 0.960 | 1.394 |
| 378 | 0.572 | 0.635 | 1.036 | −0.403 | −0.529 | 1.036 | | 454 | −0.517 | −0.709 | 1.394 | 0.677 | 0.958 | 1.394 |
| 379 | 0.600 | 0.671 | 1.036 | −0.423 | −0.570 | 1.036 | | 455 | −0.509 | −0.704 | 1.394 | 0.670 | 0.952 | 1.394 |
| 380 | 0.623 | 0.703 | 1.036 | −0.441 | −0.608 | 1.036 | | 456 | −0.499 | −0.696 | 1.394 | 0.661 | 0.943 | 1.394 |
| 381 | 0.645 | 0.731 | 1.036 | −0.457 | −0.642 | 1.036 | | 457 | −0.488 | −0.684 | 1.394 | 0.650 | 0.931 | 1.394 |
| 382 | 0.665 | 0.757 | 1.036 | −0.470 | −0.673 | 1.036 | | 458 | −0.474 | −0.668 | 1.394 | 0.635 | 0.916 | 1.394 |
| 383 | 0.684 | 0.782 | 1.036 | −0.483 | −0.702 | 1.036 | | 459 | −0.458 | −0.647 | 1.394 | 0.615 | 0.897 | 1.394 |
| 384 | 0.700 | 0.803 | 1.036 | −0.492 | −0.728 | 1.036 | | 460 | −0.440 | −0.621 | 1.394 | 0.593 | 0.874 | 1.394 |
| 385 | 0.713 | 0.820 | 1.036 | −0.498 | −0.748 | 1.036 | | 461 | −0.421 | −0.594 | 1.394 | 0.570 | 0.850 | 1.394 |
| 386 | 0.723 | 0.833 | 1.036 | −0.502 | −0.765 | 1.036 | | 462 | −0.399 | −0.564 | 1.394 | 0.545 | 0.825 | 1.394 |
| 387 | 0.731 | 0.843 | 1.036 | −0.503 | −0.777 | 1.036 | | 463 | −0.376 | −0.529 | 1.394 | 0.517 | 0.796 | 1.394 |
| 388 | 0.736 | 0.851 | 1.036 | −0.502 | −0.786 | 1.036 | | 464 | −0.350 | −0.492 | 1.394 | 0.484 | 0.763 | 1.394 |
| 389 | 0.736 | 0.858 | 1.036 | −0.501 | −0.791 | 1.036 | | 465 | −0.322 | −0.452 | 1.394 | 0.451 | 0.728 | 1.394 |
| 390 | 0.735 | 0.862 | 1.036 | −0.499 | −0.794 | 1.036 | | 466 | −0.294 | −0.411 | 1.394 | 0.416 | 0.692 | 1.394 |
| 391 | 0.733 | 0.864 | 1.036 | −0.498 | −0.795 | 1.036 | | 467 | −0.265 | −0.369 | 1.394 | 0.380 | 0.654 | 1.394 |
| 392 | 0.733 | 0.865 | 1.036 | −0.497 | −0.796 | 1.036 | | 468 | −0.234 | −0.324 | 1.394 | 0.342 | 0.614 | 1.394 |
| 393 | −0.504 | −0.784 | 1.156 | 0.719 | 0.899 | 1.156 | | 469 | −0.202 | −0.278 | 1.394 | 0.304 | 0.572 | 1.394 |
| 394 | −0.504 | −0.785 | 1.156 | 0.718 | 0.900 | 1.156 | | 470 | −0.169 | −0.230 | 1.394 | 0.264 | 0.529 | 1.394 |
| 395 | −0.503 | −0.785 | 1.156 | 0.717 | 0.900 | 1.156 | | 471 | −0.135 | −0.180 | 1.394 | 0.223 | 0.484 | 1.394 |
| 396 | −0.501 | −0.785 | 1.156 | 0.715 | 0.901 | 1.156 | | 472 | −0.100 | −0.129 | 1.394 | 0.181 | 0.437 | 1.394 |
| 397 | −0.498 | −0.785 | 1.156 | 0.711 | 0.902 | 1.156 | | 473 | −0.064 | −0.078 | 1.394 | 0.139 | 0.389 | 1.394 |
| 398 | −0.493 | −0.784 | 1.156 | 0.704 | 0.901 | 1.156 | | 474 | −0.028 | −0.027 | 1.394 | 0.098 | 0.342 | 1.394 |
| 399 | −0.485 | −0.779 | 1.156 | 0.697 | 0.894 | 1.156 | | 475 | 0.007 | 0.024 | 1.394 | 0.057 | 0.294 | 1.394 |
| 400 | −0.475 | −0.771 | 1.156 | 0.688 | 0.885 | 1.156 | | 476 | 0.043 | 0.075 | 1.394 | 0.017 | 0.245 | 1.394 |
| 401 | −0.463 | −0.760 | 1.156 | 0.677 | 0.873 | 1.156 | | 477 | 0.079 | 0.126 | 1.394 | −0.023 | 0.196 | 1.394 |
| 402 | −0.449 | −0.744 | 1.156 | 0.662 | 0.857 | 1.156 | | 478 | 0.115 | 0.177 | 1.394 | −0.062 | 0.147 | 1.394 |
| 403 | −0.432 | −0.723 | 1.156 | 0.643 | 0.837 | 1.156 | | 479 | 0.151 | 0.228 | 1.394 | −0.100 | 0.096 | 1.394 |
| 404 | −0.413 | −0.697 | 1.156 | 0.622 | 0.814 | 1.156 | | 480 | 0.187 | 0.278 | 1.394 | −0.138 | 0.046 | 1.394 |
| 405 | −0.393 | −0.670 | 1.156 | 0.598 | 0.789 | 1.156 | | 481 | 0.224 | 0.329 | 1.394 | −0.174 | −0.005 | 1.394 |
| 406 | −0.371 | −0.640 | 1.156 | 0.574 | 0.763 | 1.156 | | 482 | 0.261 | 0.379 | 1.394 | −0.210 | −0.057 | 1.394 |
| 407 | −0.347 | −0.606 | 1.156 | 0.546 | 0.734 | 1.156 | | 483 | 0.297 | 0.429 | 1.394 | −0.245 | −0.110 | 1.394 |
| 408 | −0.320 | −0.569 | 1.156 | 0.515 | 0.700 | 1.156 | | 484 | 0.333 | 0.478 | 1.394 | −0.278 | −0.161 | 1.394 |
| 409 | −0.292 | −0.529 | 1.156 | 0.482 | 0.664 | 1.156 | | 485 | 0.368 | 0.524 | 1.394 | −0.309 | −0.211 | 1.394 |
| 410 | −0.263 | −0.488 | 1.156 | 0.447 | 0.627 | 1.156 | | 486 | 0.402 | 0.569 | 1.394 | −0.338 | −0.260 | 1.394 |
| 411 | −0.233 | −0.446 | 1.156 | 0.411 | 0.588 | 1.156 | | 487 | 0.435 | 0.612 | 1.394 | −0.365 | −0.307 | 1.394 |
| 412 | −0.201 | −0.401 | 1.156 | 0.374 | 0.547 | 1.156 | | 488 | 0.466 | 0.653 | 1.394 | −0.391 | −0.353 | 1.394 |
| 413 | −0.169 | −0.355 | 1.156 | 0.336 | 0.505 | 1.156 | | 489 | 0.497 | 0.693 | 1.394 | −0.414 | −0.398 | 1.394 |
| 414 | −0.135 | −0.307 | 1.156 | 0.297 | 0.461 | 1.156 | | 490 | 0.526 | 0.730 | 1.394 | −0.436 | −0.441 | 1.394 |
| 415 | −0.101 | −0.257 | 1.156 | 0.256 | 0.415 | 1.156 | | 491 | 0.554 | 0.766 | 1.394 | −0.456 | −0.483 | 1.394 |
| 416 | −0.065 | −0.206 | 1.156 | 0.214 | 0.367 | 1.156 | | 492 | 0.579 | 0.797 | 1.394 | −0.474 | −0.521 | 1.394 |
| 417 | −0.029 | −0.154 | 1.156 | 0.172 | 0.319 | 1.156 | | 493 | 0.601 | 0.825 | 1.394 | −0.489 | −0.555 | 1.394 |
| 418 | 0.007 | −0.103 | 1.156 | 0.131 | 0.271 | 1.156 | | 494 | 0.622 | 0.851 | 1.394 | −0.502 | −0.586 | 1.394 |
| 419 | 0.043 | −0.051 | 1.156 | 0.090 | 0.222 | 1.156 | | 495 | 0.641 | 0.875 | 1.394 | −0.514 | −0.616 | 1.394 |
| 420 | 0.079 | 0.000 | 1.156 | 0.050 | 0.173 | 1.156 | | 496 | 0.658 | 0.896 | 1.394 | −0.523 | −0.641 | 1.394 |

TABLE I-continued

| | Pressure Surface | | | Suction Surface | | | | | Pressure Surface | | | Suction Surface | | |
|---|---|---|---|---|---|---|---|---|---|---|---|---|---|---|
| N | X | Y | Z | X | Y | Z | N | X | Y | Z | X | Y | Z |
| 497 | 0.671 | 0.912 | 1.394 | −0.529 | −0.662 | 1.394 | 573 | −0.452 | −0.478 | 1.760 | 0.526 | 0.914 | 1.760 |
| 498 | 0.682 | 0.925 | 1.394 | −0.532 | −0.678 | 1.394 | 574 | −0.432 | −0.448 | 1.760 | 0.501 | 0.890 | 1.760 |
| 499 | 0.690 | 0.935 | 1.394 | −0.534 | −0.691 | 1.394 | 575 | −0.410 | −0.414 | 1.760 | 0.472 | 0.864 | 1.760 |
| 500 | 0.695 | 0.942 | 1.394 | −0.533 | −0.700 | 1.394 | 576 | −0.385 | −0.377 | 1.760 | 0.439 | 0.833 | 1.760 |
| 501 | 0.696 | 0.949 | 1.394 | −0.532 | −0.705 | 1.394 | 577 | −0.360 | −0.339 | 1.760 | 0.405 | 0.801 | 1.760 |
| 502 | 0.695 | 0.953 | 1.394 | −0.530 | −0.708 | 1.394 | 578 | −0.333 | −0.298 | 1.760 | 0.369 | 0.767 | 1.760 |
| 503 | 0.693 | 0.955 | 1.394 | −0.529 | −0.709 | 1.394 | 579 | −0.305 | −0.257 | 1.760 | 0.332 | 0.731 | 1.760 |
| 504 | 0.693 | 0.956 | 1.394 | −0.528 | −0.709 | 1.394 | 580 | −0.276 | −0.213 | 1.760 | 0.294 | 0.694 | 1.760 |
| 505 | −0.549 | −0.631 | 1.613 | 0.669 | 0.997 | 1.613 | 581 | −0.245 | −0.168 | 1.760 | 0.255 | 0.655 | 1.760 |
| 506 | −0.549 | −0.631 | 1.613 | 0.669 | 0.997 | 1.613 | 582 | −0.214 | −0.121 | 1.760 | 0.215 | 0.614 | 1.760 |
| 507 | −0.548 | −0.631 | 1.613 | 0.668 | 0.998 | 1.613 | 583 | −0.180 | −0.073 | 1.760 | 0.174 | 0.571 | 1.760 |
| 508 | −0.546 | −0.632 | 1.613 | 0.666 | 0.999 | 1.613 | 584 | −0.146 | −0.023 | 1.760 | 0.132 | 0.526 | 1.760 |
| 509 | −0.543 | −0.631 | 1.613 | 0.662 | 1.000 | 1.613 | 585 | −0.111 | 0.027 | 1.760 | 0.090 | 0.481 | 1.760 |
| 510 | −0.538 | −0.630 | 1.613 | 0.655 | 0.999 | 1.613 | 586 | −0.077 | 0.076 | 1.760 | 0.049 | 0.435 | 1.760 |
| 511 | −0.530 | −0.625 | 1.613 | 0.648 | 0.993 | 1.613 | 587 | −0.042 | 0.125 | 1.760 | 0.009 | 0.389 | 1.760 |
| 512 | −0.521 | −0.617 | 1.613 | 0.638 | 0.984 | 1.613 | 588 | −0.006 | 0.175 | 1.760 | −0.031 | 0.342 | 1.760 |
| 513 | −0.510 | −0.605 | 1.613 | 0.626 | 0.973 | 1.613 | 589 | 0.029 | 0.224 | 1.760 | −0.070 | 0.294 | 1.760 |
| 514 | −0.497 | −0.589 | 1.613 | 0.611 | 0.959 | 1.613 | 590 | 0.065 | 0.273 | 1.760 | −0.108 | 0.246 | 1.760 |
| 515 | −0.481 | −0.568 | 1.613 | 0.591 | 0.941 | 1.613 | 591 | 0.101 | 0.321 | 1.760 | −0.146 | 0.197 | 1.760 |
| 516 | −0.463 | −0.543 | 1.613 | 0.568 | 0.920 | 1.613 | 592 | 0.137 | 0.370 | 1.760 | −0.182 | 0.148 | 1.760 |
| 517 | −0.445 | −0.516 | 1.613 | 0.544 | 0.897 | 1.613 | 593 | 0.173 | 0.418 | 1.760 | −0.218 | 0.098 | 1.760 |
| 518 | −0.424 | −0.485 | 1.613 | 0.519 | 0.873 | 1.613 | 594 | 0.210 | 0.466 | 1.760 | −0.253 | 0.047 | 1.760 |
| 519 | −0.401 | −0.451 | 1.613 | 0.490 | 0.845 | 1.613 | 595 | 0.247 | 0.514 | 1.760 | −0.286 | −0.004 | 1.760 |
| 520 | −0.376 | −0.414 | 1.613 | 0.457 | 0.814 | 1.613 | 596 | 0.283 | 0.560 | 1.760 | −0.318 | −0.054 | 1.760 |
| 521 | −0.350 | −0.375 | 1.613 | 0.423 | 0.781 | 1.613 | 597 | 0.318 | 0.605 | 1.760 | −0.348 | −0.103 | 1.760 |
| 522 | −0.322 | −0.334 | 1.613 | 0.388 | 0.746 | 1.613 | 598 | 0.353 | 0.647 | 1.760 | −0.376 | −0.151 | 1.760 |
| 523 | −0.294 | −0.292 | 1.613 | 0.351 | 0.709 | 1.613 | 599 | 0.386 | 0.688 | 1.760 | −0.402 | −0.198 | 1.760 |
| 524 | −0.264 | −0.248 | 1.613 | 0.313 | 0.671 | 1.613 | 600 | 0.418 | 0.726 | 1.760 | −0.426 | −0.243 | 1.760 |
| 525 | −0.233 | −0.202 | 1.613 | 0.274 | 0.631 | 1.613 | 601 | 0.449 | 0.763 | 1.760 | −0.448 | −0.287 | 1.760 |
| 526 | −0.200 | −0.155 | 1.613 | 0.234 | 0.589 | 1.613 | 602 | 0.479 | 0.799 | 1.760 | −0.469 | −0.329 | 1.760 |
| 527 | −0.167 | −0.106 | 1.613 | 0.192 | 0.545 | 1.613 | 603 | 0.508 | 0.832 | 1.760 | −0.488 | −0.370 | 1.760 |
| 528 | −0.132 | −0.056 | 1.613 | 0.150 | 0.499 | 1.613 | 604 | 0.533 | 0.861 | 1.760 | −0.505 | −0.407 | 1.760 |
| 529 | −0.096 | −0.006 | 1.613 | 0.108 | 0.453 | 1.613 | 605 | 0.556 | 0.887 | 1.760 | −0.519 | −0.441 | 1.760 |
| 530 | −0.061 | 0.044 | 1.613 | 0.067 | 0.407 | 1.613 | 606 | 0.578 | 0.911 | 1.760 | −0.532 | −0.472 | 1.760 |
| 531 | −0.025 | 0.094 | 1.613 | 0.026 | 0.360 | 1.613 | 607 | 0.598 | 0.934 | 1.760 | −0.542 | −0.500 | 1.760 |
| 532 | 0.010 | 0.144 | 1.613 | −0.014 | 0.312 | 1.613 | 608 | 0.615 | 0.953 | 1.760 | −0.551 | −0.526 | 1.760 |
| 533 | 0.046 | 0.194 | 1.613 | −0.053 | 0.264 | 1.613 | 609 | 0.629 | 0.968 | 1.760 | −0.556 | −0.545 | 1.760 |
| 534 | 0.082 | 0.244 | 1.613 | −0.092 | 0.216 | 1.613 | 610 | 0.640 | 0.980 | 1.760 | −0.559 | −0.562 | 1.760 |
| 535 | 0.118 | 0.293 | 1.613 | −0.130 | 0.166 | 1.613 | 611 | 0.648 | 0.989 | 1.760 | −0.560 | −0.574 | 1.760 |
| 536 | 0.155 | 0.343 | 1.613 | −0.168 | 0.116 | 1.613 | 612 | 0.654 | 0.996 | 1.760 | −0.560 | −0.583 | 1.760 |
| 537 | 0.191 | 0.392 | 1.613 | −0.204 | 0.066 | 1.613 | 613 | 0.655 | 1.002 | 1.760 | −0.559 | −0.588 | 1.760 |
| 538 | 0.228 | 0.441 | 1.613 | −0.239 | 0.015 | 1.613 | 614 | 0.654 | 1.006 | 1.760 | −0.557 | −0.591 | 1.760 |
| 539 | 0.266 | 0.489 | 1.613 | −0.274 | −0.037 | 1.613 | 615 | 0.653 | 1.008 | 1.760 | −0.556 | −0.592 | 1.760 |
| 540 | 0.302 | 0.536 | 1.613 | −0.306 | −0.088 | 1.613 | 616 | 0.653 | 1.009 | 1.760 | −0.555 | −0.592 | 1.760 |
| 541 | 0.337 | 0.581 | 1.613 | −0.337 | −0.137 | 1.613 | 617 | −0.554 | −0.567 | 1.932 | 0.628 | 1.008 | 1.932 |
| 542 | 0.371 | 0.625 | 1.613 | −0.365 | −0.185 | 1.613 | 618 | −0.554 | −0.567 | 1.932 | 0.628 | 1.009 | 1.932 |
| 543 | 0.405 | 0.666 | 1.613 | −0.392 | −0.232 | 1.613 | 619 | −0.553 | −0.567 | 1.932 | 0.627 | 1.009 | 1.932 |
| 544 | 0.437 | 0.706 | 1.613 | −0.416 | −0.278 | 1.613 | 620 | −0.552 | −0.567 | 1.932 | 0.625 | 1.011 | 1.932 |
| 545 | 0.468 | 0.744 | 1.613 | −0.439 | −0.322 | 1.613 | 621 | −0.548 | −0.567 | 1.932 | 0.621 | 1.012 | 1.932 |
| 546 | 0.498 | 0.780 | 1.613 | −0.460 | −0.365 | 1.613 | 622 | −0.544 | −0.565 | 1.932 | 0.614 | 1.010 | 1.932 |
| 547 | 0.527 | 0.815 | 1.613 | −0.480 | −0.406 | 1.613 | 623 | −0.536 | −0.561 | 1.932 | 0.607 | 1.005 | 1.932 |
| 548 | 0.552 | 0.844 | 1.613 | −0.497 | −0.444 | 1.613 | 624 | −0.527 | −0.553 | 1.932 | 0.598 | 0.997 | 1.932 |
| 549 | 0.574 | 0.871 | 1.613 | −0.512 | −0.478 | 1.613 | 625 | −0.517 | −0.541 | 1.932 | 0.585 | 0.987 | 1.932 |
| 550 | 0.596 | 0.896 | 1.613 | −0.525 | −0.509 | 1.613 | 626 | −0.504 | −0.526 | 1.932 | 0.570 | 0.974 | 1.932 |
| 551 | 0.616 | 0.919 | 1.613 | −0.536 | −0.538 | 1.613 | 627 | −0.489 | −0.505 | 1.932 | 0.549 | 0.957 | 1.932 |
| 552 | 0.633 | 0.939 | 1.613 | −0.545 | −0.563 | 1.613 | 628 | −0.472 | −0.481 | 1.932 | 0.526 | 0.938 | 1.932 |
| 553 | 0.647 | 0.954 | 1.613 | −0.550 | −0.583 | 1.613 | 629 | −0.454 | −0.454 | 1.932 | 0.502 | 0.917 | 1.932 |
| 554 | 0.657 | 0.967 | 1.613 | −0.554 | −0.599 | 1.613 | 630 | −0.435 | −0.424 | 1.932 | 0.476 | 0.895 | 1.932 |
| 555 | 0.666 | 0.976 | 1.613 | −0.555 | −0.612 | 1.613 | 631 | −0.414 | −0.391 | 1.932 | 0.447 | 0.869 | 1.932 |
| 556 | 0.671 | 0.983 | 1.613 | −0.554 | −0.621 | 1.613 | 632 | −0.390 | −0.354 | 1.932 | 0.414 | 0.840 | 1.932 |
| 557 | 0.673 | 0.990 | 1.613 | −0.553 | −0.626 | 1.613 | 633 | −0.365 | −0.316 | 1.932 | 0.379 | 0.809 | 1.932 |
| 558 | 0.672 | 0.994 | 1.613 | −0.551 | −0.629 | 1.613 | 634 | −0.339 | −0.276 | 1.932 | 0.344 | 0.776 | 1.932 |
| 559 | 0.670 | 0.996 | 1.613 | −0.550 | −0.630 | 1.613 | 635 | −0.312 | −0.235 | 1.932 | 0.307 | 0.741 | 1.932 |
| 560 | 0.670 | 0.997 | 1.613 | −0.549 | −0.631 | 1.613 | 636 | −0.284 | −0.191 | 1.932 | 0.269 | 0.705 | 1.932 |
| 561 | −0.555 | −0.592 | 1.760 | 0.652 | 1.010 | 1.760 | 637 | −0.255 | −0.147 | 1.932 | 0.231 | 0.667 | 1.932 |
| 562 | −0.554 | −0.593 | 1.760 | 0.652 | 1.010 | 1.760 | 638 | −0.224 | −0.101 | 1.932 | 0.191 | 0.627 | 1.932 |
| 563 | −0.554 | −0.593 | 1.760 | 0.651 | 1.011 | 1.760 | 639 | −0.192 | −0.053 | 1.932 | 0.150 | 0.585 | 1.932 |
| 564 | −0.552 | −0.593 | 1.760 | 0.649 | 1.012 | 1.760 | 640 | −0.158 | −0.004 | 1.932 | 0.109 | 0.541 | 1.932 |
| 565 | −0.549 | −0.593 | 1.760 | 0.645 | 1.013 | 1.760 | 641 | −0.125 | 0.045 | 1.932 | 0.068 | 0.496 | 1.932 |
| 566 | −0.544 | −0.591 | 1.760 | 0.638 | 1.012 | 1.760 | 642 | −0.091 | 0.094 | 1.932 | 0.028 | 0.451 | 1.932 |
| 567 | −0.536 | −0.586 | 1.760 | 0.631 | 1.006 | 1.760 | 643 | −0.057 | 0.143 | 1.932 | −0.012 | 0.405 | 1.932 |
| 568 | −0.527 | −0.578 | 1.760 | 0.622 | 0.998 | 1.760 | 644 | −0.022 | 0.191 | 1.932 | −0.051 | 0.359 | 1.932 |
| 569 | −0.516 | −0.567 | 1.760 | 0.609 | 0.987 | 1.760 | 645 | 0.012 | 0.240 | 1.932 | −0.089 | 0.312 | 1.932 |
| 570 | −0.503 | −0.551 | 1.760 | 0.594 | 0.974 | 1.760 | 646 | 0.047 | 0.288 | 1.932 | −0.126 | 0.264 | 1.932 |
| 571 | −0.488 | −0.530 | 1.760 | 0.574 | 0.956 | 1.760 | 647 | 0.082 | 0.336 | 1.932 | −0.162 | 0.216 | 1.932 |
| 572 | −0.470 | −0.505 | 1.760 | 0.551 | 0.936 | 1.760 | 648 | 0.117 | 0.384 | 1.932 | −0.198 | 0.167 | 1.932 |

TABLE I-continued

| | Pressure Surface | | | Suction Surface | | |
|---|---|---|---|---|---|---|
| N | X | Y | Z | X | Y | Z |
| 649 | 0.153 | 0.431 | 1.932 | −0.232 | 0.117 | 1.932 |
| 650 | 0.189 | 0.478 | 1.932 | −0.265 | 0.066 | 1.932 |
| 651 | 0.225 | 0.526 | 1.932 | −0.298 | 0.015 | 1.932 |
| 652 | 0.261 | 0.571 | 1.932 | −0.328 | −0.034 | 1.932 |
| 653 | 0.296 | 0.614 | 1.932 | −0.357 | −0.083 | 1.932 |
| 654 | 0.329 | 0.656 | 1.932 | −0.384 | −0.130 | 1.932 |
| 655 | 0.362 | 0.695 | 1.932 | −0.409 | −0.177 | 1.932 |
| 656 | 0.394 | 0.733 | 1.932 | −0.432 | −0.221 | 1.932 |
| 657 | 0.425 | 0.769 | 1.932 | −0.453 | −0.265 | 1.932 |
| 658 | 0.455 | 0.804 | 1.932 | −0.473 | −0.307 | 1.932 |
| 659 | 0.484 | 0.836 | 1.932 | −0.492 | −0.347 | 1.932 |
| 660 | 0.509 | 0.864 | 1.932 | −0.508 | −0.384 | 1.932 |
| 661 | 0.531 | 0.889 | 1.932 | −0.522 | −0.417 | 1.932 |
| 662 | 0.553 | 0.913 | 1.932 | −0.533 | −0.447 | 1.932 |
| 663 | 0.573 | 0.935 | 1.932 | −0.544 | −0.476 | 1.932 |
| 664 | 0.591 | 0.953 | 1.932 | −0.551 | −0.501 | 1.932 |
| 665 | 0.604 | 0.968 | 1.932 | −0.556 | −0.521 | 1.932 |
| 666 | 0.615 | 0.979 | 1.932 | −0.559 | −0.536 | 1.932 |
| 667 | 0.623 | 0.988 | 1.932 | −0.560 | −0.548 | 1.932 |
| 668 | 0.629 | 0.994 | 1.932 | −0.559 | −0.557 | 1.932 |
| 669 | 0.631 | 1.001 | 1.932 | −0.558 | −0.562 | 1.932 |
| 670 | 0.630 | 1.005 | 1.932 | −0.556 | −0.565 | 1.932 |
| 671 | 0.629 | 1.007 | 1.932 | −0.555 | −0.566 | 1.932 |
| 672 | 0.629 | 1.008 | 1.932 | −0.555 | −0.567 | 1.932 |
| 673 | −0.553 | −0.564 | 2.051 | 0.608 | 0.998 | 2.051 |
| 674 | −0.552 | −0.564 | 2.051 | 0.608 | 0.999 | 2.051 |
| 675 | −0.552 | −0.565 | 2.051 | 0.607 | 1.000 | 2.051 |
| 676 | −0.550 | −0.565 | 2.051 | 0.605 | 1.001 | 2.051 |
| 677 | −0.547 | −0.565 | 2.051 | 0.601 | 1.002 | 2.051 |
| 678 | −0.542 | −0.563 | 2.051 | 0.594 | 1.000 | 2.051 |
| 679 | −0.535 | −0.558 | 2.051 | 0.587 | 0.995 | 2.051 |
| 680 | −0.526 | −0.550 | 2.051 | 0.578 | 0.988 | 2.051 |
| 681 | −0.516 | −0.539 | 2.051 | 0.565 | 0.978 | 2.051 |
| 682 | −0.503 | −0.524 | 2.051 | 0.549 | 0.966 | 2.051 |
| 683 | −0.488 | −0.503 | 2.051 | 0.529 | 0.950 | 2.051 |
| 684 | −0.472 | −0.479 | 2.051 | 0.506 | 0.931 | 2.051 |
| 685 | −0.455 | −0.452 | 2.051 | 0.481 | 0.911 | 2.051 |
| 686 | −0.436 | −0.423 | 2.051 | 0.455 | 0.889 | 2.051 |
| 687 | −0.415 | −0.389 | 2.051 | 0.426 | 0.864 | 2.051 |
| 688 | −0.392 | −0.353 | 2.051 | 0.393 | 0.836 | 2.051 |
| 689 | −0.368 | −0.315 | 2.051 | 0.358 | 0.805 | 2.051 |
| 690 | −0.343 | −0.275 | 2.051 | 0.323 | 0.773 | 2.051 |
| 691 | −0.317 | −0.234 | 2.051 | 0.286 | 0.739 | 2.051 |
| 692 | −0.289 | −0.191 | 2.051 | 0.249 | 0.703 | 2.051 |
| 693 | −0.261 | −0.146 | 2.051 | 0.210 | 0.666 | 2.051 |
| 694 | −0.231 | −0.100 | 2.051 | 0.171 | 0.626 | 2.051 |
| 695 | −0.200 | −0.053 | 2.051 | 0.130 | 0.584 | 2.051 |
| 696 | −0.167 | −0.004 | 2.051 | 0.089 | 0.541 | 2.051 |
| 697 | −0.134 | 0.045 | 2.051 | 0.049 | 0.496 | 2.051 |
| 698 | −0.101 | 0.093 | 2.051 | 0.010 | 0.451 | 2.051 |
| 699 | −0.068 | 0.142 | 2.051 | −0.029 | 0.406 | 2.051 |
| 700 | −0.034 | 0.190 | 2.051 | −0.067 | 0.359 | 2.051 |
| 701 | 0.000 | 0.238 | 2.051 | −0.104 | 0.312 | 2.051 |
| 702 | 0.034 | 0.286 | 2.051 | −0.140 | 0.264 | 2.051 |
| 703 | 0.068 | 0.334 | 2.051 | −0.175 | 0.216 | 2.051 |
| 704 | 0.103 | 0.381 | 2.051 | −0.210 | 0.167 | 2.051 |
| 705 | 0.138 | 0.429 | 2.051 | −0.243 | 0.117 | 2.051 |
| 706 | 0.173 | 0.476 | 2.051 | −0.275 | 0.067 | 2.051 |
| 707 | 0.209 | 0.522 | 2.051 | −0.307 | 0.016 | 2.051 |
| 708 | 0.243 | 0.567 | 2.051 | −0.336 | −0.034 | 2.051 |
| 709 | 0.278 | 0.610 | 2.051 | −0.364 | −0.083 | 2.051 |
| 710 | 0.311 | 0.651 | 2.051 | −0.390 | −0.130 | 2.051 |
| 711 | 0.343 | 0.690 | 2.051 | −0.414 | −0.176 | 2.051 |
| 712 | 0.375 | 0.728 | 2.051 | −0.436 | −0.221 | 2.051 |
| 713 | 0.405 | 0.764 | 2.051 | −0.457 | −0.264 | 2.051 |
| 714 | 0.435 | 0.798 | 2.051 | −0.476 | −0.306 | 2.051 |
| 715 | 0.464 | 0.830 | 2.051 | −0.494 | −0.346 | 2.051 |
| 716 | 0.489 | 0.857 | 2.051 | −0.509 | −0.383 | 2.051 |
| 717 | 0.511 | 0.882 | 2.051 | −0.523 | −0.416 | 2.051 |
| 718 | 0.532 | 0.905 | 2.051 | −0.534 | −0.446 | 2.051 |
| 719 | 0.552 | 0.926 | 2.051 | −0.544 | −0.474 | 2.051 |
| 720 | 0.570 | 0.945 | 2.051 | −0.551 | −0.499 | 2.051 |
| 721 | 0.584 | 0.959 | 2.051 | −0.555 | −0.519 | 2.051 |
| 722 | 0.595 | 0.970 | 2.051 | −0.558 | −0.534 | 2.051 |
| 723 | 0.603 | 0.979 | 2.051 | −0.559 | −0.546 | 2.051 |
| 724 | 0.609 | 0.985 | 2.051 | −0.558 | −0.555 | 2.051 |
| 725 | 0.611 | 0.991 | 2.051 | −0.557 | −0.560 | 2.051 |
| 726 | 0.610 | 0.995 | 2.051 | −0.555 | −0.563 | 2.051 |
| 727 | 0.609 | 0.997 | 2.051 | −0.554 | −0.564 | 2.051 |
| 728 | 0.609 | 0.998 | 2.051 | −0.553 | −0.564 | 2.051 |
| 729 | −0.552 | −0.571 | 2.121 | 0.594 | 0.988 | 2.121 |
| 730 | −0.552 | −0.571 | 2.121 | 0.593 | 0.988 | 2.121 |
| 731 | −0.551 | −0.571 | 2.121 | 0.593 | 0.989 | 2.121 |
| 732 | −0.550 | −0.571 | 2.121 | 0.591 | 0.990 | 2.121 |
| 733 | −0.547 | −0.571 | 2.121 | 0.587 | 0.991 | 2.121 |
| 734 | −0.542 | −0.569 | 2.121 | 0.580 | 0.990 | 2.121 |
| 735 | −0.535 | −0.565 | 2.121 | 0.573 | 0.984 | 2.121 |
| 736 | −0.526 | −0.557 | 2.121 | 0.563 | 0.977 | 2.121 |
| 737 | −0.516 | −0.545 | 2.121 | 0.551 | 0.968 | 2.121 |
| 738 | −0.504 | −0.530 | 2.121 | 0.535 | 0.956 | 2.121 |
| 739 | −0.489 | −0.509 | 2.121 | 0.514 | 0.940 | 2.121 |
| 740 | −0.472 | −0.485 | 2.121 | 0.491 | 0.922 | 2.121 |
| 741 | −0.456 | −0.459 | 2.121 | 0.466 | 0.902 | 2.121 |
| 742 | −0.437 | −0.429 | 2.121 | 0.440 | 0.881 | 2.121 |
| 743 | −0.417 | −0.396 | 2.121 | 0.411 | 0.856 | 2.121 |
| 744 | −0.395 | −0.359 | 2.121 | 0.377 | 0.828 | 2.121 |
| 745 | −0.371 | −0.321 | 2.121 | 0.343 | 0.798 | 2.121 |
| 746 | −0.346 | −0.282 | 2.121 | 0.307 | 0.766 | 2.121 |
| 747 | −0.321 | −0.240 | 2.121 | 0.271 | 0.733 | 2.121 |
| 748 | −0.294 | −0.197 | 2.121 | 0.233 | 0.697 | 2.121 |
| 749 | −0.266 | −0.153 | 2.121 | 0.195 | 0.660 | 2.121 |
| 750 | −0.236 | −0.107 | 2.121 | 0.156 | 0.620 | 2.121 |
| 751 | −0.206 | −0.060 | 2.121 | 0.116 | 0.579 | 2.121 |
| 752 | −0.174 | −0.011 | 2.121 | 0.075 | 0.535 | 2.121 |
| 753 | −0.141 | 0.038 | 2.121 | 0.035 | 0.491 | 2.121 |
| 754 | −0.109 | 0.086 | 2.121 | −0.004 | 0.446 | 2.121 |
| 755 | −0.076 | 0.135 | 2.121 | −0.042 | 0.400 | 2.121 |
| 756 | −0.043 | 0.183 | 2.121 | −0.079 | 0.353 | 2.121 |
| 757 | −0.009 | 0.231 | 2.121 | −0.116 | 0.306 | 2.121 |
| 758 | 0.024 | 0.279 | 2.121 | −0.151 | 0.258 | 2.121 |
| 759 | 0.058 | 0.326 | 2.121 | −0.186 | 0.210 | 2.121 |
| 760 | 0.092 | 0.374 | 2.121 | −0.219 | 0.161 | 2.121 |
| 761 | 0.126 | 0.421 | 2.121 | −0.252 | 0.111 | 2.121 |
| 762 | 0.161 | 0.468 | 2.121 | −0.283 | 0.060 | 2.121 |
| 763 | 0.197 | 0.514 | 2.121 | −0.314 | 0.009 | 2.121 |
| 764 | 0.231 | 0.559 | 2.121 | −0.343 | −0.041 | 2.121 |
| 765 | 0.265 | 0.602 | 2.121 | −0.370 | −0.090 | 2.121 |
| 766 | 0.298 | 0.643 | 2.121 | −0.395 | −0.137 | 2.121 |
| 767 | 0.330 | 0.682 | 2.121 | −0.418 | −0.183 | 2.121 |
| 768 | 0.361 | 0.719 | 2.121 | −0.440 | −0.228 | 2.121 |
| 769 | 0.391 | 0.755 | 2.121 | −0.460 | −0.271 | 2.121 |
| 770 | 0.421 | 0.788 | 2.121 | −0.479 | −0.313 | 2.121 |
| 771 | 0.449 | 0.820 | 2.121 | −0.496 | −0.353 | 2.121 |
| 772 | 0.474 | 0.848 | 2.121 | −0.511 | −0.389 | 2.121 |
| 773 | 0.497 | 0.872 | 2.121 | −0.524 | −0.423 | 2.121 |
| 774 | 0.518 | 0.895 | 2.121 | −0.535 | −0.453 | 2.121 |
| 775 | 0.538 | 0.916 | 2.121 | −0.544 | −0.481 | 2.121 |
| 776 | 0.555 | 0.935 | 2.121 | −0.551 | −0.506 | 2.121 |
| 777 | 0.569 | 0.949 | 2.121 | −0.556 | −0.525 | 2.121 |
| 778 | 0.580 | 0.960 | 2.121 | −0.558 | −0.541 | 2.121 |
| 779 | 0.588 | 0.968 | 2.121 | −0.559 | −0.553 | 2.121 |
| 780 | 0.594 | 0.974 | 2.121 | −0.558 | −0.562 | 2.121 |
| 781 | 0.596 | 0.981 | 2.121 | −0.556 | −0.566 | 2.121 |
| 782 | 0.596 | 0.984 | 2.121 | −0.555 | −0.569 | 2.121 |
| 783 | 0.595 | 0.986 | 2.121 | −0.554 | −0.570 | 2.121 |
| 784 | 0.594 | 0.987 | 2.121 | −0.553 | −0.571 | 2.121 |
| 785 | −0.559 | −0.619 | 2.315 | 0.553 | 0.947 | 2.315 |
| 786 | −0.559 | −0.619 | 2.315 | 0.553 | 0.948 | 2.315 |
| 787 | −0.558 | −0.620 | 2.315 | 0.552 | 0.948 | 2.315 |
| 788 | −0.557 | −0.620 | 2.315 | 0.550 | 0.949 | 2.315 |
| 789 | −0.554 | −0.620 | 2.315 | 0.546 | 0.951 | 2.315 |
| 790 | −0.549 | −0.618 | 2.315 | 0.540 | 0.949 | 2.315 |
| 791 | −0.542 | −0.613 | 2.315 | 0.533 | 0.944 | 2.315 |
| 792 | −0.534 | −0.605 | 2.315 | 0.523 | 0.937 | 2.315 |
| 793 | −0.523 | −0.593 | 2.315 | 0.510 | 0.928 | 2.315 |
| 794 | −0.512 | −0.578 | 2.315 | 0.493 | 0.917 | 2.315 |
| 795 | −0.497 | −0.557 | 2.315 | 0.473 | 0.902 | 2.315 |
| 796 | −0.482 | −0.533 | 2.315 | 0.449 | 0.884 | 2.315 |
| 797 | −0.466 | −0.506 | 2.315 | 0.423 | 0.865 | 2.315 |
| 798 | −0.448 | −0.476 | 2.315 | 0.397 | 0.844 | 2.315 |
| 799 | −0.429 | −0.443 | 2.315 | 0.367 | 0.821 | 2.315 |
| 800 | −0.408 | −0.406 | 2.315 | 0.334 | 0.793 | 2.315 |

TABLE I-continued

| | Pressure Surface | | | Suction Surface | | |
|---|---|---|---|---|---|---|
| N | X | Y | Z | X | Y | Z |
| 801 | −0.386 | −0.367 | 2.315 | 0.299 | 0.764 | 2.315 |
| 802 | −0.363 | −0.327 | 2.315 | 0.263 | 0.733 | 2.315 |
| 803 | −0.338 | −0.285 | 2.315 | 0.226 | 0.699 | 2.315 |
| 804 | −0.312 | −0.242 | 2.315 | 0.189 | 0.664 | 2.315 |
| 805 | −0.286 | −0.197 | 2.315 | 0.151 | 0.627 | 2.315 |
| 806 | −0.258 | −0.151 | 2.315 | 0.112 | 0.587 | 2.315 |
| 807 | −0.228 | −0.103 | 2.315 | 0.072 | 0.546 | 2.315 |
| 808 | −0.198 | −0.054 | 2.315 | 0.032 | 0.502 | 2.315 |
| 809 | −0.167 | −0.005 | 2.315 | −0.007 | 0.457 | 2.315 |
| 810 | −0.135 | 0.044 | 2.315 | −0.045 | 0.411 | 2.315 |
| 811 | −0.103 | 0.093 | 2.315 | −0.082 | 0.365 | 2.315 |
| 812 | −0.071 | 0.141 | 2.315 | −0.118 | 0.317 | 2.315 |
| 813 | −0.039 | 0.189 | 2.315 | −0.152 | 0.269 | 2.315 |
| 814 | −0.006 | 0.237 | 2.315 | −0.186 | 0.220 | 2.315 |
| 815 | 0.027 | 0.285 | 2.315 | −0.219 | 0.171 | 2.315 |
| 816 | 0.060 | 0.333 | 2.315 | −0.250 | 0.120 | 2.315 |
| 817 | 0.093 | 0.380 | 2.315 | −0.281 | 0.069 | 2.315 |
| 818 | 0.127 | 0.427 | 2.315 | −0.311 | 0.018 | 2.315 |
| 819 | 0.161 | 0.474 | 2.315 | −0.339 | −0.034 | 2.315 |
| 820 | 0.195 | 0.519 | 2.315 | −0.366 | −0.085 | 2.315 |
| 821 | 0.228 | 0.562 | 2.315 | −0.391 | −0.134 | 2.315 |
| 822 | 0.260 | 0.603 | 2.315 | −0.415 | −0.182 | 2.315 |
| 823 | 0.292 | 0.642 | 2.315 | −0.436 | −0.229 | 2.315 |
| 824 | 0.322 | 0.680 | 2.315 | −0.457 | −0.274 | 2.315 |
| 825 | 0.352 | 0.715 | 2.315 | −0.475 | −0.318 | 2.315 |
| 826 | 0.381 | 0.749 | 2.315 | −0.493 | −0.360 | 2.315 |
| 827 | 0.409 | 0.781 | 2.315 | −0.509 | −0.400 | 2.315 |
| 828 | 0.434 | 0.808 | 2.315 | −0.523 | −0.437 | 2.315 |
| 829 | 0.456 | 0.833 | 2.315 | −0.535 | −0.471 | 2.315 |
| 830 | 0.477 | 0.855 | 2.315 | −0.545 | −0.501 | 2.315 |
| 831 | 0.497 | 0.876 | 2.315 | −0.553 | −0.529 | 2.315 |
| 832 | 0.514 | 0.895 | 2.315 | −0.560 | −0.554 | 2.315 |
| 833 | 0.528 | 0.908 | 2.315 | −0.563 | −0.574 | 2.315 |
| 834 | 0.539 | 0.919 | 2.315 | −0.565 | −0.590 | 2.315 |
| 835 | 0.547 | 0.928 | 2.315 | −0.566 | −0.601 | 2.315 |
| 836 | 0.553 | 0.934 | 2.315 | −0.565 | −0.610 | 2.315 |
| 837 | 0.556 | 0.940 | 2.315 | −0.563 | −0.615 | 2.315 |
| 838 | 0.555 | 0.944 | 2.315 | −0.562 | −0.618 | 2.315 |
| 839 | 0.554 | 0.946 | 2.315 | −0.561 | −0.619 | 2.315 |
| 840 | 0.554 | 0.947 | 2.315 | −0.560 | −0.619 | 2.315 |
| 841 | −0.564 | −0.640 | 2.390 | 0.539 | 0.931 | 2.390 |
| 842 | −0.564 | −0.640 | 2.390 | 0.539 | 0.932 | 2.390 |
| 843 | −0.563 | −0.641 | 2.390 | 0.538 | 0.932 | 2.390 |
| 844 | −0.561 | −0.641 | 2.390 | 0.536 | 0.934 | 2.390 |
| 845 | −0.558 | −0.640 | 2.390 | 0.532 | 0.935 | 2.390 |
| 846 | −0.554 | −0.639 | 2.390 | 0.526 | 0.933 | 2.390 |
| 847 | −0.547 | −0.634 | 2.390 | 0.518 | 0.928 | 2.390 |
| 848 | −0.538 | −0.626 | 2.390 | 0.508 | 0.921 | 2.390 |
| 849 | −0.528 | −0.614 | 2.390 | 0.495 | 0.912 | 2.390 |
| 850 | −0.516 | −0.599 | 2.390 | 0.479 | 0.901 | 2.390 |
| 851 | −0.502 | −0.578 | 2.390 | 0.458 | 0.886 | 2.390 |
| 852 | −0.487 | −0.553 | 2.390 | 0.434 | 0.869 | 2.390 |
| 853 | −0.471 | −0.527 | 2.390 | 0.408 | 0.850 | 2.390 |
| 854 | −0.454 | −0.496 | 2.390 | 0.381 | 0.830 | 2.390 |
| 855 | −0.435 | −0.463 | 2.390 | 0.352 | 0.806 | 2.390 |
| 856 | −0.414 | −0.426 | 2.390 | 0.318 | 0.779 | 2.390 |
| 857 | −0.393 | −0.387 | 2.390 | 0.283 | 0.750 | 2.390 |
| 858 | −0.370 | −0.346 | 2.390 | 0.247 | 0.718 | 2.390 |
| 859 | −0.346 | −0.305 | 2.390 | 0.210 | 0.685 | 2.390 |
| 860 | −0.320 | −0.261 | 2.390 | 0.173 | 0.650 | 2.390 |
| 861 | −0.294 | −0.216 | 2.390 | 0.135 | 0.613 | 2.390 |
| 862 | −0.266 | −0.170 | 2.390 | 0.096 | 0.573 | 2.390 |
| 863 | −0.237 | −0.122 | 2.390 | 0.056 | 0.531 | 2.390 |
| 864 | −0.207 | −0.072 | 2.390 | 0.017 | 0.487 | 2.390 |
| 865 | −0.176 | −0.023 | 2.390 | −0.022 | 0.442 | 2.390 |
| 866 | −0.145 | 0.026 | 2.390 | −0.060 | 0.396 | 2.390 |
| 867 | −0.114 | 0.075 | 2.390 | −0.096 | 0.349 | 2.390 |
| 868 | −0.082 | 0.123 | 2.390 | −0.132 | 0.302 | 2.390 |
| 869 | −0.050 | 0.172 | 2.390 | −0.166 | 0.253 | 2.390 |
| 870 | −0.017 | 0.220 | 2.390 | −0.199 | 0.204 | 2.390 |
| 871 | 0.015 | 0.267 | 2.390 | −0.231 | 0.154 | 2.390 |
| 872 | 0.048 | 0.315 | 2.390 | −0.262 | 0.103 | 2.390 |
| 873 | 0.081 | 0.363 | 2.390 | −0.292 | 0.052 | 2.390 |
| 874 | 0.115 | 0.410 | 2.390 | −0.321 | 0.000 | 2.390 |
| 875 | 0.149 | 0.457 | 2.390 | −0.349 | −0.052 | 2.390 |
| 876 | 0.182 | 0.502 | 2.390 | −0.376 | −0.104 | 2.390 |
| 877 | 0.215 | 0.545 | 2.390 | −0.400 | −0.153 | 2.390 |
| 878 | 0.247 | 0.587 | 2.390 | −0.423 | −0.202 | 2.390 |
| 879 | 0.278 | 0.626 | 2.390 | −0.444 | −0.249 | 2.390 |
| 880 | 0.309 | 0.663 | 2.390 | −0.464 | −0.294 | 2.390 |
| 881 | 0.338 | 0.699 | 2.390 | −0.482 | −0.338 | 2.390 |
| 882 | 0.367 | 0.733 | 2.390 | −0.499 | −0.380 | 2.390 |
| 883 | 0.395 | 0.765 | 2.390 | −0.515 | −0.421 | 2.390 |
| 884 | 0.420 | 0.792 | 2.390 | −0.529 | −0.458 | 2.390 |
| 885 | 0.442 | 0.817 | 2.390 | −0.540 | −0.492 | 2.390 |
| 886 | 0.463 | 0.839 | 2.390 | −0.550 | −0.522 | 2.390 |
| 887 | 0.483 | 0.861 | 2.390 | −0.558 | −0.550 | 2.390 |
| 888 | 0.500 | 0.879 | 2.390 | −0.564 | −0.575 | 2.390 |
| 889 | 0.513 | 0.893 | 2.390 | −0.568 | −0.595 | 2.390 |
| 890 | 0.524 | 0.904 | 2.390 | −0.570 | −0.611 | 2.390 |
| 891 | 0.532 | 0.912 | 2.390 | −0.570 | −0.622 | 2.390 |
| 892 | 0.538 | 0.918 | 2.390 | −0.569 | −0.631 | 2.390 |
| 893 | 0.541 | 0.924 | 2.390 | −0.568 | −0.636 | 2.390 |
| 894 | 0.541 | 0.928 | 2.390 | −0.566 | −0.639 | 2.390 |
| 895 | 0.540 | 0.930 | 2.390 | −0.565 | −0.640 | 2.390 |
| 896 | 0.539 | 0.931 | 2.390 | −0.564 | −0.640 | 2.390 |

In exemplary embodiments. TABLE II below contains Cartesian coordinate data of an airfoil shape 150 of an airfoil 100 of a rotor blade 44, which is disposed in the late stage 64 of the compressor section 14. Specifically. TABLE II below contains Cartesian coordinate data of an airfoil shape 150 of an airfoil 100 of a rotor blade 44, which is disposed in the twentieth stage S20 of the compressor section 14.

TABLE II

| | Pressure Surface | | | Suction Surface | | |
|---|---|---|---|---|---|---|
| N | X | Y | Z | X | Y | Z |
| 1 | −0.651 | −0.893 | 0.018 | 0.787 | 0.786 | 0.018 |
| 2 | −0.651 | −0.893 | 0.018 | 0.786 | 0.787 | 0.018 |
| 3 | −0.650 | −0.894 | 0.018 | 0.786 | 0.788 | 0.018 |
| 4 | −0.648 | −0.894 | 0.018 | 0.784 | 0.790 | 0.018 |
| 5 | −0.645 | −0.893 | 0.018 | 0.780 | 0.792 | 0.018 |
| 6 | −0.640 | −0.890 | 0.018 | 0.771 | 0.793 | 0.018 |
| 7 | −0.632 | −0.884 | 0.018 | 0.762 | 0.789 | 0.018 |
| 8 | −0.623 | −0.874 | 0.018 | 0.749 | 0.783 | 0.018 |
| 9 | −0.614 | −0.859 | 0.018 | 0.731 | 0.775 | 0.018 |
| 10 | −0.603 | −0.839 | 0.018 | 0.710 | 0.765 | 0.018 |
| 11 | −0.591 | −0.813 | 0.018 | 0.682 | 0.752 | 0.018 |
| 12 | −0.577 | −0.782 | 0.018 | 0.650 | 0.736 | 0.018 |
| 13 | −0.562 | −0.750 | 0.018 | 0.616 | 0.720 | 0.018 |
| 14 | −0.544 | −0.714 | 0.018 | 0.579 | 0.702 | 0.018 |
| 15 | −0.522 | −0.675 | 0.018 | 0.539 | 0.682 | 0.018 |
| 16 | −0.498 | −0.632 | 0.018 | 0.493 | 0.658 | 0.018 |
| 17 | −0.471 | −0.588 | 0.018 | 0.444 | 0.633 | 0.018 |
| 18 | −0.442 | −0.543 | 0.018 | 0.394 | 0.606 | 0.018 |
| 19 | −0.410 | −0.497 | 0.018 | 0.342 | 0.578 | 0.018 |
| 20 | −0.377 | −0.449 | 0.018 | 0.289 | 0.547 | 0.018 |
| 21 | −0.342 | −0.400 | 0.018 | 0.234 | 0.514 | 0.018 |
| 22 | −0.305 | −0.350 | 0.018 | 0.177 | 0.479 | 0.018 |
| 23 | −0.266 | −0.298 | 0.018 | 0.120 | 0.441 | 0.018 |
| 24 | −0.225 | −0.245 | 0.018 | 0.062 | 0.400 | 0.018 |
| 25 | −0.184 | −0.192 | 0.018 | 0.004 | 0.358 | 0.018 |
| 26 | −0.141 | −0.140 | 0.018 | −0.052 | 0.314 | 0.018 |
| 27 | −0.098 | −0.089 | 0.018 | −0.106 | 0.268 | 0.018 |
| 28 | −0.055 | −0.038 | 0.018 | −0.159 | 0.221 | 0.018 |
| 29 | −0.011 | 0.013 | 0.018 | −0.210 | 0.171 | 0.018 |
| 30 | 0.033 | 0.064 | 0.018 | −0.258 | 0.118 | 0.018 |
| 31 | 0.077 | 0.114 | 0.018 | −0.304 | 0.064 | 0.018 |
| 32 | 0.123 | 0.163 | 0.018 | −0.347 | 0.007 | 0.018 |
| 33 | 0.169 | 0.212 | 0.018 | −0.387 | −0.052 | 0.018 |
| 34 | 0.216 | 0.260 | 0.018 | −0.425 | −0.112 | 0.018 |
| 35 | 0.264 | 0.307 | 0.018 | −0.460 | −0.174 | 0.018 |
| 36 | 0.311 | 0.352 | 0.018 | −0.491 | −0.235 | 0.018 |
| 37 | 0.357 | 0.394 | 0.018 | −0.519 | −0.296 | 0.018 |
| 38 | 0.401 | 0.435 | 0.018 | −0.543 | −0.355 | 0.018 |

TABLE II-continued

| | Pressure Surface | | | Suction Surface | | | | | Pressure Surface | | | Suction Surface | | |
|---|---|---|---|---|---|---|---|---|---|---|---|---|---|---|
| N | X | Y | Z | X | Y | Z | N | X | Y | Z | X | Y | Z |
| 39 | 0.444 | 0.474 | 0.018 | −0.564 | −0.413 | 0.018 | 115 | −0.615 | −0.815 | 0.266 | 0.838 | 0.784 | 0.266 |
| 40 | 0.486 | 0.511 | 0.018 | −0.581 | −0.470 | 0.018 | 116 | −0.613 | −0.816 | 0.266 | 0.836 | 0.786 | 0.266 |
| 41 | 0.526 | 0.547 | 0.018 | −0.597 | −0.525 | 0.018 | 117 | −0.610 | −0.815 | 0.266 | 0.832 | 0.788 | 0.266 |
| 42 | 0.565 | 0.580 | 0.018 | −0.611 | −0.577 | 0.018 | 118 | −0.605 | −0.813 | 0.266 | 0.824 | 0.789 | 0.266 |
| 43 | 0.602 | 0.612 | 0.018 | −0.624 | −0.628 | 0.018 | 119 | −0.597 | −0.808 | 0.266 | 0.815 | 0.785 | 0.266 |
| 44 | 0.635 | 0.640 | 0.018 | −0.634 | −0.674 | 0.018 | 120 | −0.587 | −0.799 | 0.266 | 0.803 | 0.779 | 0.266 |
| 45 | 0.664 | 0.665 | 0.018 | −0.643 | −0.716 | 0.018 | 121 | −0.576 | −0.785 | 0.266 | 0.786 | 0.770 | 0.266 |
| 46 | 0.691 | 0.688 | 0.018 | −0.651 | −0.753 | 0.018 | 122 | −0.564 | −0.768 | 0.266 | 0.766 | 0.760 | 0.266 |
| 47 | 0.716 | 0.709 | 0.018 | −0.658 | −0.788 | 0.018 | 123 | −0.549 | −0.744 | 0.266 | 0.739 | 0.746 | 0.266 |
| 48 | 0.739 | 0.728 | 0.018 | −0.664 | −0.818 | 0.018 | 124 | −0.531 | −0.716 | 0.266 | 0.709 | 0.730 | 0.266 |
| 49 | 0.756 | 0.743 | 0.018 | −0.667 | −0.842 | 0.018 | 125 | −0.513 | −0.687 | 0.266 | 0.676 | 0.713 | 0.266 |
| 50 | 0.769 | 0.754 | 0.018 | −0.667 | −0.861 | 0.018 | 126 | −0.491 | −0.654 | 0.266 | 0.642 | 0.695 | 0.266 |
| 51 | 0.779 | 0.763 | 0.018 | −0.665 | −0.875 | 0.018 | 127 | −0.466 | −0.619 | 0.266 | 0.604 | 0.675 | 0.266 |
| 52 | 0.787 | 0.770 | 0.018 | −0.661 | −0.885 | 0.018 | 128 | −0.437 | −0.580 | 0.266 | 0.559 | 0.650 | 0.266 |
| 53 | 0.789 | 0.777 | 0.018 | −0.658 | −0.890 | 0.018 | 129 | −0.407 | −0.540 | 0.266 | 0.513 | 0.625 | 0.266 |
| 54 | 0.788 | 0.782 | 0.018 | −0.655 | −0.892 | 0.018 | 130 | −0.375 | −0.499 | 0.266 | 0.465 | 0.598 | 0.266 |
| 55 | 0.787 | 0.784 | 0.018 | −0.653 | −0.893 | 0.018 | 131 | −0.342 | −0.456 | 0.266 | 0.416 | 0.569 | 0.266 |
| 56 | 0.787 | 0.785 | 0.018 | −0.652 | −0.893 | 0.018 | 132 | −0.306 | −0.412 | 0.266 | 0.364 | 0.539 | 0.266 |
| 57 | −0.634 | −0.853 | 0.141 | 0.812 | 0.783 | 0.141 | 133 | −0.269 | −0.366 | 0.266 | 0.311 | 0.507 | 0.266 |
| 58 | −0.634 | −0.853 | 0.141 | 0.812 | 0.784 | 0.141 | 134 | −0.230 | −0.319 | 0.266 | 0.257 | 0.473 | 0.266 |
| 59 | −0.633 | −0.854 | 0.141 | 0.811 | 0.785 | 0.141 | 135 | −0.190 | −0.270 | 0.266 | 0.201 | 0.437 | 0.266 |
| 60 | −0.631 | −0.854 | 0.141 | 0.809 | 0.787 | 0.141 | 136 | −0.148 | −0.220 | 0.266 | 0.144 | 0.398 | 0.266 |
| 61 | −0.628 | −0.853 | 0.141 | 0.805 | 0.789 | 0.141 | 137 | −0.106 | −0.171 | 0.266 | 0.088 | 0.358 | 0.266 |
| 62 | −0.623 | −0.851 | 0.141 | 0.797 | 0.790 | 0.141 | 138 | −0.063 | −0.121 | 0.266 | 0.033 | 0.317 | 0.266 |
| 63 | −0.615 | −0.845 | 0.141 | 0.787 | 0.786 | 0.141 | 139 | −0.020 | −0.072 | 0.266 | −0.020 | 0.274 | 0.266 |
| 64 | −0.606 | −0.835 | 0.141 | 0.775 | 0.780 | 0.141 | 140 | 0.023 | −0.023 | 0.266 | −0.072 | 0.229 | 0.266 |
| 65 | −0.595 | −0.821 | 0.141 | 0.758 | 0.772 | 0.141 | 141 | 0.067 | 0.025 | 0.266 | −0.123 | 0.183 | 0.266 |
| 66 | −0.584 | −0.802 | 0.141 | 0.737 | 0.762 | 0.141 | 142 | 0.111 | 0.073 | 0.266 | −0.172 | 0.134 | 0.266 |
| 67 | −0.571 | −0.777 | 0.141 | 0.709 | 0.749 | 0.141 | 143 | 0.156 | 0.121 | 0.266 | −0.219 | 0.084 | 0.266 |
| 68 | −0.556 | −0.747 | 0.141 | 0.678 | 0.734 | 0.141 | 144 | 0.201 | 0.168 | 0.266 | −0.264 | 0.032 | 0.266 |
| 69 | −0.539 | −0.716 | 0.141 | 0.645 | 0.717 | 0.141 | 145 | 0.246 | 0.215 | 0.266 | −0.307 | −0.021 | 0.266 |
| 70 | −0.519 | −0.682 | 0.141 | 0.609 | 0.699 | 0.141 | 146 | 0.292 | 0.262 | 0.266 | −0.348 | −0.077 | 0.266 |
| 71 | −0.496 | −0.644 | 0.141 | 0.570 | 0.679 | 0.141 | 147 | 0.339 | 0.308 | 0.266 | −0.386 | −0.134 | 0.266 |
| 72 | −0.470 | −0.604 | 0.141 | 0.524 | 0.655 | 0.141 | 148 | 0.384 | 0.352 | 0.266 | −0.421 | −0.191 | 0.266 |
| 73 | −0.441 | −0.562 | 0.141 | 0.477 | 0.630 | 0.141 | 149 | 0.428 | 0.394 | 0.266 | −0.452 | −0.247 | 0.266 |
| 74 | −0.410 | −0.519 | 0.141 | 0.428 | 0.603 | 0.141 | 150 | 0.470 | 0.434 | 0.266 | −0.479 | −0.302 | 0.266 |
| 75 | −0.378 | −0.474 | 0.141 | 0.377 | 0.575 | 0.141 | 151 | 0.512 | 0.473 | 0.266 | −0.504 | −0.357 | 0.266 |
| 76 | −0.343 | −0.428 | 0.141 | 0.324 | 0.545 | 0.141 | 152 | 0.552 | 0.510 | 0.266 | −0.525 | −0.410 | 0.266 |
| 77 | −0.307 | −0.381 | 0.141 | 0.270 | 0.512 | 0.141 | 153 | 0.591 | 0.545 | 0.266 | −0.544 | −0.461 | 0.266 |
| 78 | −0.269 | −0.332 | 0.141 | 0.215 | 0.478 | 0.141 | 154 | 0.628 | 0.578 | 0.266 | −0.561 | −0.511 | 0.266 |
| 79 | −0.230 | −0.282 | 0.141 | 0.158 | 0.441 | 0.141 | 155 | 0.664 | 0.610 | 0.266 | −0.576 | −0.560 | 0.266 |
| 80 | −0.188 | −0.231 | 0.141 | 0.100 | 0.401 | 0.141 | 156 | 0.694 | 0.638 | 0.266 | −0.589 | −0.604 | 0.266 |
| 81 | −0.146 | −0.180 | 0.141 | 0.044 | 0.360 | 0.141 | 157 | 0.722 | 0.662 | 0.266 | −0.599 | −0.643 | 0.266 |
| 82 | −0.104 | −0.129 | 0.141 | −0.012 | 0.318 | 0.141 | 158 | 0.748 | 0.685 | 0.266 | −0.609 | −0.679 | 0.266 |
| 83 | −0.061 | −0.079 | 0.141 | −0.066 | 0.274 | 0.141 | 159 | 0.773 | 0.707 | 0.266 | −0.617 | −0.712 | 0.266 |
| 84 | −0.017 | −0.029 | 0.141 | −0.119 | 0.227 | 0.141 | 160 | 0.794 | 0.725 | 0.266 | −0.623 | −0.741 | 0.266 |
| 85 | 0.026 | 0.021 | 0.141 | −0.170 | 0.179 | 0.141 | 161 | 0.810 | 0.740 | 0.266 | −0.627 | −0.764 | 0.266 |
| 86 | 0.070 | 0.070 | 0.141 | −0.218 | 0.129 | 0.141 | 162 | 0.824 | 0.751 | 0.266 | −0.628 | −0.782 | 0.266 |
| 87 | 0.115 | 0.119 | 0.141 | −0.265 | 0.077 | 0.141 | 163 | 0.833 | 0.760 | 0.266 | −0.627 | −0.796 | 0.266 |
| 88 | 0.160 | 0.167 | 0.141 | −0.309 | 0.022 | 0.141 | 164 | 0.840 | 0.767 | 0.266 | −0.625 | −0.806 | 0.266 |
| 89 | 0.206 | 0.215 | 0.141 | −0.350 | −0.034 | 0.141 | 165 | 0.842 | 0.774 | 0.266 | −0.622 | −0.811 | 0.266 |
| 90 | 0.252 | 0.262 | 0.141 | −0.389 | −0.092 | 0.141 | 166 | 0.841 | 0.778 | 0.266 | −0.619 | −0.814 | 0.266 |
| 91 | 0.299 | 0.308 | 0.141 | −0.426 | −0.152 | 0.141 | 167 | 0.840 | 0.781 | 0.266 | −0.618 | −0.814 | 0.266 |
| 92 | 0.346 | 0.353 | 0.141 | −0.459 | −0.211 | 0.141 | 168 | 0.839 | 0.782 | 0.266 | −0.617 | −0.815 | 0.266 |
| 93 | 0.390 | 0.395 | 0.141 | −0.488 | −0.269 | 0.141 | 169 | −0.599 | −0.787 | 0.375 | 0.856 | 0.787 | 0.375 |
| 94 | 0.434 | 0.435 | 0.141 | −0.513 | −0.327 | 0.141 | 170 | −0.599 | −0.787 | 0.375 | 0.856 | 0.788 | 0.375 |
| 95 | 0.476 | 0.474 | 0.141 | −0.536 | −0.383 | 0.141 | 171 | −0.598 | −0.788 | 0.375 | 0.855 | 0.789 | 0.375 |
| 96 | 0.517 | 0.511 | 0.141 | −0.555 | −0.438 | 0.141 | 172 | −0.596 | −0.788 | 0.375 | 0.853 | 0.791 | 0.375 |
| 97 | 0.557 | 0.546 | 0.141 | −0.572 | −0.492 | 0.141 | 173 | −0.593 | −0.788 | 0.375 | 0.849 | 0.793 | 0.375 |
| 98 | 0.595 | 0.579 | 0.141 | −0.587 | −0.543 | 0.141 | 174 | −0.588 | −0.786 | 0.375 | 0.842 | 0.793 | 0.375 |
| 99 | 0.632 | 0.611 | 0.141 | −0.600 | −0.593 | 0.141 | 175 | −0.579 | −0.781 | 0.375 | 0.832 | 0.789 | 0.375 |
| 100 | 0.663 | 0.639 | 0.141 | −0.612 | −0.638 | 0.141 | 176 | −0.570 | −0.773 | 0.375 | 0.821 | 0.783 | 0.375 |
| 101 | 0.692 | 0.663 | 0.141 | −0.622 | −0.679 | 0.141 | 177 | −0.558 | −0.760 | 0.375 | 0.805 | 0.774 | 0.375 |
| 102 | 0.718 | 0.686 | 0.141 | −0.630 | −0.715 | 0.141 | 178 | −0.545 | −0.743 | 0.375 | 0.785 | 0.763 | 0.375 |
| 103 | 0.743 | 0.708 | 0.141 | −0.638 | −0.749 | 0.141 | 179 | −0.528 | −0.720 | 0.375 | 0.759 | 0.749 | 0.375 |
| 104 | 0.765 | 0.726 | 0.141 | −0.644 | −0.779 | 0.141 | 180 | −0.510 | −0.694 | 0.375 | 0.730 | 0.732 | 0.375 |
| 105 | 0.782 | 0.741 | 0.141 | −0.647 | −0.802 | 0.141 | 181 | −0.489 | −0.666 | 0.375 | 0.699 | 0.714 | 0.375 |
| 106 | 0.795 | 0.752 | 0.141 | −0.648 | −0.821 | 0.141 | 182 | −0.466 | −0.635 | 0.375 | 0.665 | 0.695 | 0.375 |
| 107 | 0.806 | 0.761 | 0.141 | −0.646 | −0.835 | 0.141 | 183 | −0.440 | −0.601 | 0.375 | 0.628 | 0.674 | 0.375 |
| 108 | 0.812 | 0.768 | 0.141 | −0.643 | −0.845 | 0.141 | 184 | −0.410 | −0.563 | 0.375 | 0.585 | 0.649 | 0.375 |
| 109 | 0.814 | 0.775 | 0.141 | −0.640 | −0.849 | 0.141 | 185 | −0.379 | −0.525 | 0.375 | 0.540 | 0.623 | 0.375 |
| 110 | 0.814 | 0.779 | 0.141 | −0.637 | −0.852 | 0.141 | 186 | −0.346 | −0.484 | 0.375 | 0.494 | 0.595 | 0.375 |
| 111 | 0.813 | 0.782 | 0.141 | −0.636 | −0.853 | 0.141 | 187 | −0.312 | −0.443 | 0.375 | 0.445 | 0.566 | 0.375 |
| 112 | 0.812 | 0.783 | 0.141 | −0.635 | −0.853 | 0.141 | 188 | −0.276 | −0.400 | 0.375 | 0.395 | 0.535 | 0.375 |
| 113 | −0.616 | −0.815 | 0.266 | 0.839 | 0.782 | 0.266 | 189 | −0.238 | −0.355 | 0.375 | 0.343 | 0.503 | 0.375 |
| 114 | −0.616 | −0.815 | 0.266 | 0.839 | 0.783 | 0.266 | 190 | −0.199 | −0.309 | 0.375 | 0.290 | 0.469 | 0.375 |

TABLE II-continued

| | Pressure Surface | | | Suction Surface | | |
|---|---|---|---|---|---|---|
| N | X | Y | Z | X | Y | Z |
| 191 | −0.159 | −0.262 | 0.375 | 0.236 | 0.432 | 0.375 |
| 192 | −0.116 | −0.213 | 0.375 | 0.180 | 0.394 | 0.375 |
| 193 | −0.074 | −0.164 | 0.375 | 0.125 | 0.354 | 0.375 |
| 194 | −0.031 | −0.116 | 0.375 | 0.071 | 0.313 | 0.375 |
| 195 | 0.012 | −0.067 | 0.375 | 0.018 | 0.271 | 0.375 |
| 196 | 0.055 | −0.019 | 0.375 | −0.033 | 0.227 | 0.375 |
| 197 | 0.099 | 0.029 | 0.375 | −0.084 | 0.182 | 0.375 |
| 198 | 0.143 | 0.076 | 0.375 | −0.133 | 0.135 | 0.375 |
| 199 | 0.187 | 0.124 | 0.375 | −0.180 | 0.086 | 0.375 |
| 200 | 0.232 | 0.171 | 0.375 | −0.226 | 0.036 | 0.375 |
| 201 | 0.277 | 0.217 | 0.375 | −0.269 | −0.016 | 0.375 |
| 202 | 0.322 | 0.263 | 0.375 | −0.311 | −0.069 | 0.375 |
| 203 | 0.368 | 0.309 | 0.375 | −0.350 | −0.124 | 0.375 |
| 204 | 0.412 | 0.353 | 0.375 | −0.386 | −0.179 | 0.375 |
| 205 | 0.455 | 0.396 | 0.375 | −0.418 | −0.233 | 0.375 |
| 206 | 0.497 | 0.436 | 0.375 | −0.448 | −0.287 | 0.375 |
| 207 | 0.537 | 0.475 | 0.375 | −0.474 | −0.339 | 0.375 |
| 208 | 0.577 | 0.512 | 0.375 | −0.497 | −0.391 | 0.375 |
| 209 | 0.614 | 0.548 | 0.375 | −0.518 | −0.441 | 0.375 |
| 210 | 0.651 | 0.581 | 0.375 | −0.536 | −0.489 | 0.375 |
| 211 | 0.686 | 0.613 | 0.375 | −0.553 | −0.536 | 0.375 |
| 212 | 0.716 | 0.641 | 0.375 | −0.566 | −0.579 | 0.375 |
| 213 | 0.743 | 0.666 | 0.375 | −0.578 | −0.618 | 0.375 |
| 214 | 0.769 | 0.689 | 0.375 | −0.588 | −0.653 | 0.375 |
| 215 | 0.792 | 0.711 | 0.375 | −0.597 | −0.686 | 0.375 |
| 216 | 0.813 | 0.730 | 0.375 | −0.604 | −0.714 | 0.375 |
| 217 | 0.829 | 0.744 | 0.375 | −0.608 | −0.736 | 0.375 |
| 218 | 0.842 | 0.756 | 0.375 | −0.610 | −0.754 | 0.375 |
| 219 | 0.852 | 0.765 | 0.375 | −0.609 | −0.768 | 0.375 |
| 220 | 0.858 | 0.772 | 0.375 | −0.607 | −0.778 | 0.375 |
| 221 | 0.859 | 0.779 | 0.375 | −0.604 | −0.783 | 0.375 |
| 222 | 0.858 | 0.784 | 0.375 | −0.602 | −0.786 | 0.375 |
| 223 | 0.857 | 0.786 | 0.375 | −0.600 | −0.787 | 0.375 |
| 224 | 0.857 | 0.787 | 0.375 | −0.600 | −0.787 | 0.375 |
| 225 | −0.584 | −0.769 | 0.507 | 0.868 | 0.800 | 0.507 |
| 226 | −0.584 | −0.769 | 0.507 | 0.868 | 0.801 | 0.507 |
| 227 | −0.583 | −0.770 | 0.507 | 0.867 | 0.802 | 0.507 |
| 228 | −0.581 | −0.770 | 0.507 | 0.865 | 0.803 | 0.507 |
| 229 | −0.578 | −0.770 | 0.507 | 0.861 | 0.805 | 0.507 |
| 230 | −0.572 | −0.769 | 0.507 | 0.854 | 0.806 | 0.507 |
| 231 | −0.564 | −0.764 | 0.507 | 0.845 | 0.801 | 0.507 |
| 232 | −0.554 | −0.756 | 0.507 | 0.833 | 0.794 | 0.507 |
| 233 | −0.541 | −0.744 | 0.507 | 0.818 | 0.785 | 0.507 |
| 234 | −0.527 | −0.728 | 0.507 | 0.799 | 0.773 | 0.507 |
| 235 | −0.509 | −0.707 | 0.507 | 0.775 | 0.757 | 0.507 |
| 236 | −0.489 | −0.682 | 0.507 | 0.747 | 0.739 | 0.507 |
| 237 | −0.467 | −0.655 | 0.507 | 0.716 | 0.720 | 0.507 |
| 238 | −0.443 | −0.625 | 0.507 | 0.684 | 0.700 | 0.507 |
| 239 | −0.415 | −0.592 | 0.507 | 0.649 | 0.677 | 0.507 |
| 240 | −0.385 | −0.556 | 0.507 | 0.607 | 0.651 | 0.507 |
| 241 | −0.353 | −0.518 | 0.507 | 0.564 | 0.623 | 0.507 |
| 242 | −0.319 | −0.479 | 0.507 | 0.519 | 0.594 | 0.507 |
| 243 | −0.284 | −0.438 | 0.507 | 0.473 | 0.563 | 0.507 |
| 244 | −0.248 | −0.396 | 0.507 | 0.424 | 0.531 | 0.507 |
| 245 | −0.210 | −0.352 | 0.507 | 0.374 | 0.497 | 0.507 |
| 246 | −0.170 | −0.306 | 0.507 | 0.323 | 0.462 | 0.507 |
| 247 | −0.129 | −0.259 | 0.507 | 0.270 | 0.425 | 0.507 |
| 248 | −0.087 | −0.211 | 0.507 | 0.216 | 0.385 | 0.507 |
| 249 | −0.044 | −0.162 | 0.507 | 0.163 | 0.345 | 0.507 |
| 250 | −0.001 | −0.114 | 0.507 | 0.110 | 0.304 | 0.507 |
| 251 | 0.042 | −0.066 | 0.507 | 0.058 | 0.261 | 0.507 |
| 252 | 0.085 | −0.018 | 0.507 | 0.007 | 0.218 | 0.507 |
| 253 | 0.128 | 0.030 | 0.507 | −0.043 | 0.173 | 0.507 |
| 254 | 0.172 | 0.078 | 0.507 | −0.091 | 0.127 | 0.507 |
| 255 | 0.215 | 0.125 | 0.507 | −0.139 | 0.080 | 0.507 |
| 256 | 0.259 | 0.172 | 0.507 | −0.184 | 0.031 | 0.507 |
| 257 | 0.303 | 0.219 | 0.507 | −0.228 | −0.019 | 0.507 |
| 258 | 0.348 | 0.266 | 0.507 | −0.271 | −0.071 | 0.507 |
| 259 | 0.393 | 0.313 | 0.507 | −0.311 | −0.125 | 0.507 |
| 260 | 0.436 | 0.357 | 0.507 | −0.348 | −0.178 | 0.507 |
| 261 | 0.478 | 0.400 | 0.507 | −0.382 | −0.230 | 0.507 |
| 262 | 0.519 | 0.441 | 0.507 | −0.413 | −0.282 | 0.507 |
| 263 | 0.559 | 0.481 | 0.507 | −0.441 | −0.333 | 0.507 |
| 264 | 0.597 | 0.519 | 0.507 | −0.466 | −0.382 | 0.507 |
| 265 | 0.634 | 0.555 | 0.507 | −0.489 | −0.431 | 0.507 |
| 266 | 0.669 | 0.590 | 0.507 | −0.510 | −0.478 | 0.507 |
| 267 | 0.703 | 0.623 | 0.507 | −0.528 | −0.523 | 0.507 |
| 268 | 0.733 | 0.651 | 0.507 | −0.544 | −0.565 | 0.507 |
| 269 | 0.759 | 0.676 | 0.507 | −0.557 | −0.603 | 0.507 |
| 270 | 0.784 | 0.700 | 0.507 | −0.568 | −0.637 | 0.507 |
| 271 | 0.807 | 0.723 | 0.507 | −0.578 | −0.669 | 0.507 |
| 272 | 0.827 | 0.742 | 0.507 | −0.586 | −0.697 | 0.507 |
| 273 | 0.843 | 0.757 | 0.507 | −0.590 | −0.719 | 0.507 |
| 274 | 0.855 | 0.769 | 0.507 | −0.593 | −0.736 | 0.507 |
| 275 | 0.864 | 0.778 | 0.507 | −0.593 | −0.750 | 0.507 |
| 276 | 0.870 | 0.785 | 0.507 | −0.591 | −0.760 | 0.507 |
| 277 | 0.872 | 0.793 | 0.507 | −0.589 | −0.765 | 0.507 |
| 278 | 0.871 | 0.797 | 0.507 | −0.587 | −0.767 | 0.507 |
| 279 | 0.869 | 0.799 | 0.507 | −0.585 | −0.769 | 0.507 |
| 280 | 0.869 | 0.800 | 0.507 | −0.584 | −0.769 | 0.507 |
| 281 | −0.574 | −0.774 | 0.683 | 0.871 | 0.835 | 0.683 |
| 282 | −0.573 | −0.774 | 0.683 | 0.871 | 0.835 | 0.683 |
| 283 | −0.573 | −0.774 | 0.683 | 0.870 | 0.836 | 0.683 |
| 284 | −0.571 | −0.775 | 0.683 | 0.868 | 0.838 | 0.683 |
| 285 | −0.568 | −0.775 | 0.683 | 0.864 | 0.839 | 0.683 |
| 286 | −0.562 | −0.774 | 0.683 | 0.856 | 0.839 | 0.683 |
| 287 | −0.553 | −0.770 | 0.683 | 0.848 | 0.834 | 0.683 |
| 288 | −0.543 | −0.762 | 0.683 | 0.837 | 0.826 | 0.683 |
| 289 | −0.530 | −0.751 | 0.683 | 0.823 | 0.815 | 0.683 |
| 290 | −0.514 | −0.735 | 0.683 | 0.805 | 0.802 | 0.683 |
| 291 | −0.495 | −0.714 | 0.683 | 0.782 | 0.785 | 0.683 |
| 292 | −0.474 | −0.690 | 0.683 | 0.755 | 0.765 | 0.683 |
| 293 | −0.451 | −0.663 | 0.683 | 0.726 | 0.743 | 0.683 |
| 294 | −0.425 | −0.634 | 0.683 | 0.696 | 0.721 | 0.683 |
| 295 | −0.397 | −0.601 | 0.683 | 0.662 | 0.695 | 0.683 |
| 296 | −0.365 | −0.565 | 0.683 | 0.623 | 0.666 | 0.683 |
| 297 | −0.333 | −0.527 | 0.683 | 0.582 | 0.635 | 0.683 |
| 298 | −0.299 | −0.488 | 0.683 | 0.539 | 0.603 | 0.683 |
| 299 | −0.263 | −0.447 | 0.683 | 0.494 | 0.569 | 0.683 |
| 300 | −0.226 | −0.404 | 0.683 | 0.448 | 0.534 | 0.683 |
| 301 | −0.187 | −0.359 | 0.683 | 0.401 | 0.497 | 0.683 |
| 302 | −0.148 | −0.313 | 0.683 | 0.351 | 0.459 | 0.683 |
| 303 | −0.106 | −0.266 | 0.683 | 0.301 | 0.419 | 0.683 |
| 304 | −0.064 | −0.216 | 0.683 | 0.249 | 0.376 | 0.683 |
| 305 | −0.021 | −0.167 | 0.683 | 0.197 | 0.334 | 0.683 |
| 306 | 0.022 | −0.118 | 0.683 | 0.146 | 0.290 | 0.683 |
| 307 | 0.064 | −0.068 | 0.683 | 0.096 | 0.246 | 0.683 |
| 308 | 0.107 | −0.019 | 0.683 | 0.046 | 0.202 | 0.683 |
| 309 | 0.150 | 0.030 | 0.683 | −0.003 | 0.156 | 0.683 |
| 310 | 0.193 | 0.080 | 0.683 | −0.050 | 0.109 | 0.683 |
| 311 | 0.236 | 0.129 | 0.683 | −0.097 | 0.061 | 0.683 |
| 312 | 0.279 | 0.177 | 0.683 | −0.143 | 0.012 | 0.683 |
| 313 | 0.322 | 0.226 | 0.683 | −0.187 | −0.038 | 0.683 |
| 314 | 0.366 | 0.275 | 0.683 | −0.230 | −0.089 | 0.683 |
| 315 | 0.410 | 0.323 | 0.683 | −0.271 | −0.142 | 0.683 |
| 316 | 0.452 | 0.370 | 0.683 | −0.309 | −0.194 | 0.683 |
| 317 | 0.493 | 0.415 | 0.683 | −0.345 | −0.245 | 0.683 |
| 318 | 0.533 | 0.458 | 0.683 | −0.378 | −0.296 | 0.683 |
| 319 | 0.572 | 0.499 | 0.683 | −0.408 | −0.345 | 0.683 |
| 320 | 0.609 | 0.539 | 0.683 | −0.436 | −0.394 | 0.683 |
| 321 | 0.645 | 0.577 | 0.683 | −0.461 | −0.441 | 0.683 |
| 322 | 0.679 | 0.613 | 0.683 | −0.484 | −0.487 | 0.683 |
| 323 | 0.712 | 0.648 | 0.683 | −0.505 | −0.531 | 0.683 |
| 324 | 0.740 | 0.678 | 0.683 | −0.523 | −0.572 | 0.683 |
| 325 | 0.766 | 0.705 | 0.683 | −0.538 | −0.609 | 0.683 |
| 326 | 0.790 | 0.730 | 0.683 | −0.551 | −0.642 | 0.683 |
| 327 | 0.813 | 0.753 | 0.683 | −0.562 | −0.674 | 0.683 |
| 328 | 0.832 | 0.774 | 0.683 | −0.572 | −0.701 | 0.683 |
| 329 | 0.847 | 0.790 | 0.683 | −0.577 | −0.723 | 0.683 |
| 330 | 0.859 | 0.802 | 0.683 | −0.581 | −0.740 | 0.683 |
| 331 | 0.868 | 0.812 | 0.683 | −0.581 | −0.754 | 0.683 |
| 332 | 0.874 | 0.819 | 0.683 | −0.580 | −0.764 | 0.683 |
| 333 | 0.875 | 0.827 | 0.683 | −0.578 | −0.769 | 0.683 |
| 334 | 0.874 | 0.831 | 0.683 | −0.576 | −0.772 | 0.683 |
| 335 | 0.872 | 0.833 | 0.683 | −0.575 | −0.773 | 0.683 |
| 336 | 0.872 | 0.834 | 0.683 | −0.574 | −0.773 | 0.683 |
| 337 | −0.579 | −0.836 | 1.057 | 0.841 | 0.955 | 1.057 |
| 338 | −0.579 | −0.836 | 1.057 | 0.840 | 0.956 | 1.057 |
| 339 | −0.578 | −0.837 | 1.057 | 0.839 | 0.956 | 1.057 |
| 340 | −0.576 | −0.837 | 1.057 | 0.837 | 0.958 | 1.057 |
| 341 | −0.573 | −0.837 | 1.057 | 0.832 | 0.959 | 1.057 |
| 342 | −0.567 | −0.836 | 1.057 | 0.824 | 0.958 | 1.057 |

TABLE II-continued

| | Pressure Surface | | | Suction Surface | | | | | Pressure Surface | | | Suction Surface | | |
|---|---|---|---|---|---|---|---|---|---|---|---|---|---|---|
| N | X | Y | Z | X | Y | Z | N | X | Y | Z | X | Y | Z |
| 343 | −0.558 | −0.832 | 1.057 | 0.816 | 0.951 | 1.057 | 419 | 0.040 | −0.027 | 1.266 | 0.100 | 0.278 | 1.266 |
| 344 | −0.546 | −0.824 | 1.057 | 0.806 | 0.941 | 1.057 | 420 | 0.082 | 0.030 | 1.266 | 0.053 | 0.224 | 1.266 |
| 345 | −0.533 | −0.811 | 1.057 | 0.793 | 0.928 | 1.057 | 421 | 0.123 | 0.086 | 1.266 | 0.007 | 0.170 | 1.266 |
| 346 | −0.517 | −0.795 | 1.057 | 0.776 | 0.912 | 1.057 | 422 | 0.165 | 0.143 | 1.266 | −0.038 | 0.115 | 1.266 |
| 347 | −0.497 | −0.772 | 1.057 | 0.755 | 0.891 | 1.057 | 423 | 0.206 | 0.200 | 1.266 | −0.082 | 0.060 | 1.266 |
| 348 | −0.475 | −0.745 | 1.057 | 0.730 | 0.866 | 1.057 | 424 | 0.248 | 0.256 | 1.266 | −0.126 | 0.004 | 1.266 |
| 349 | −0.452 | −0.717 | 1.057 | 0.703 | 0.840 | 1.057 | 425 | 0.290 | 0.313 | 1.266 | −0.169 | −0.053 | 1.266 |
| 350 | −0.426 | −0.685 | 1.057 | 0.675 | 0.813 | 1.057 | 426 | 0.332 | 0.369 | 1.266 | −0.211 | −0.110 | 1.266 |
| 351 | −0.398 | −0.649 | 1.057 | 0.643 | 0.782 | 1.057 | 427 | 0.374 | 0.425 | 1.266 | −0.252 | −0.168 | 1.266 |
| 352 | −0.366 | −0.609 | 1.057 | 0.607 | 0.746 | 1.057 | 428 | 0.415 | 0.479 | 1.266 | −0.290 | −0.225 | 1.266 |
| 353 | −0.333 | −0.567 | 1.057 | 0.568 | 0.708 | 1.057 | 429 | 0.454 | 0.532 | 1.266 | −0.327 | −0.280 | 1.266 |
| 354 | −0.299 | −0.524 | 1.057 | 0.529 | 0.669 | 1.057 | 430 | 0.493 | 0.582 | 1.266 | −0.361 | −0.334 | 1.266 |
| 355 | −0.264 | −0.479 | 1.057 | 0.487 | 0.628 | 1.057 | 431 | 0.530 | 0.630 | 1.266 | −0.393 | −0.386 | 1.266 |
| 356 | −0.227 | −0.431 | 1.057 | 0.444 | 0.586 | 1.057 | 432 | 0.565 | 0.677 | 1.266 | −0.423 | −0.437 | 1.266 |
| 357 | −0.189 | −0.382 | 1.057 | 0.400 | 0.541 | 1.057 | 433 | 0.600 | 0.721 | 1.266 | −0.451 | −0.487 | 1.266 |
| 358 | −0.150 | −0.331 | 1.057 | 0.354 | 0.495 | 1.057 | 434 | 0.633 | 0.763 | 1.266 | −0.477 | −0.534 | 1.266 |
| 359 | −0.109 | −0.279 | 1.057 | 0.306 | 0.447 | 1.057 | 435 | 0.665 | 0.804 | 1.266 | −0.501 | −0.580 | 1.266 |
| 360 | −0.067 | −0.224 | 1.057 | 0.258 | 0.397 | 1.057 | 436 | 0.692 | 0.839 | 1.266 | −0.522 | −0.623 | 1.266 |
| 361 | −0.025 | −0.169 | 1.057 | 0.209 | 0.347 | 1.057 | 437 | 0.717 | 0.870 | 1.266 | −0.541 | −0.661 | 1.266 |
| 362 | 0.017 | −0.114 | 1.057 | 0.161 | 0.296 | 1.057 | 438 | 0.740 | 0.900 | 1.266 | −0.557 | −0.696 | 1.266 |
| 363 | 0.059 | −0.059 | 1.057 | 0.114 | 0.245 | 1.057 | 439 | 0.762 | 0.927 | 1.266 | −0.571 | −0.728 | 1.266 |
| 364 | 0.101 | −0.005 | 1.057 | 0.066 | 0.194 | 1.057 | 440 | 0.781 | 0.951 | 1.266 | −0.582 | −0.757 | 1.266 |
| 365 | 0.142 | 0.050 | 1.057 | 0.020 | 0.142 | 1.057 | 441 | 0.795 | 0.969 | 1.266 | −0.590 | −0.779 | 1.266 |
| 366 | 0.184 | 0.105 | 1.057 | −0.026 | 0.089 | 1.057 | 442 | 0.807 | 0.984 | 1.266 | −0.594 | −0.797 | 1.266 |
| 367 | 0.226 | 0.160 | 1.057 | −0.071 | 0.036 | 1.057 | 443 | 0.816 | 0.995 | 1.266 | −0.596 | −0.812 | 1.266 |
| 368 | 0.268 | 0.215 | 1.057 | −0.116 | −0.018 | 1.057 | 444 | 0.822 | 1.004 | 1.266 | −0.596 | −0.822 | 1.266 |
| 369 | 0.311 | 0.269 | 1.057 | −0.159 | −0.073 | 1.057 | 445 | 0.822 | 1.012 | 1.266 | −0.594 | −0.828 | 1.266 |
| 370 | 0.353 | 0.324 | 1.057 | −0.202 | −0.128 | 1.057 | 446 | 0.821 | 1.016 | 1.266 | −0.592 | −0.831 | 1.266 |
| 371 | 0.395 | 0.378 | 1.057 | −0.243 | −0.184 | 1.057 | 447 | 0.819 | 1.018 | 1.266 | −0.591 | −0.832 | 1.266 |
| 372 | 0.437 | 0.431 | 1.057 | −0.282 | −0.239 | 1.057 | 448 | 0.818 | 1.019 | 1.266 | −0.590 | −0.833 | 1.266 |
| 373 | 0.476 | 0.481 | 1.057 | −0.319 | −0.293 | 1.057 | 449 | −0.608 | −0.775 | 1.478 | 0.795 | 1.073 | 1.478 |
| 374 | 0.515 | 0.530 | 1.057 | −0.353 | −0.346 | 1.057 | 450 | −0.607 | −0.775 | 1.478 | 0.794 | 1.074 | 1.478 |
| 375 | 0.552 | 0.577 | 1.057 | −0.386 | −0.397 | 1.057 | 451 | −0.607 | −0.776 | 1.478 | 0.793 | 1.074 | 1.478 |
| 376 | 0.588 | 0.622 | 1.057 | −0.416 | −0.447 | 1.057 | 452 | −0.605 | −0.776 | 1.478 | 0.791 | 1.076 | 1.478 |
| 377 | 0.623 | 0.665 | 1.057 | −0.443 | −0.495 | 1.057 | 453 | −0.601 | −0.776 | 1.478 | 0.786 | 1.077 | 1.478 |
| 378 | 0.656 | 0.706 | 1.057 | −0.469 | −0.542 | 1.057 | 454 | −0.595 | −0.774 | 1.478 | 0.778 | 1.075 | 1.478 |
| 379 | 0.687 | 0.745 | 1.057 | −0.493 | −0.587 | 1.057 | 455 | −0.586 | −0.769 | 1.478 | 0.770 | 1.068 | 1.478 |
| 380 | 0.715 | 0.779 | 1.057 | −0.514 | −0.629 | 1.057 | 456 | −0.575 | −0.761 | 1.478 | 0.760 | 1.058 | 1.478 |
| 381 | 0.740 | 0.810 | 1.057 | −0.532 | −0.667 | 1.057 | 457 | −0.562 | −0.748 | 1.478 | 0.747 | 1.045 | 1.478 |
| 382 | 0.763 | 0.838 | 1.057 | −0.547 | −0.701 | 1.057 | 458 | −0.546 | −0.730 | 1.478 | 0.730 | 1.028 | 1.478 |
| 383 | 0.785 | 0.865 | 1.057 | −0.561 | −0.733 | 1.057 | 459 | −0.527 | −0.707 | 1.478 | 0.708 | 1.007 | 1.478 |
| 384 | 0.803 | 0.888 | 1.057 | −0.572 | −0.761 | 1.057 | 460 | −0.506 | −0.679 | 1.478 | 0.683 | 0.982 | 1.478 |
| 385 | 0.818 | 0.906 | 1.057 | −0.580 | −0.783 | 1.057 | 461 | −0.484 | −0.649 | 1.478 | 0.656 | 0.955 | 1.478 |
| 386 | 0.830 | 0.920 | 1.057 | −0.584 | −0.801 | 1.057 | 462 | −0.459 | −0.615 | 1.478 | 0.628 | 0.927 | 1.478 |
| 387 | 0.838 | 0.931 | 1.057 | −0.586 | −0.815 | 1.057 | 463 | −0.431 | −0.577 | 1.478 | 0.596 | 0.895 | 1.478 |
| 388 | 0.844 | 0.939 | 1.057 | −0.585 | −0.825 | 1.057 | 464 | −0.401 | −0.536 | 1.478 | 0.560 | 0.858 | 1.478 |
| 389 | 0.845 | 0.947 | 1.057 | −0.584 | −0.831 | 1.057 | 465 | −0.370 | −0.492 | 1.478 | 0.521 | 0.820 | 1.478 |
| 390 | 0.843 | 0.952 | 1.057 | −0.582 | −0.834 | 1.057 | 466 | −0.337 | −0.447 | 1.478 | 0.482 | 0.779 | 1.478 |
| 391 | 0.842 | 0.954 | 1.057 | −0.580 | −0.835 | 1.057 | 467 | −0.303 | −0.399 | 1.478 | 0.441 | 0.737 | 1.478 |
| 392 | 0.841 | 0.955 | 1.057 | −0.580 | −0.836 | 1.057 | 468 | −0.267 | −0.350 | 1.478 | 0.398 | 0.693 | 1.478 |
| 393 | −0.590 | −0.833 | 1.266 | 0.818 | 1.020 | 1.266 | 469 | −0.231 | −0.299 | 1.478 | 0.354 | 0.646 | 1.478 |
| 394 | −0.589 | −0.833 | 1.266 | 0.817 | 1.020 | 1.266 | 470 | −0.192 | −0.246 | 1.478 | 0.309 | 0.598 | 1.478 |
| 395 | −0.588 | −0.834 | 1.266 | 0.816 | 1.021 | 1.266 | 471 | −0.153 | −0.191 | 1.478 | 0.262 | 0.548 | 1.478 |
| 396 | −0.586 | −0.834 | 1.266 | 0.814 | 1.022 | 1.266 | 472 | −0.112 | −0.134 | 1.478 | 0.214 | 0.496 | 1.478 |
| 397 | −0.583 | −0.834 | 1.266 | 0.809 | 1.023 | 1.266 | 473 | −0.071 | −0.078 | 1.478 | 0.167 | 0.444 | 1.478 |
| 398 | −0.577 | −0.833 | 1.266 | 0.801 | 1.021 | 1.266 | 474 | −0.029 | −0.021 | 1.478 | 0.119 | 0.391 | 1.478 |
| 399 | −0.568 | −0.828 | 1.266 | 0.794 | 1.014 | 1.266 | 475 | 0.012 | 0.036 | 1.478 | 0.073 | 0.338 | 1.478 |
| 400 | −0.557 | −0.819 | 1.266 | 0.784 | 1.004 | 1.266 | 476 | 0.053 | 0.092 | 1.478 | 0.027 | 0.284 | 1.478 |
| 401 | −0.543 | −0.807 | 1.266 | 0.770 | 0.991 | 1.266 | 477 | 0.094 | 0.149 | 1.478 | −0.019 | 0.230 | 1.478 |
| 402 | −0.527 | −0.789 | 1.266 | 0.754 | 0.974 | 1.266 | 478 | 0.136 | 0.205 | 1.478 | −0.064 | 0.175 | 1.478 |
| 403 | −0.508 | −0.766 | 1.266 | 0.732 | 0.952 | 1.266 | 479 | 0.177 | 0.261 | 1.478 | −0.108 | 0.120 | 1.478 |
| 404 | −0.486 | −0.738 | 1.266 | 0.707 | 0.927 | 1.266 | 480 | 0.219 | 0.318 | 1.478 | −0.151 | 0.063 | 1.478 |
| 405 | −0.463 | −0.709 | 1.266 | 0.681 | 0.899 | 1.266 | 481 | 0.261 | 0.374 | 1.478 | −0.193 | 0.007 | 1.478 |
| 406 | −0.438 | −0.675 | 1.266 | 0.653 | 0.871 | 1.266 | 482 | 0.303 | 0.430 | 1.478 | −0.235 | −0.051 | 1.478 |
| 407 | −0.409 | −0.638 | 1.266 | 0.622 | 0.838 | 1.266 | 483 | 0.345 | 0.486 | 1.478 | −0.276 | −0.109 | 1.478 |
| 408 | −0.378 | −0.597 | 1.266 | 0.585 | 0.801 | 1.266 | 484 | 0.386 | 0.540 | 1.478 | −0.314 | −0.165 | 1.478 |
| 409 | −0.346 | −0.554 | 1.266 | 0.548 | 0.762 | 1.266 | 485 | 0.426 | 0.591 | 1.478 | −0.350 | −0.221 | 1.478 |
| 410 | −0.313 | −0.508 | 1.266 | 0.508 | 0.721 | 1.266 | 486 | 0.464 | 0.641 | 1.478 | −0.383 | −0.275 | 1.478 |
| 411 | −0.278 | −0.461 | 1.266 | 0.467 | 0.678 | 1.266 | 487 | 0.502 | 0.689 | 1.478 | −0.415 | −0.328 | 1.478 |
| 412 | −0.242 | −0.412 | 1.266 | 0.425 | 0.634 | 1.266 | 488 | 0.538 | 0.735 | 1.478 | −0.445 | −0.379 | 1.478 |
| 413 | −0.204 | −0.361 | 1.266 | 0.381 | 0.587 | 1.266 | 489 | 0.573 | 0.779 | 1.478 | −0.472 | −0.428 | 1.478 |
| 414 | −0.166 | −0.309 | 1.266 | 0.336 | 0.539 | 1.266 | 490 | 0.606 | 0.821 | 1.478 | −0.498 | −0.476 | 1.478 |
| 415 | −0.125 | −0.254 | 1.266 | 0.289 | 0.489 | 1.266 | 491 | 0.638 | 0.861 | 1.478 | −0.521 | −0.522 | 1.478 |
| 416 | −0.084 | −0.197 | 1.266 | 0.241 | 0.436 | 1.266 | 492 | 0.666 | 0.895 | 1.478 | −0.542 | −0.565 | 1.478 |
| 417 | −0.043 | −0.140 | 1.266 | 0.194 | 0.384 | 1.266 | 493 | 0.691 | 0.926 | 1.478 | −0.560 | −0.603 | 1.478 |
| 418 | −0.001 | −0.084 | 1.266 | 0.146 | 0.331 | 1.266 | 494 | 0.715 | 0.955 | 1.478 | −0.576 | −0.637 | 1.478 |

TABLE II-continued

| | Pressure Surface | | | Suction Surface | | |
|---|---|---|---|---|---|---|
| N | X | Y | Z | X | Y | Z |
| 495 | 0.737 | 0.982 | 1.478 | −0.590 | −0.670 | 1.478 |
| 496 | 0.756 | 1.005 | 1.478 | −0.601 | −0.699 | 1.478 |
| 497 | 0.771 | 1.023 | 1.478 | −0.608 | −0.721 | 1.478 |
| 498 | 0.783 | 1.038 | 1.478 | −0.612 | −0.739 | 1.478 |
| 499 | 0.792 | 1.049 | 1.478 | −0.614 | −0.754 | 1.478 |
| 500 | 0.798 | 1.057 | 1.478 | −0.614 | −0.764 | 1.478 |
| 501 | 0.799 | 1.065 | 1.478 | −0.612 | −0.770 | 1.478 |
| 502 | 0.798 | 1.069 | 1.478 | −0.610 | −0.773 | 1.478 |
| 503 | 0.796 | 1.072 | 1.478 | −0.609 | −0.774 | 1.478 |
| 504 | 0.795 | 1.073 | 1.478 | −0.608 | −0.775 | 1.478 |
| 505 | −0.643 | −0.621 | 1.928 | 0.747 | 1.150 | 1.928 |
| 506 | −0.643 | −0.621 | 1.928 | 0.747 | 1.151 | 1.928 |
| 507 | −0.642 | −0.622 | 1.928 | 0.746 | 1.152 | 1.928 |
| 508 | −0.640 | −0.622 | 1.928 | 0.744 | 1.153 | 1.928 |
| 509 | −0.637 | −0.622 | 1.928 | 0.739 | 1.154 | 1.928 |
| 510 | −0.631 | −0.620 | 1.928 | 0.732 | 1.153 | 1.928 |
| 511 | −0.623 | −0.615 | 1.928 | 0.723 | 1.146 | 1.928 |
| 512 | −0.612 | −0.606 | 1.928 | 0.713 | 1.138 | 1.928 |
| 513 | −0.600 | −0.593 | 1.928 | 0.699 | 1.126 | 1.928 |
| 514 | −0.585 | −0.576 | 1.928 | 0.681 | 1.111 | 1.928 |
| 515 | −0.567 | −0.553 | 1.928 | 0.659 | 1.091 | 1.928 |
| 516 | −0.546 | −0.525 | 1.928 | 0.632 | 1.069 | 1.928 |
| 517 | −0.526 | −0.496 | 1.928 | 0.605 | 1.045 | 1.928 |
| 518 | −0.502 | −0.462 | 1.928 | 0.575 | 1.019 | 1.928 |
| 519 | −0.476 | −0.425 | 1.928 | 0.543 | 0.990 | 1.928 |
| 520 | −0.448 | −0.384 | 1.928 | 0.505 | 0.956 | 1.928 |
| 521 | −0.418 | −0.341 | 1.928 | 0.466 | 0.920 | 1.928 |
| 522 | −0.387 | −0.297 | 1.928 | 0.425 | 0.883 | 1.928 |
| 523 | −0.355 | −0.250 | 1.928 | 0.383 | 0.844 | 1.928 |
| 524 | −0.321 | −0.202 | 1.928 | 0.340 | 0.802 | 1.928 |
| 525 | −0.285 | −0.152 | 1.928 | 0.296 | 0.759 | 1.928 |
| 526 | −0.249 | −0.100 | 1.928 | 0.250 | 0.714 | 1.928 |
| 527 | −0.210 | −0.047 | 1.928 | 0.203 | 0.667 | 1.928 |
| 528 | −0.170 | 0.008 | 1.928 | 0.154 | 0.617 | 1.928 |
| 529 | −0.130 | 0.063 | 1.928 | 0.107 | 0.567 | 1.928 |
| 530 | −0.090 | 0.118 | 1.928 | 0.060 | 0.517 | 1.928 |
| 531 | −0.050 | 0.172 | 1.928 | 0.013 | 0.466 | 1.928 |
| 532 | −0.009 | 0.227 | 1.928 | −0.032 | 0.414 | 1.928 |
| 533 | 0.032 | 0.281 | 1.928 | −0.077 | 0.362 | 1.928 |
| 534 | 0.073 | 0.335 | 1.928 | −0.121 | 0.309 | 1.928 |
| 535 | 0.114 | 0.389 | 1.928 | −0.165 | 0.255 | 1.928 |
| 536 | 0.156 | 0.443 | 1.928 | −0.207 | 0.200 | 1.928 |
| 537 | 0.198 | 0.496 | 1.928 | −0.248 | 0.145 | 1.928 |
| 538 | 0.240 | 0.549 | 1.928 | −0.288 | 0.089 | 1.928 |
| 539 | 0.283 | 0.602 | 1.928 | −0.328 | 0.032 | 1.928 |
| 540 | 0.324 | 0.653 | 1.928 | −0.364 | −0.023 | 1.928 |
| 541 | 0.365 | 0.702 | 1.928 | −0.399 | −0.078 | 1.928 |
| 542 | 0.404 | 0.749 | 1.928 | −0.431 | −0.131 | 1.928 |
| 543 | 0.442 | 0.794 | 1.928 | −0.462 | −0.182 | 1.928 |
| 544 | 0.479 | 0.837 | 1.928 | −0.490 | −0.232 | 1.928 |
| 545 | 0.515 | 0.878 | 1.928 | −0.516 | −0.281 | 1.928 |
| 546 | 0.549 | 0.917 | 1.928 | −0.540 | −0.328 | 1.928 |
| 547 | 0.583 | 0.954 | 1.928 | −0.563 | −0.373 | 1.928 |
| 548 | 0.611 | 0.986 | 1.928 | −0.583 | −0.415 | 1.928 |
| 549 | 0.637 | 1.014 | 1.928 | −0.600 | −0.452 | 1.928 |
| 550 | 0.662 | 1.041 | 1.928 | −0.614 | −0.486 | 1.928 |
| 551 | 0.685 | 1.066 | 1.928 | −0.627 | −0.518 | 1.928 |
| 552 | 0.705 | 1.087 | 1.928 | −0.637 | −0.546 | 1.928 |
| 553 | 0.721 | 1.104 | 1.928 | −0.644 | −0.568 | 1.928 |
| 555 | 0.742 | 1.127 | 1.928 | −0.649 | −0.600 | 1.928 |
| 556 | 0.749 | 1.135 | 1.928 | −0.649 | −0.610 | 1.928 |
| 557 | 0.751 | 1.142 | 1.928 | −0.648 | −0.616 | 1.928 |
| 558 | 0.750 | 1.147 | 1.928 | −0.646 | −0.619 | 1.928 |
| 559 | 0.749 | 1.149 | 1.928 | −0.645 | −0.620 | 1.928 |
| 560 | 0.748 | 1.150 | 1.928 | −0.644 | −0.621 | 1.928 |
| 561 | −0.644 | −0.589 | 2.093 | 0.726 | 1.154 | 2.093 |
| 562 | −0.643 | −0.589 | 2.093 | 0.725 | 1.154 | 2.093 |
| 563 | −0.643 | −0.590 | 2.093 | 0.724 | 1.155 | 2.093 |
| 564 | −0.641 | −0.590 | 2.093 | 0.722 | 1.157 | 2.093 |
| 565 | −0.637 | −0.590 | 2.093 | 0.718 | 1.158 | 2.093 |
| 566 | −0.632 | −0.588 | 2.093 | 0.710 | 1.156 | 2.093 |
| 567 | −0.623 | −0.583 | 2.093 | 0.702 | 1.150 | 2.093 |
| 568 | −0.613 | −0.574 | 2.093 | 0.691 | 1.142 | 2.093 |
| 569 | −0.601 | −0.561 | 2.093 | 0.677 | 1.131 | 2.093 |
| 570 | −0.586 | −0.544 | 2.093 | 0.659 | 1.116 | 2.093 |
| 571 | −0.568 | −0.522 | 2.093 | 0.636 | 1.098 | 2.093 |
| 572 | −0.549 | −0.494 | 2.093 | 0.610 | 1.076 | 2.093 |
| 573 | −0.528 | −0.465 | 2.093 | 0.582 | 1.053 | 2.093 |
| 574 | −0.506 | −0.432 | 2.093 | 0.553 | 1.028 | 2.093 |
| 575 | −0.481 | −0.395 | 2.093 | 0.520 | 1.000 | 2.093 |
| 576 | −0.453 | −0.355 | 2.093 | 0.482 | 0.968 | 2.093 |
| 577 | −0.424 | −0.312 | 2.093 | 0.443 | 0.933 | 2.093 |
| 578 | −0.394 | −0.268 | 2.093 | 0.403 | 0.897 | 2.093 |
| 579 | −0.362 | −0.222 | 2.093 | 0.361 | 0.859 | 2.093 |
| 580 | −0.329 | −0.174 | 2.093 | 0.318 | 0.818 | 2.093 |
| 581 | −0.295 | −0.125 | 2.093 | 0.273 | 0.776 | 2.093 |
| 582 | −0.259 | −0.074 | 2.093 | 0.228 | 0.732 | 2.093 |
| 583 | −0.222 | −0.021 | 2.093 | 0.181 | 0.686 | 2.093 |
| 584 | −0.183 | 0.033 | 2.093 | 0.133 | 0.637 | 2.093 |
| 585 | −0.143 | 0.087 | 2.093 | 0.086 | 0.588 | 2.093 |
| 586 | −0.104 | 0.141 | 2.093 | 0.040 | 0.538 | 2.093 |
| 587 | −0.064 | 0.195 | 2.093 | −0.006 | 0.488 | 2.093 |
| 588 | −0.024 | 0.249 | 2.093 | −0.050 | 0.437 | 2.093 |
| 589 | 0.016 | 0.303 | 2.093 | −0.095 | 0.385 | 2.093 |
| 590 | 0.056 | 0.356 | 2.093 | −0.138 | 0.332 | 2.093 |
| 591 | 0.097 | 0.409 | 2.093 | −0.180 | 0.279 | 2.093 |
| 592 | 0.138 | 0.462 | 2.093 | −0.221 | 0.225 | 2.093 |
| 593 | 0.179 | 0.515 | 2.093 | −0.261 | 0.170 | 2.093 |
| 594 | 0.221 | 0.567 | 2.093 | −0.300 | 0.114 | 2.093 |
| 595 | 0.263 | 0.619 | 2.093 | −0.338 | 0.058 | 2.093 |
| 596 | 0.304 | 0.669 | 2.093 | −0.374 | 0.003 | 2.093 |
| 597 | 0.344 | 0.717 | 2.093 | −0.408 | −0.051 | 2.093 |
| 598 | 0.383 | 0.763 | 2.093 | −0.439 | −0.104 | 2.093 |
| 599 | 0.421 | 0.807 | 2.093 | −0.469 | −0.155 | 2.093 |
| 600 | 0.457 | 0.849 | 2.093 | −0.496 | −0.204 | 2.093 |
| 601 | 0.493 | 0.889 | 2.093 | −0.521 | −0.252 | 2.093 |
| 602 | 0.527 | 0.927 | 2.093 | −0.545 | −0.299 | 2.093 |
| 603 | 0.560 | 0.963 | 2.093 | −0.567 | −0.344 | 2.093 |
| 604 | 0.589 | 0.994 | 2.093 | −0.586 | −0.385 | 2.093 |
| 605 | 0.615 | 1.022 | 2.093 | −0.603 | −0.422 | 2.093 |
| 606 | 0.639 | 1.048 | 2.093 | −0.617 | −0.456 | 2.093 |
| 607 | 0.662 | 1.072 | 2.093 | −0.629 | −0.487 | 2.093 |
| 608 | 0.683 | 1.093 | 2.093 | −0.639 | −0.515 | 2.093 |
| 609 | 0.698 | 1.109 | 2.093 | −0.645 | −0.537 | 2.093 |
| 610 | 0.711 | 1.122 | 2.093 | −0.648 | −0.555 | 2.093 |
| 611 | 0.720 | 1.131 | 2.093 | −0.650 | −0.568 | 2.093 |
| 612 | 0.727 | 1.138 | 2.093 | −0.650 | −0.578 | 2.093 |
| 613 | 0.729 | 1.146 | 2.093 | −0.648 | −0.584 | 2.093 |
| 614 | 0.728 | 1.150 | 2.093 | −0.646 | −0.587 | 2.093 |
| 615 | 0.727 | 1.152 | 2.093 | −0.645 | −0.588 | 2.093 |
| 616 | 0.726 | 1.153 | 2.093 | −0.644 | −0.589 | 2.093 |
| 617 | −0.642 | −0.582 | 2.315 | 0.689 | 1.140 | 2.315 |
| 618 | −0.642 | −0.582 | 2.315 | 0.689 | 1.140 | 2.315 |
| 619 | −0.641 | −0.583 | 2.315 | 0.688 | 1.141 | 2.315 |
| 620 | −0.639 | −0.583 | 2.315 | 0.686 | 1.142 | 2.315 |
| 621 | −0.636 | −0.583 | 2.315 | 0.682 | 1.144 | 2.315 |
| 622 | −0.630 | −0.581 | 2.315 | 0.674 | 1.142 | 2.315 |
| 623 | −0.622 | −0.575 | 2.315 | 0.666 | 1.136 | 2.315 |
| 624 | −0.612 | −0.567 | 2.315 | 0.655 | 1.128 | 2.315 |
| 625 | −0.600 | −0.554 | 2.315 | 0.641 | 1.118 | 2.315 |
| 626 | −0.586 | −0.537 | 2.315 | 0.623 | 1.105 | 2.315 |
| 627 | −0.569 | −0.515 | 2.315 | 0.600 | 1.087 | 2.315 |
| 628 | −0.550 | −0.488 | 2.315 | 0.573 | 1.067 | 2.315 |
| 629 | −0.530 | −0.459 | 2.315 | 0.545 | 1.045 | 2.315 |
| 630 | −0.509 | −0.426 | 2.315 | 0.515 | 1.021 | 2.315 |
| 631 | −0.485 | −0.389 | 2.315 | 0.482 | 0.995 | 2.315 |
| 632 | −0.458 | −0.349 | 2.315 | 0.444 | 0.963 | 2.315 |
| 633 | −0.431 | −0.307 | 2.315 | 0.405 | 0.930 | 2.315 |
| 634 | −0.402 | −0.263 | 2.315 | 0.365 | 0.895 | 2.315 |
| 635 | −0.372 | −0.217 | 2.315 | 0.323 | 0.858 | 2.315 |
| 636 | −0.340 | −0.170 | 2.315 | 0.280 | 0.819 | 2.315 |
| 637 | −0.307 | −0.121 | 2.315 | 0.236 | 0.777 | 2.315 |
| 638 | −0.273 | −0.070 | 2.315 | 0.191 | 0.734 | 2.315 |
| 639 | −0.237 | −0.017 | 2.315 | 0.145 | 0.688 | 2.315 |
| 640 | −0.199 | 0.037 | 2.315 | 0.098 | 0.640 | 2.315 |
| 641 | −0.162 | 0.090 | 2.315 | 0.052 | 0.592 | 2.315 |
| 642 | −0.124 | 0.144 | 2.315 | 0.007 | 0.542 | 2.315 |
| 643 | −0.085 | 0.197 | 2.315 | −0.037 | 0.492 | 2.315 |
| 644 | −0.047 | 0.250 | 2.315 | −0.080 | 0.441 | 2.315 |
| 645 | −0.008 | 0.304 | 2.315 | −0.123 | 0.389 | 2.315 |
| 646 | 0.031 | 0.356 | 2.315 | −0.164 | 0.336 | 2.315 |
| 647 | 0.071 | 0.409 | 2.315 | −0.204 | 0.283 | 2.315 |

TABLE II-continued

| | Pressure Surface | | | Suction Surface | | | | Pressure Surface | | | Suction Surface | | |
|---|---|---|---|---|---|---|---|---|---|---|---|---|---|
| N | X | Y | Z | X | Y | Z | N | X | Y | Z | X | Y | Z |
| 648 | 0.110 | 0.461 | 2.315 | −0.244 | 0.229 | 2.315 | 724 | 0.666 | 1.106 | 2.423 | −0.648 | −0.585 | 2.423 |
| 649 | 0.150 | 0.513 | 2.315 | −0.282 | 0.174 | 2.315 | 725 | 0.668 | 1.113 | 2.423 | −0.646 | −0.590 | 2.423 |
| 650 | 0.191 | 0.565 | 2.315 | −0.319 | 0.118 | 2.315 | 726 | 0.668 | 1.117 | 2.423 | −0.645 | −0.593 | 2.423 |
| 651 | 0.232 | 0.617 | 2.315 | −0.355 | 0.062 | 2.315 | 727 | 0.666 | 1.119 | 2.423 | −0.643 | −0.594 | 2.423 |
| 652 | 0.272 | 0.666 | 2.315 | −0.389 | 0.007 | 2.315 | 728 | 0.666 | 1.120 | 2.423 | −0.643 | −0.595 | 2.423 |
| 653 | 0.311 | 0.713 | 2.315 | −0.421 | −0.047 | 2.315 | 729 | −0.648 | −0.627 | 2.545 | 0.640 | 1.096 | 2.545 |
| 654 | 0.349 | 0.758 | 2.315 | −0.451 | −0.100 | 2.315 | 730 | −0.647 | −0.628 | 2.545 | 0.639 | 1.096 | 2.545 |
| 655 | 0.386 | 0.802 | 2.315 | −0.479 | −0.151 | 2.315 | 731 | −0.646 | −0.628 | 2.545 | 0.638 | 1.097 | 2.545 |
| 656 | 0.422 | 0.843 | 2.315 | −0.505 | −0.200 | 2.315 | 732 | −0.645 | −0.628 | 2.545 | 0.636 | 1.098 | 2.545 |
| 657 | 0.457 | 0.882 | 2.315 | −0.529 | −0.248 | 2.315 | 733 | −0.641 | −0.628 | 2.545 | 0.632 | 1.100 | 2.545 |
| 658 | 0.491 | 0.919 | 2.315 | −0.551 | −0.294 | 2.315 | 734 | −0.636 | −0.626 | 2.545 | 0.625 | 1.098 | 2.545 |
| 659 | 0.524 | 0.955 | 2.315 | −0.572 | −0.339 | 2.315 | 735 | −0.628 | −0.621 | 2.545 | 0.616 | 1.092 | 2.545 |
| 660 | 0.552 | 0.985 | 2.315 | −0.590 | −0.380 | 2.315 | 736 | −0.618 | −0.612 | 2.545 | 0.605 | 1.085 | 2.545 |
| 661 | 0.578 | 1.012 | 2.315 | −0.605 | −0.417 | 2.315 | 737 | −0.607 | −0.599 | 2.545 | 0.590 | 1.075 | 2.545 |
| 662 | 0.602 | 1.037 | 2.315 | −0.619 | −0.450 | 2.315 | 738 | −0.593 | −0.582 | 2.545 | 0.572 | 1.063 | 2.545 |
| 663 | 0.625 | 1.061 | 2.315 | −0.630 | −0.481 | 2.315 | 739 | −0.576 | −0.560 | 2.545 | 0.548 | 1.046 | 2.545 |
| 664 | 0.645 | 1.081 | 2.315 | −0.639 | −0.509 | 2.315 | 740 | −0.558 | −0.533 | 2.545 | 0.521 | 1.027 | 2.545 |
| 665 | 0.661 | 1.096 | 2.315 | −0.644 | −0.531 | 2.315 | 741 | −0.540 | −0.503 | 2.545 | 0.493 | 1.006 | 2.545 |
| 666 | 0.673 | 1.108 | 2.315 | −0.647 | −0.548 | 2.315 | 742 | −0.519 | −0.470 | 2.545 | 0.463 | 0.983 | 2.545 |
| 667 | 0.683 | 1.118 | 2.315 | −0.648 | −0.562 | 2.315 | 743 | −0.497 | −0.433 | 2.545 | 0.429 | 0.958 | 2.545 |
| 668 | 0.690 | 1.125 | 2.315 | −0.648 | −0.572 | 2.315 | 744 | −0.472 | −0.393 | 2.545 | 0.391 | 0.928 | 2.545 |
| 669 | 0.692 | 1.132 | 2.315 | −0.646 | −0.577 | 2.315 | 745 | −0.446 | −0.350 | 2.545 | 0.352 | 0.895 | 2.545 |
| 670 | 0.692 | 1.136 | 2.315 | −0.644 | −0.580 | 2.315 | 746 | −0.419 | −0.306 | 2.545 | 0.311 | 0.861 | 2.545 |
| 671 | 0.690 | 1.138 | 2.315 | −0.643 | −0.581 | 2.315 | 747 | −0.390 | −0.260 | 2.545 | 0.269 | 0.825 | 2.545 |
| 672 | 0.690 | 1.139 | 2.315 | −0.642 | −0.582 | 2.315 | 748 | −0.360 | −0.212 | 2.545 | 0.227 | 0.786 | 2.545 |
| 673 | −0.642 | −0.595 | 2.423 | 0.665 | 1.121 | 2.423 | 749 | −0.329 | −0.163 | 2.545 | 0.183 | 0.745 | 2.545 |
| 674 | −0.642 | −0.595 | 2.423 | 0.665 | 1.121 | 2.423 | 750 | −0.296 | −0.112 | 2.545 | 0.138 | 0.702 | 2.545 |
| 675 | −0.641 | −0.595 | 2.423 | 0.664 | 1.122 | 2.423 | 751 | −0.262 | −0.059 | 2.545 | 0.093 | 0.656 | 2.545 |
| 676 | −0.639 | −0.596 | 2.423 | 0.662 | 1.124 | 2.423 | 752 | −0.226 | −0.005 | 2.545 | 0.047 | 0.608 | 2.545 |
| 677 | −0.636 | −0.595 | 2.423 | 0.658 | 1.125 | 2.423 | 753 | −0.190 | 0.049 | 2.545 | 0.003 | 0.559 | 2.545 |
| 678 | −0.631 | −0.593 | 2.423 | 0.650 | 1.123 | 2.423 | 754 | −0.154 | 0.103 | 2.545 | −0.041 | 0.509 | 2.545 |
| 679 | −0.622 | −0.588 | 2.423 | 0.642 | 1.118 | 2.423 | 755 | −0.117 | 0.156 | 2.545 | −0.084 | 0.458 | 2.545 |
| 680 | −0.613 | −0.580 | 2.423 | 0.631 | 1.110 | 2.423 | 756 | −0.080 | 0.210 | 2.545 | −0.125 | 0.406 | 2.545 |
| 681 | −0.601 | −0.567 | 2.423 | 0.617 | 1.100 | 2.423 | 757 | −0.042 | 0.263 | 2.545 | −0.166 | 0.354 | 2.545 |
| 682 | −0.587 | −0.550 | 2.423 | 0.599 | 1.087 | 2.423 | 758 | −0.004 | 0.316 | 2.545 | −0.205 | 0.300 | 2.545 |
| 683 | −0.570 | −0.528 | 2.423 | 0.575 | 1.070 | 2.423 | 759 | 0.034 | 0.368 | 2.545 | −0.243 | 0.245 | 2.545 |
| 684 | −0.551 | −0.501 | 2.423 | 0.549 | 1.050 | 2.423 | 760 | 0.072 | 0.421 | 2.545 | −0.280 | 0.190 | 2.545 |
| 685 | −0.532 | −0.472 | 2.423 | 0.520 | 1.029 | 2.423 | 761 | 0.111 | 0.473 | 2.545 | −0.315 | 0.134 | 2.545 |
| 686 | −0.511 | −0.439 | 2.423 | 0.490 | 1.006 | 2.423 | 762 | 0.150 | 0.525 | 2.545 | −0.350 | 0.078 | 2.545 |
| 687 | −0.488 | −0.402 | 2.423 | 0.457 | 0.980 | 2.423 | 763 | 0.189 | 0.576 | 2.545 | −0.384 | 0.020 | 2.545 |
| 688 | −0.463 | −0.362 | 2.423 | 0.419 | 0.949 | 2.423 | 764 | 0.228 | 0.626 | 2.545 | −0.416 | −0.036 | 2.545 |
| 689 | −0.436 | −0.320 | 2.423 | 0.380 | 0.917 | 2.423 | 765 | 0.266 | 0.673 | 2.545 | −0.445 | −0.090 | 2.545 |
| 690 | −0.408 | −0.276 | 2.423 | 0.339 | 0.882 | 2.423 | 766 | 0.303 | 0.718 | 2.545 | −0.473 | −0.143 | 2.545 |
| 691 | −0.378 | −0.230 | 2.423 | 0.298 | 0.846 | 2.423 | 767 | 0.339 | 0.761 | 2.545 | −0.499 | −0.195 | 2.545 |
| 692 | −0.348 | −0.183 | 2.423 | 0.255 | 0.807 | 2.423 | 768 | 0.375 | 0.802 | 2.545 | −0.523 | −0.244 | 2.545 |
| 693 | −0.316 | −0.134 | 2.423 | 0.211 | 0.766 | 2.423 | 769 | 0.409 | 0.841 | 2.545 | −0.545 | −0.293 | 2.545 |
| 694 | −0.282 | −0.083 | 2.423 | 0.167 | 0.723 | 2.423 | 770 | 0.442 | 0.878 | 2.545 | −0.565 | −0.339 | 2.545 |
| 695 | −0.247 | −0.031 | 2.423 | 0.121 | 0.677 | 2.423 | 771 | 0.475 | 0.913 | 2.545 | −0.585 | −0.384 | 2.545 |
| 696 | −0.210 | 0.023 | 2.423 | 0.075 | 0.630 | 2.423 | 772 | 0.503 | 0.943 | 2.545 | −0.601 | −0.425 | 2.545 |
| 697 | −0.174 | 0.077 | 2.423 | 0.030 | 0.581 | 2.423 | 773 | 0.528 | 0.970 | 2.545 | −0.616 | −0.462 | 2.545 |
| 698 | −0.136 | 0.130 | 2.423 | −0.015 | 0.531 | 2.423 | 774 | 0.552 | 0.995 | 2.545 | −0.628 | −0.496 | 2.545 |
| 699 | −0.099 | 0.184 | 2.423 | −0.058 | 0.481 | 2.423 | 775 | 0.575 | 1.018 | 2.545 | −0.638 | −0.527 | 2.545 |
| 700 | −0.061 | 0.237 | 2.423 | −0.100 | 0.430 | 2.423 | 776 | 0.595 | 1.038 | 2.545 | −0.646 | −0.555 | 2.545 |
| 701 | −0.023 | 0.290 | 2.423 | −0.142 | 0.378 | 2.423 | 777 | 0.610 | 1.053 | 2.545 | −0.651 | −0.577 | 2.545 |
| 702 | 0.015 | 0.342 | 2.423 | −0.182 | 0.325 | 2.423 | 778 | 0.623 | 1.065 | 2.545 | −0.653 | −0.594 | 2.545 |
| 703 | 0.054 | 0.395 | 2.423 | −0.221 | 0.271 | 2.423 | 779 | 0.632 | 1.074 | 2.545 | −0.654 | −0.607 | 2.545 |
| 704 | 0.093 | 0.447 | 2.423 | −0.259 | 0.216 | 2.423 | 780 | 0.639 | 1.081 | 2.545 | −0.653 | −0.617 | 2.545 |
| 705 | 0.132 | 0.499 | 2.423 | −0.296 | 0.161 | 2.423 | 781 | 0.642 | 1.088 | 2.545 | −0.652 | −0.623 | 2.545 |
| 706 | 0.172 | 0.551 | 2.423 | −0.332 | 0.105 | 2.423 | 782 | 0.642 | 1.092 | 2.545 | −0.650 | −0.626 | 2.545 |
| 707 | 0.212 | 0.602 | 2.423 | −0.367 | 0.049 | 2.423 | 783 | 0.641 | 1.094 | 2.545 | −0.649 | −0.627 | 2.545 |
| 708 | 0.251 | 0.651 | 2.423 | −0.400 | −0.007 | 2.423 | 784 | 0.640 | 1.095 | 2.545 | −0.648 | −0.627 | 2.545 |
| 709 | 0.290 | 0.698 | 2.423 | −0.431 | −0.061 | 2.423 | 785 | −0.652 | −0.647 | 2.616 | 0.625 | 1.081 | 2.616 |
| 710 | 0.327 | 0.743 | 2.423 | −0.460 | −0.113 | 2.423 | 786 | −0.652 | −0.647 | 2.616 | 0.625 | 1.081 | 2.616 |
| 711 | 0.364 | 0.786 | 2.423 | −0.486 | −0.164 | 2.423 | 787 | −0.651 | −0.648 | 2.616 | 0.624 | 1.082 | 2.616 |
| 712 | 0.400 | 0.827 | 2.423 | −0.511 | −0.214 | 2.423 | 788 | −0.649 | −0.648 | 2.616 | 0.622 | 1.084 | 2.616 |
| 713 | 0.434 | 0.866 | 2.423 | −0.534 | −0.262 | 2.423 | 789 | −0.646 | −0.648 | 2.616 | 0.618 | 1.085 | 2.616 |
| 714 | 0.468 | 0.903 | 2.423 | −0.556 | −0.308 | 2.423 | 790 | −0.641 | −0.646 | 2.616 | 0.610 | 1.083 | 2.616 |
| 715 | 0.500 | 0.938 | 2.423 | −0.576 | −0.352 | 2.423 | 791 | −0.633 | −0.640 | 2.616 | 0.602 | 1.077 | 2.616 |
| 716 | 0.529 | 0.968 | 2.423 | −0.593 | −0.393 | 2.423 | 792 | −0.623 | −0.632 | 2.616 | 0.591 | 1.070 | 2.616 |
| 717 | 0.554 | 0.995 | 2.423 | −0.608 | −0.430 | 2.423 | 793 | −0.611 | −0.619 | 2.616 | 0.576 | 1.061 | 2.616 |
| 718 | 0.578 | 1.019 | 2.423 | −0.621 | −0.463 | 2.423 | 794 | −0.598 | −0.602 | 2.616 | 0.558 | 1.048 | 2.616 |
| 719 | 0.601 | 1.043 | 2.423 | −0.632 | −0.495 | 2.423 | 795 | −0.581 | −0.579 | 2.616 | 0.534 | 1.032 | 2.616 |
| 720 | 0.621 | 1.063 | 2.423 | −0.640 | −0.522 | 2.423 | 796 | −0.563 | −0.552 | 2.616 | 0.507 | 1.013 | 2.616 |
| 721 | 0.637 | 1.078 | 2.423 | −0.645 | −0.544 | 2.423 | 797 | −0.545 | −0.523 | 2.616 | 0.478 | 0.992 | 2.616 |
| 722 | 0.649 | 1.090 | 2.423 | −0.648 | −0.561 | 2.423 | 798 | −0.525 | −0.490 | 2.616 | 0.448 | 0.970 | 2.616 |
| 723 | 0.659 | 1.099 | 2.423 | −0.649 | −0.575 | 2.423 | 799 | −0.503 | −0.452 | 2.616 | 0.414 | 0.944 | 2.616 |

TABLE II-continued

| | Pressure Surface | | | Suction Surface | | |
|---|---|---|---|---|---|---|
| N | X | Y | Z | X | Y | Z |
| 800 | −0.478 | −0.411 | 2.616 | 0.376 | 0.914 | 2.616 |
| 801 | −0.453 | −0.369 | 2.616 | 0.336 | 0.882 | 2.616 |
| 802 | −0.426 | −0.324 | 2.616 | 0.295 | 0.848 | 2.616 |
| 803 | −0.398 | −0.278 | 2.616 | 0.254 | 0.812 | 2.616 |
| 804 | −0.368 | −0.230 | 2.616 | 0.211 | 0.773 | 2.616 |
| 805 | −0.337 | −0.181 | 2.616 | 0.167 | 0.732 | 2.616 |
| 806 | −0.305 | −0.130 | 2.616 | 0.123 | 0.689 | 2.616 |
| 807 | −0.271 | −0.077 | 2.616 | 0.078 | 0.643 | 2.616 |
| 808 | −0.236 | −0.022 | 2.616 | 0.032 | 0.595 | 2.616 |
| 809 | −0.200 | 0.032 | 2.616 | −0.013 | 0.546 | 2.616 |
| 810 | −0.164 | 0.086 | 2.616 | −0.056 | 0.495 | 2.616 |
| 811 | −0.127 | 0.140 | 2.616 | −0.098 | 0.444 | 2.616 |
| 812 | −0.090 | 0.193 | 2.616 | −0.139 | 0.392 | 2.616 |
| 813 | −0.053 | 0.246 | 2.616 | −0.179 | 0.339 | 2.616 |
| 814 | −0.016 | 0.299 | 2.616 | −0.218 | 0.285 | 2.616 |
| 815 | 0.022 | 0.352 | 2.616 | −0.255 | 0.230 | 2.616 |
| 816 | 0.060 | 0.404 | 2.616 | −0.291 | 0.174 | 2.616 |
| 817 | 0.099 | 0.457 | 2.616 | −0.327 | 0.118 | 2.616 |
| 818 | 0.138 | 0.509 | 2.616 | −0.361 | 0.061 | 2.616 |
| 819 | 0.177 | 0.560 | 2.616 | −0.394 | 0.003 | 2.616 |
| 820 | 0.216 | 0.610 | 2.616 | −0.425 | −0.053 | 2.616 |
| 821 | 0.253 | 0.657 | 2.616 | −0.454 | −0.108 | 2.616 |
| 822 | 0.290 | 0.703 | 2.616 | −0.481 | −0.161 | 2.616 |
| 823 | 0.326 | 0.746 | 2.616 | −0.506 | −0.213 | 2.616 |
| 824 | 0.361 | 0.787 | 2.616 | −0.530 | −0.263 | 2.616 |
| 825 | 0.395 | 0.826 | 2.616 | −0.552 | −0.312 | 2.616 |
| 826 | 0.429 | 0.863 | 2.616 | −0.572 | −0.358 | 2.616 |
| 827 | 0.461 | 0.898 | 2.616 | −0.591 | −0.403 | 2.616 |
| 828 | 0.489 | 0.928 | 2.616 | −0.607 | −0.445 | 2.616 |
| 829 | 0.514 | 0.955 | 2.616 | −0.621 | −0.482 | 2.616 |
| 830 | 0.538 | 0.980 | 2.616 | −0.633 | −0.515 | 2.616 |
| 831 | 0.561 | 1.003 | 2.616 | −0.643 | −0.547 | 2.616 |
| 832 | 0.581 | 1.023 | 2.616 | −0.651 | −0.575 | 2.616 |
| 833 | 0.596 | 1.038 | 2.616 | −0.655 | −0.596 | 2.616 |
| 834 | 0.608 | 1.050 | 2.616 | −0.658 | −0.614 | 2.616 |
| 835 | 0.618 | 1.059 | 2.616 | −0.659 | −0.627 | 2.616 |
| 836 | 0.625 | 1.066 | 2.616 | −0.658 | −0.637 | 2.616 |
| 837 | 0.628 | 1.073 | 2.616 | −0.656 | −0.642 | 2.616 |
| 838 | 0.628 | 1.077 | 2.616 | −0.655 | −0.645 | 2.616 |
| 839 | 0.626 | 1.079 | 2.616 | −0.653 | −0.647 | 2.616 |
| 840 | 0.626 | 1.080 | 2.616 | −0.652 | −0.647 | 2.616 |

It will also be appreciated that the airfoil 100 disclosed in any one of the above TABLES I and II may be scaled up or down geometrically for use in other similar gas turbine designs. Consequently, the coordinate values set forth in any one of TABLES I and II may be scaled upwardly or downwardly such that the airfoil profile shape remains unchanged. A scaled version of the coordinates in any one of TABLES I and II would be represented by X, Y and Z coordinate values, with the X, Y and Z non-dimensional coordinate values converted to units of distance (e.g., inches), multiplied or divided by a constant number (e.g., a scaling factor).

As shown in FIG. 4, each airfoil 100 may define a stagger angle α (alpha) measured between the chord line 110 and the axial direction A of the gas turbine 10. Specifically, the stagger angle α may be measured between the chord line 110 of an airfoil 100 and the axial centerline 23 (or rotary axis) of the gas turbine 10 at the trailing edge 108 of the airfoil 100. The stagger angle α of each airfoil 100 disclosed herein may advantageously vary along the span-wise direction 118 (or radial direction R) according to a respective stagger angle distribution. The stagger angle distribution may be a collection of stagger angles α for a given airfoil 100 at each span-wise location (or radial location) along the airfoil 100.

In many embodiments, each stage S1-S22 of rotor blades 44 may include a unique stagger distribution, such that the collective utilization of the stages S1-S22 of rotor blades 44 will yield a highly efficient compressor section 14. For example, each of the airfoils 100 of the rotor blades 44 within the first stage S1 may have a first stagger angle distribution, each of the airfoils 100 of the rotor blades 44 within the second stage S2 may have a second stagger angle distribution, and so on for each stage (S1-S22) of the compressor section 14.

Similarly, each stage S1-S22 of stator vanes 50 may include a unique stagger angle distribution, such that the collective utilization of the stages S1-S22 of stator vanes 50 will yield a highly efficient compressor section 14. For example, each of the airfoils 100 of the stator vanes 50 within the first stage S1 may have a first stagger angle distribution, each of the airfoils 100 of the stator vanes 50 within the second stage S2 may have a second stagger angle distribution, and so on for each stage (S1-S22) of the compressor section 14.

Figure 5:
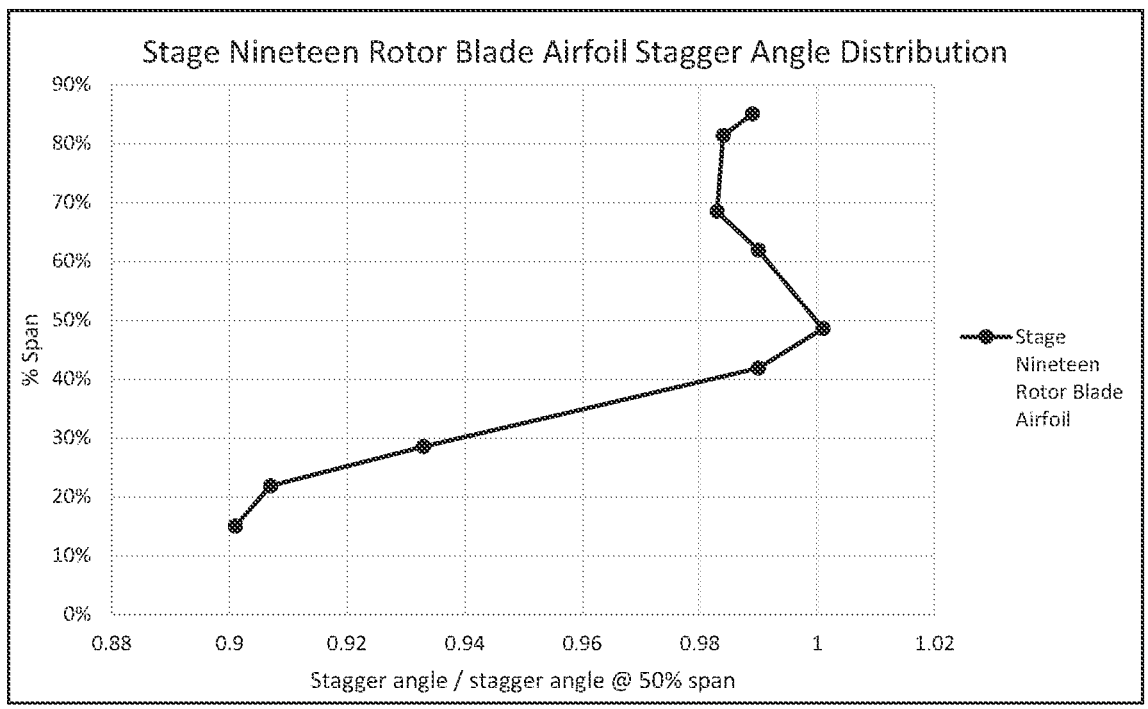
FIG. 5 illustrates a graph of a stagger angle distribution belonging to an airfoil disposed on a rotor blade within a specified stage of a compressor section, in accordance with embodiments of the present disclosure.
Figure 6:
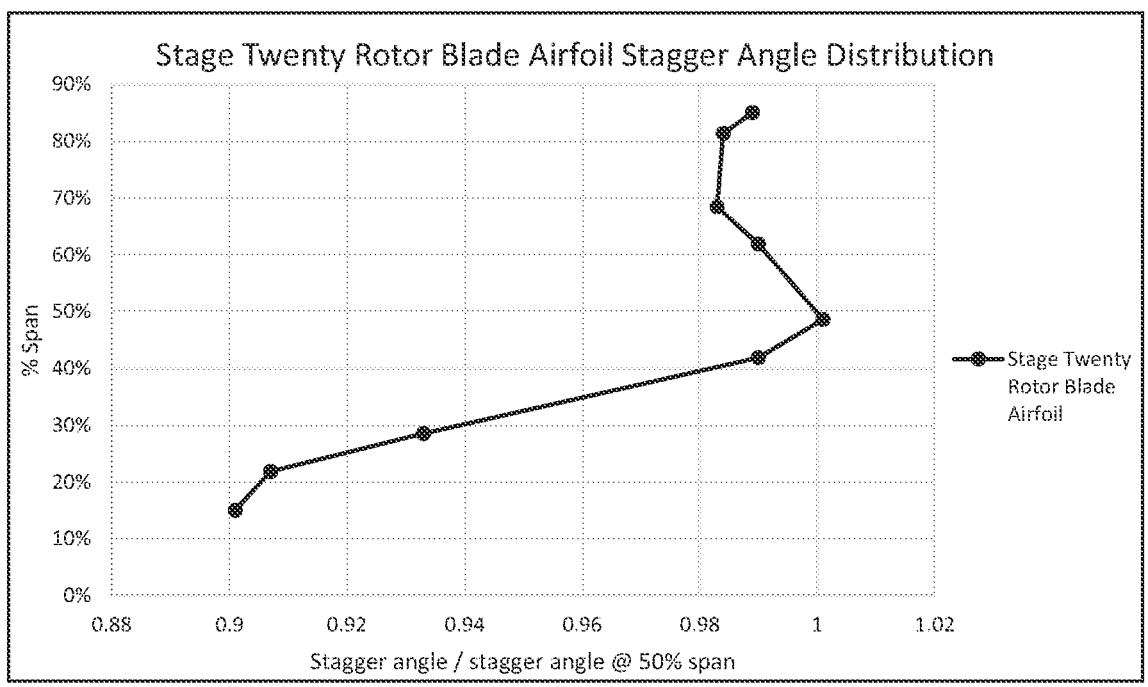
FIG. 6 illustrates a graph of a stagger angle distribution belonging to an airfoil disposed on a rotor blade within a specified stage of a compressor section, in accordance with embodiments of the present disclosure.

In accordance with embodiments of the present disclosure, FIGS. 5 and 6 each illustrate a graph of a stagger angle distribution, which may belong to one or more airfoils 100 within a specified stage (e.g., S1-S22) of the compressor section 14. Each of the graphs may be in non-dimensional units. Specifically, the y-axis may be a percentage along the span-wise direction 118 (e.g., with 0% span representing the inner diameter and 100% span representing the outer diameter). For example, with a rotor blade 44, 0% span may represent the base of the airfoil 100, and 100% span may represent the tip of the airfoil 100. As for a stator vane 50, 0% span may represent the tip of the airfoil 100, and 100% span may represent the base of the airfoil 100. The x-axis may be a ratio between the stagger angle at a specified span-wise location and the mid-span stagger angle (e.g., at about 50% span).

Each of the stagger angle distributions is plotted between 15% span and 85% span of the respective airfoil 100 to which it belongs (e.g., 0%-15% span and 85%-100% span points are omitted). Each stagger angle distribution, when implemented in an airfoil 100 on a rotor blade 44 and/or a stator vane 50 within the compressor section 14, advantageously increase the aerodynamic efficiency of the airfoil 100 (as well as the entire compressor section 14) when compared to prior designs.

In particular, FIG. 5 is a graph of a stagger angle distribution, plotted from 15% to 85% span of an airfoil 100 belonging to a rotor blade 44 within the nineteenth stage S19 (i.e., a nineteenth stage rotor blade). In some embodiments, all of the rotor blades 44 within the nineteenth stage S19 of the compressor section 14 may include an airfoil 100 having the stagger distribution according to FIG. 5. The stagger angle distribution shown in FIG. 5 is plotted according to the points in TABLE III below.

TABLE III

| Stage Nineteen Rotor Blade Airfoil | |
|---|---|
| (%) Span | Stagger/Midspan Stagger |
| 85.00% | 0.989 |
| 81.37% | 0.984 |
| 68.44% | 0.983 |
| 61.88% | 0.990 |
| 48.57% | 1.001 |
| 41.88% | 0.990 |
| 28.53% | 0.933 |
| 21.85% | 0.907 |
| 15.00% | 0.901 |

FIG. 6 is a graph of a stagger angle distribution, plotted from 15% to 85% span of an airfoil 100 belonging to a rotor blade 44 within the twentieth stage S20 (i.e., a twentieth stage rotor blade). In some embodiments, all of the rotor blades 44 within the twentieth stage S20 of the compressor section 14 may include an airfoil 100 having the stagger distribution according to FIG. 6. The stagger angle distribution shown in FIG. 6 is plotted according to the points in TABLE IV below.

TABLE IV

Stage Twenty Rotor Blade Airfoil

| (%) Span | Stagger/Midspan Stagger |
|---|---|
| 85.00% | 0.987 |
| 81.53% | 0.983 |
| 68.52% | 0.985 |
| 61.86% | 0.992 |
| 48.24% | 1.001 |
| 41.40% | 0.987 |
| 27.91% | 0.927 |
| 21.27% | 0.904 |
| 15.00% | 0.901 |

The disclosed airfoil shape optimizes and is specific to the machine conditions and specifications. It provides a unique profile to achieve 1) interaction between other stages in the compressor section 14; 2) aerodynamic efficiency; and 3) normalized aerodynamic and mechanical blade loadings. The disclosed loci of points defined in any one of TABLES I and II allow the gas turbine 10 or any other suitable turbine to run in an efficient, safe and smooth manner. As also noted, the disclosed airfoil 100 may be adapted to any scale, as long as 1) interaction between other stages in the compressor section 14; 2) aerodynamic efficiency; and 3) normalized aerodynamic and mechanical blade loadings are maintained in the scaled turbine.

The airfoil 100 described herein thus improves overall gas turbine 10 efficiency. The airfoil 100 also meets all aeromechanical and stress requirements. For example, the airfoil 100 of the rotor blade 44 thus is of a specific shape to meet aerodynamic, mechanical, and heat transfer requirements in an efficient and cost-effective manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A rotor blade comprising: an airfoil having an airfoil shape, the airfoil shape having a nominal profile substantially in accordance with Cartesian coordinate values of X, Y and Z set forth in one of TABLE I and TABLE II, the Cartesian coordinate values of X, Y, and Z being defined relative to a point data origin at a base of the airfoil, wherein the Cartesian coordinate values of X, Y and Z are non-dimensional values from 0% to 100% convertible to dimensional distances expressed in a unit of distance by multiplying the Cartesian coordinate values of X, Y and Z by a scaling factor of the airfoil in the unit of distance; and wherein X and Y values, when connected by smooth continuing arcs, define airfoil profile sections at each Z value, the airfoil profile sections at Z values being joined smoothly with one another to form a complete airfoil shape.

The rotor blade of any preceding clause, wherein the airfoil includes a stagger angle distribution in accordance with one of TABLE III and TABLE IV, each stagger angle in the stagger angle distribution being measured between a chord line of the airfoil and a rotary axis of the airfoil.

The rotor blade of any preceding clause, wherein the rotor blade forms part of a late stage of a compressor section.

The rotor blade of any preceding clause, wherein the rotor blade is one of a nineteenth stage compressor rotor blade and a twentieth stage compressor rotor blade.

The rotor blade of any preceding clause, wherein the airfoil shape lies in an envelope within +/−5% of a chord length in a direction normal to any airfoil surface location.

The rotor blade of any preceding clause, wherein the scaling factor is between about 0.01 inches and about 10 inches.

The rotor blade of any preceding clause, wherein the X, Y and Z values in TABLE I are scalable as a function of a first constant or number to provide a scaled-up or scaled-down airfoil, and wherein the X, Y and Z values in TABLE II are scalable as a function of a second constant or number to provide a scaled-up or scaled-down airfoil.

A rotor blade comprising: an airfoil having a nominal suction-side profile substantially in accordance with suction-side Cartesian coordinate values of X, Y and Z set forth in one of TABLE I and TABLE II, the Cartesian coordinate values of X, Y, and Z being defined relative to a point data origin at a base of the airfoil, wherein the Cartesian coordinate values of X, Y and Z are non-dimensional values from 0% to 100% convertible to dimensional distances expressed in a unit of distance by multiplying the Cartesian coordinate values of X, Y and Z by a scaling factor of the airfoil in the unit of distance; and wherein X and Y values, when connected by smooth continuing arcs, define suction-side profile sections at each Z value, the suction-side profile sections at the Z values being joined smoothly with one another to form a complete airfoil suction-side shape.

The rotor blade of any preceding clause, wherein the airfoil includes a stagger angle distribution in accordance with one of TABLE III and TABLE IV, each stagger angle in the stagger angle distribution being measured between a chord line of the airfoil and a rotary axis of the airfoil.

The rotor blade of any preceding clause, wherein the rotor blade forms part of a late stage of a compressor section.

The rotor blade of any preceding clause, wherein the rotor blade is one of a nineteenth stage compressor rotor blade and a twentieth stage compressor rotor blade.

The rotor blade of any preceding clause, wherein the nominal suction-side profile lies in an envelope within +/−5% of a chord length in a direction normal to any airfoil surface location.

The rotor blade of any preceding clause, wherein the scaling factor is between about 0.01 inches and about 10 inches.

The rotor blade of any preceding clause, wherein the X, Y and Z values in TABLE I are scalable as a function of a first constant or number to provide a scaled-up or scaled-down airfoil, and wherein the X, Y and Z values in TABLE II are scalable as a function of a second constant or number to provide a scaled-up or scaled-down airfoil.

A turbomachine comprising: a compressor section; a turbine section downstream from the compressor section; a combustion section downstream from the compressor section and upstream from the turbine section; and a rotor blade disposed within the compressor section of the turbomachine, the rotor blade comprising: an airfoil having an airfoil shape, the airfoil shape having a nominal profile substantially in accordance with Cartesian coordinate values of X, Y and Z set forth in one of TABLE I and TABLE II, the Cartesian coordinate values of X, Y, and Z being defined relative to a point data origin at a base of the airfoil, wherein the Cartesian coordinate values of X, Y and Z are non-dimensional values from 0% to 100% convertible to dimensional distances expressed in a unit of distance by multiplying the Cartesian coordinate values of X, Y and Z by a scaling factor in the unit of distance; and wherein X and Y values, when connected by smooth continuing arcs, define airfoil profile sections at each Z value, the airfoil profile sections at Z values being joined smoothly with one another to form a complete airfoil shape.

The turbomachine of any preceding clause, wherein the airfoil includes a stagger angle distribution in accordance with one of TABLE III and TABLE IV, each stagger angle in the stagger angle distribution being measured between a chord line of the airfoil and a rotary axis of the airfoil.

The turbomachine of any preceding clause, wherein the rotor blade forms part of a late stage of the compressor section.

The turbomachine of any preceding clause, wherein the rotor blade is one of a nineteenth stage compressor rotor blade and a twentieth stage compressor rotor blade.

The turbomachine of any preceding clause, wherein the airfoil shape lies in an envelope within +/−5% of a chord length in a direction normal to any airfoil surface location.

The turbomachine of any preceding clause, wherein the scaling factor is between about 0.01 inches and about 10 inches.

What is claimed is:

1. A rotor blade comprising:
an airfoil having an airfoil shape, the airfoil shape having a nominal profile substantially in accordance with Cartesian coordinate values of X, Y and Z set forth in one of TABLE I and TABLE II, the Cartesian coordinate values of X, Y, and Z being defined relative to a point data origin at a base of the airfoil, wherein the Cartesian coordinate values of X, Y and Z are non-dimensional values from 0% to 100% convertible to dimensional distances expressed in a unit of distance by multiplying the Cartesian coordinate values of X, Y and Z by a scaling factor of the airfoil in the unit of distance; and wherein X and Y values, when connected by smooth continuing arcs, define airfoil profile sections at each Z value, the airfoil profile sections at Z values being joined smoothly with one another to form a complete airfoil shape.

2. The rotor blade of claim 1, wherein the airfoil includes a stagger angle distribution in accordance with one of TABLE III and TABLE IV, each stagger angle in the stagger angle distribution being measured between a chord line of the airfoil and a rotary axis of the airfoil.

3. The rotor blade of claim 1, wherein the rotor blade forms part of a late stage of a compressor section.

4. The rotor blade of claim 1, wherein the rotor blade is one of a nineteenth stage compressor rotor blade and a twentieth stage compressor rotor blade.

5. The rotor blade of claim 1, wherein the airfoil shape lies in an envelope within +/−5% of a chord length in a direction normal to any airfoil surface location.

6. The rotor blade of claim 1, wherein the scaling factor is between about 0.01 inches and about 10 inches.

7. The rotor blade of claim 1, wherein the X, Y and Z values in TABLE I are scalable as a function of a first constant or number to provide a first scaled-up or scaled-down airfoil, and wherein the X, Y and Z values in TABLE II are scalable as a function of a second constant or number to provide a second scaled-up or scaled-down airfoil.

8. A rotor blade comprising:
an airfoil having a nominal suction-side profile substantially in accordance with suction-side Cartesian coordinate values of X, Y and Z set forth in one of TABLE I and TABLE II, the Cartesian coordinate values of X, Y, and Z being defined relative to a point data origin at a base of the airfoil, wherein the Cartesian coordinate values of X, Y and Z are non-dimensional values from 0% to 100% convertible to dimensional distances expressed in a unit of distance by multiplying the Cartesian coordinate values of X, Y and Z by a scaling factor of the airfoil in the unit of distance; and wherein X and Y values, when connected by smooth continuing arcs, define suction-side profile sections at each Z value, the suction-side profile sections at the Z values being joined smoothly with one another to form a complete airfoil suction-side shape.

9. The rotor blade of claim 8, wherein the airfoil includes a stagger angle distribution in accordance with one of TABLE III and TABLE IV, each stagger angle in the stagger angle distribution being measured between a chord line of the airfoil and a rotary axis of the airfoil.

10. The rotor blade of claim 8, wherein the rotor blade forms part of a late stage of a compressor section.

11. The rotor blade of claim 8, wherein the rotor blade is one of a nineteenth stage compressor rotor blade and a twentieth stage compressor rotor blade.

12. The rotor blade of claim 8, wherein the nominal suction-side profile lies in an envelope within +/−5% of a chord length in a direction normal to any airfoil surface location.

13. The rotor blade of claim 8, wherein the scaling factor is between about 0.01 inches and about 10 inches.

14. The rotor blade of claim 8, wherein the X, Y and Z values in TABLE I are scalable as a function of a first constant or number to provide a first scaled-up or scaled-down airfoil, and wherein the X, Y and Z values in TABLE II are scalable as a function of a second constant or number to provide a second scaled-up or scaled-down airfoil.

15. A turbomachine comprising:
a compressor section;
a turbine section downstream from the compressor section;
a combustion section downstream from the compressor section and upstream from the turbine section; and
a rotor blade disposed within the compressor section of the turbomachine, the rotor blade comprising:
an airfoil having an airfoil shape, the airfoil shape having a nominal profile substantially in accordance with Cartesian coordinate values of X, Y and Z set forth in one of TABLE I and TABLE II, the Cartesian coordinate values of X, Y, and Z being defined relative to a point data origin at a base of the airfoil, wherein the Cartesian coordinate values of X, Y and Z are non-dimensional values from 0% to 100% convertible to dimensional distances expressed in a unit of distance by multiplying the Cartesian coordinate values of X, Y and Z by a scaling factor in the unit of distance; and wherein X and Y values, when connected by smooth continuing arcs, define airfoil profile sections at each Z value, the airfoil profile sections at Z values being joined smoothly with one another to form a complete airfoil shape.

16. The turbomachine of claim 15, wherein the airfoil includes a stagger angle distribution in accordance with one of TABLE III and TABLE IV, each stagger angle in the stagger angle distribution being measured between a chord line of the airfoil and a rotary axis of the airfoil.

17. The turbomachine of claim 15, wherein the rotor blade forms part of a late stage of the compressor section.

18. The turbomachine of claim 15, wherein the rotor blade is one of a nineteenth stage compressor rotor blade and a twentieth stage compressor rotor blade.

19. The turbomachine of claim 15, wherein the airfoil shape lies in an envelope within +/−5% of a chord length in a direction normal to any airfoil surface location.

20. The turbomachine of claim 15, wherein the scaling factor is between about 0.01 inches and about 10 inches.

* * * * *